US011885468B2

(12) United States Patent
Ruggiero et al.

(10) Patent No.: US 11,885,468 B2
(45) Date of Patent: Jan. 30, 2024

(54) RETRACTABLE HOLIDAY LIGHTS

(71) Applicant: Thomas A. Ruggiero, Jupiter, FL (US)

(72) Inventors: Thomas A. Ruggiero, Jupiter, FL (US); Mark Santus, Daytona Beach, FL (US)

( * ) Notice: Subject to any disclaimer, the term of this patent is extended or adjusted under 35 U.S.C. 154(b) by 151 days.

(21) Appl. No.: 17/682,264

(22) Filed: Feb. 28, 2022

(65) Prior Publication Data

US 2023/0040157 A1 Feb. 9, 2023

Related U.S. Application Data

(60) Division of application No. 16/865,746, filed on May 4, 2020, now Pat. No. 11,280,456, which is a continuation-in-part of application No. 15/983,467, filed on May 18, 2018, now Pat. No. 10,641,471, and a continuation-in-part of application No. 29/647,993, filed on May 17, 2018, now Pat. No. Des. 884,240.

(51) Int. Cl.
*F21S 4/10* (2016.01)
*F21V 15/01* (2006.01)
*F21Y 115/10* (2016.01)

(52) U.S. Cl.
CPC .............. *F21S 4/10* (2016.01); *F21V 15/012* (2013.01); *F21Y 2115/10* (2016.08)

(58) Field of Classification Search
CPC .. F21S 4/10; F21S 4/28; F21V 15/012; F21V 21/15; F21V 23/045; F21V 33/0052; F21Y 2115/10; F21Y 2103/10; G09F 19/226; G09F 2013/222; F21W 2121/004; F21W 2121/006; H05B 45/20; H05B 47/165; H05B 47/19
See application file for complete search history.

(56) References Cited

U.S. PATENT DOCUMENTS

| | | | | |
|---|---|---|---|---|
| 1,595,194 | A | 8/1926 | Hotchkin | |
| 2,816,216 | A | 12/1957 | Dasher | |
| 3,692,993 | A | 9/1972 | Robinson | |
| 4,009,745 | A | 3/1977 | Erpenbeck | |
| 4,259,660 | A * | 3/1981 | Oliver ..................... | E01F 9/662 362/523 |
| 4,546,419 | A | 10/1985 | Johnson | |
| 4,787,665 | A | 11/1988 | Rich | |
| 5,136,489 | A | 8/1992 | Cheng et al. | |
| 5,404,279 | A * | 4/1995 | Wood .................... | F21V 17/007 439/210 |

(Continued)

*Primary Examiner* — Zheng Song
*Assistant Examiner* — Glenn Zimmerman
(74) *Attorney, Agent, or Firm* — Brian S. Steinberger; Hilary F. Steinberger; Law Offices of Brian S. Steinberger, P.A.

(57) ABSTRACT

Self-contained devices, systems and methods for housing holiday lights in the form of icicles, and the like, in self-contained boxes that can easily be mounted and removed around house windows and eaves. The lights can be retractable and extendable downward from the boxes, and the lights can be remotely controlled by smart phones and the like. The boxes can have displays for holiday messages as well as speakers for playing music and messages. Another embodiment can include a drop down version where the lights drop down from a housing. Another version can include a fold out version where a support frame having upwardly protruding lights is rotated so that the lights extend below the housing.

20 Claims, 57 Drawing Sheets

(56) References Cited

U.S. PATENT DOCUMENTS

| | | | | | |
|---|---|---|---|---|---|
| 5,510,966 | A * | 4/1996 | Konecny | F21V 17/007 | 362/240 |
| 6,309,086 | B1 * | 10/2001 | Tomlinson | F21V 15/01 | 362/240 |
| 6,474,840 | B2 | 11/2002 | Padermos | | |
| 6,918,680 | B2 | 7/2005 | Seeberger | | |
| 6,971,768 | B1 | 12/2005 | Pepito et al. | | |
| 6,984,944 | B2 | 1/2006 | Garrity | | |
| 7,825,790 | B2 | 11/2010 | Tallinger | | |
| 7,878,684 | B2 | 2/2011 | Nauman | | |
| 8,136,962 | B2 | 3/2012 | Marlonia | | |
| 8,297,804 | B2 | 10/2012 | Buse | | |
| 9,548,008 | B1 | 1/2017 | Manning | | |
| 9,630,769 | B2 | 4/2017 | Schultz | | |
| 9,777,895 | B2 | 10/2017 | Bokun | | |
| D884,240 | S | 5/2020 | Ruggiero | | |
| 10,641,471 | B1 | 5/2020 | Ruggiero | | |
| 2004/0105255 | A1 | 6/2004 | Seeburger | | |
| 2005/0243565 | A1 * | 11/2005 | Witherspoon | F21S 8/028 | 362/427 |
| 2008/0282964 | A1 * | 11/2008 | Bennett | B60Q 1/547 | 116/28 R |
| 2008/0285294 | A1 | 11/2008 | Kim | | |
| 2009/0201681 | A1 | 8/2009 | Galke et al. | | |
| 2010/0110668 | A1 | 5/2010 | Marlonia | | |
| 2011/0164409 | A1 * | 7/2011 | Smith | F21S 4/10 | 29/428 |
| 2013/0039067 | A1 | 2/2013 | Wong | | |
| 2014/0091719 | A1 | 4/2014 | Tsai | | |
| 2015/0102731 | A1 | 4/2015 | Altamura et al. | | |
| 2016/0131348 | A1 | 5/2016 | Rima et al. | | |
| 2016/0215971 | A1 | 7/2016 | Silver et al. | | |
| 2016/0280452 | A1 * | 9/2016 | Schultz | B65D 25/10 | |

* cited by examiner

FIG. 28A
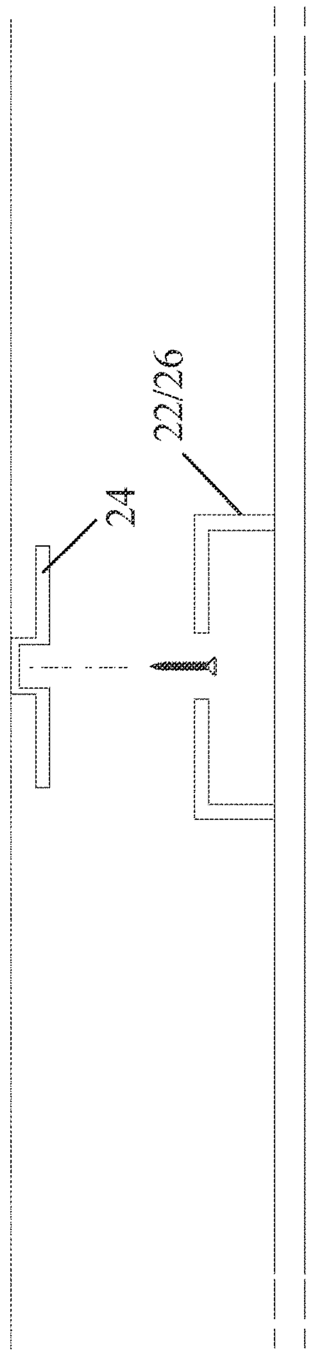
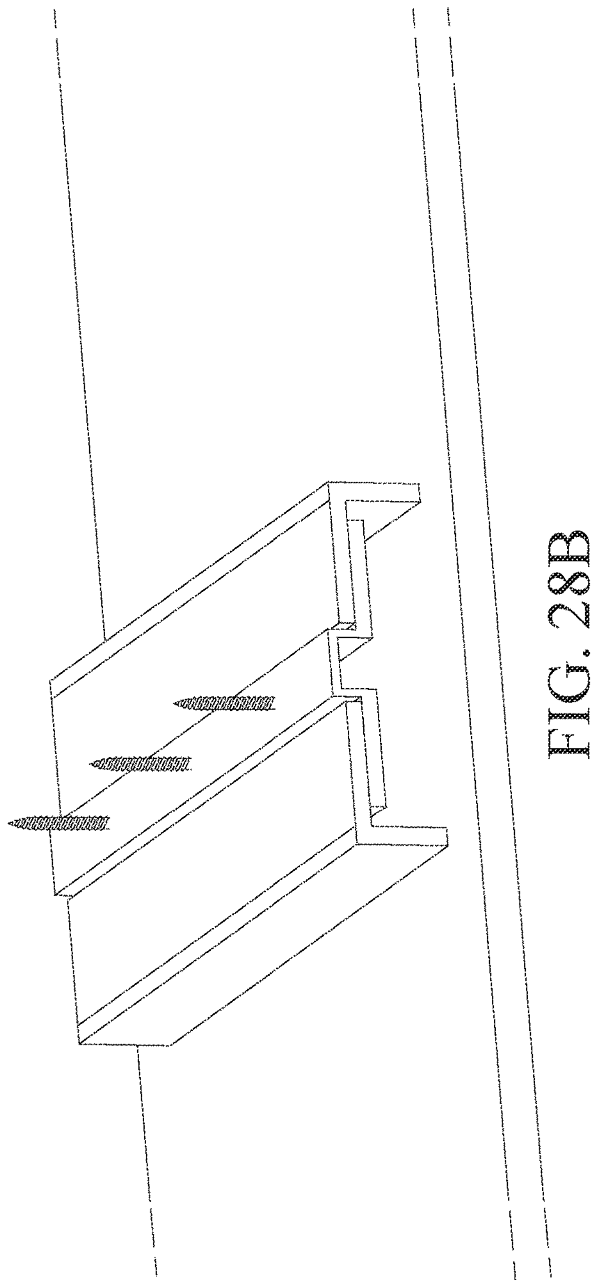
FIG. 28B

RETRACTABLE HOLIDAY LIGHTS

RELATED APPLICATIONS

This application is a Divisional of U.S. patent application Ser. No. 16/865,746 filed May 4, 2020, now allowed, which is a Continuation-In-Part of U.S. patent application Ser. No. 15/983,467 Filed May 18, 2018, now U.S. Pat. No. 10,641, 471, and this application is a Continuation-In-Part of U.S. patent application Ser. No. 29/647,993 filed May 17, 2018, now U.S. Design Pat. D884,240. The entire disclosure of each of the applications listed in this paragraph are incorporated herein by specific reference thereto.

FIELD OF INVENTION

This invention relates to holiday lights, and in particular to self-contained devices, systems and methods for housing holiday lights in the form of light emitting diodes and icicle shapes, and the like, in self-contained boxes that can easily be mounted and removed around house windows and eaves, where the lights are retractable and extendable from the boxes, and the lights can be remotely controlled by smart phones and the like, the boxes can have displays for holiday messages as well as speakers for playing music and messages.

BACKGROUND AND PRIOR ART

Outdoor holiday lights, such as those used during Christmas, are often hung from around December and are taken down after the winter holiday season. The most popular of these lights are strung around exterior walls and on roofs of houses and come with many problems.

For example, hanging exterior light strings usually requires time and labor to install and take down the lights, while balancing on a ladder, and attaching the light strings by fasteners, such as nails and screws, to exterior surfaces of the houses and roofs. In addition to the danger of falling off a ladder, the fasteners, such as nails and screws can cause direct damage to exterior walls and in roofs that can require repairs and more work over time.

In addition, the light strings are difficult to store when not being used, and often become tangled and damaged and not useable down the road. To be reused, the light strings have to be rehung and again taken down repeating the same problems described above.

Thus, the need exists for solutions to the above problems with the prior art.

SUMMARY OF THE INVENTION

A primary objective of the present invention is to provide self-contained devices, systems and methods for housing holiday lights in the form of icicles, and the like, in self-contained boxes that can easily be mounted and removed around house windows and eaves, where the lights are retractable and extendable from the boxes.

A secondary objective of the present invention is to provide retractable and extendable holiday lights in self-contained boxes, where the lights can be remotely controlled by smart phones and the like.

A third objective of the present invention is to provide retractable and extendable holiday lights in self-contained boxes, having displays for holiday messages and speakers for playing music and messages.

A fourth objective of the invention is to provide a retractable lighting system, device and method for having a plurality of lights, such as light emitting diodes having icicle shapes, and the like, which can drop down below a housing when being used.

A fifth objective of the invention is to provide a retractable lighting system, device and method for having a plurality of lights, such as light emitting diodes having icicle shapes, and the like, which can fold out and drop down below a housing when being used A retractable lighting system can include a rectangular box having a top panel, front panel, left panel, right panel, back panel and bottom panel, along with guide members on at least one inside walls of the box, along with a moveable frame being raiseable and lowerable along the guide members, along with a plurality of spaced apart lights attached to and extending below the moveable frame, wherein the moveable frame with the plurality of the lights is moveable from a stored position with both the frame and the plurality of the lights inside the box to an extended position with the plurality of lights extending below the box by sliding the moveable frame along the guide members.

The moveable frame can include a panel with a notched end for the guide members.

The bottom panel can include a hinge for dropping the bottom panel downward away from the front panel when the plurality of the lights is being lowered to the extended position.

The plurality of the lights can include a row of downwardly extending rigid lights, such as icicle shaped lights.

Each of the icicle shaped lights can include light emitting diodes (LEDs).

The retractable lighting system can further include a motor inside of the box, a cable spool mounted inside of the box, a cable having an inner end wound about the spool and at least one outer end attached to the moveable frame, and a motor mounted inside the box for rotating the spool to wind the cable about the spool or unwind the at least one outer end of the cable from the spool in order to lower and raise the moveable frame.

The retractable lighting system can further include at least one rail pulley mounted inside the box above the moveable frame.

The retractable lighting system can further include a motor inside of the box, a cable spool mounted inside of the box, a cable having an inner end wound about the spool and at least one outer end attached to both the moveable frame and the hinged bottom panel, wherein the motor is for rotating the spool to wind the cable about the spool or unwind the at least one outer end of the cable from the spool in order to lower and raise the moveable frame.

The front panel can include a display for showing text messages. The front panel can include at least one speaker.

The retractable lighting system can include a remote controller for remotely turning on and off the plurality of lights, and/or the message display, and/or the speaker. The remote controller can be a smart phone.

Another embodiment can be a drop down and retractable lighting system, that can include a box having a top panel, front panel, left panel, right panel, back panel and bottom panel, with a moveable frame being raiseable and lowerable inside of the box from a raised position inside the box to a lowered position with lights extending below the box.

A plurality of spaced apart lights can be attached to and initially be extending below the moveable frame, wherein the moveable frame with the plurality of the lights is moveable from the raised position with the plurality of the lights inside the box to the lowered position with the plurality of lights extending below the bottom of the box.

The moveable frame can be powered by an electric motor inside of the box. A threaded rod having an upper end attached to the motor and another portion passing through the moveable frame, wherein rotating of the threaded rod causes the moveable frame to move from the raised position to the lowered position, and reversing rotation of the threaded rod raised the moveable frame and the lights back into the box The moveable frame can include a threaded slot for allowing the portion of the threaded rod to thread into.

The bottom pane of the box can include a plurality of through-holes side by side with one another, each of the through holes for allowing a portion of each of the lights to pass through as the lights are being lowered. The lights can be light emitting diodes and can have icicle shapes.

Inside the box can be a track or guide for allowing at least one side of the moveable frame to guide along as the moveable frame moves from the raised position to the lowered position.

Another version allows for a sign to be attached to the threaded rod, so that the sign can move from a position inside of the box to a lowered position extending below the bottom of the box.

A still another embodiment can be a fold out retractable lighting system that can include a box having a top panel, front panel, left panel, right panel, back panel and bottom panel.

Inside the box can include a moveable and rotatable frame with a plurality of spaced apart lights extending upward therefrom. The rotatable and moveable frame be foldable from a raised position with the lights inside the box having a raised position to a fold out position with the plurality of lights extending below the box.

The front panel can have a hinge for allowing the front panel to move from a first position with the front panel across a front opening of the box, to a fold out position when the moveable frame has rotated the upwardly raised lights in a raised position inside the box to the fold out position The plurality of spaced apart lights can include light emitting diodes that can have icicle shapes An electric motor inside of the box be attached to an end of the rotatable frame, wherein the motor rotates the the rotatable frame with the plurality of the lights being in the upright to a rotated position with the plurality of the lights extending downward below the box.

Another version can have a sign attached to the rotatable frame. The sign moving from an upright position inside of the box to a rotated position extending below the box The signs can also include a display for showing text messages.

The different embodiments can include a remote controller for remotely turning on and off the motors for operating the moveable and rotatable frames, and/or for operating the lights.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 28A is an exploded side view of the mounting hardware that can be used to support the retractable lights housing.

FIG. 28B is a perspective view of mounting hardware of FIG. 26A assembled.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

Figures 1, 2:
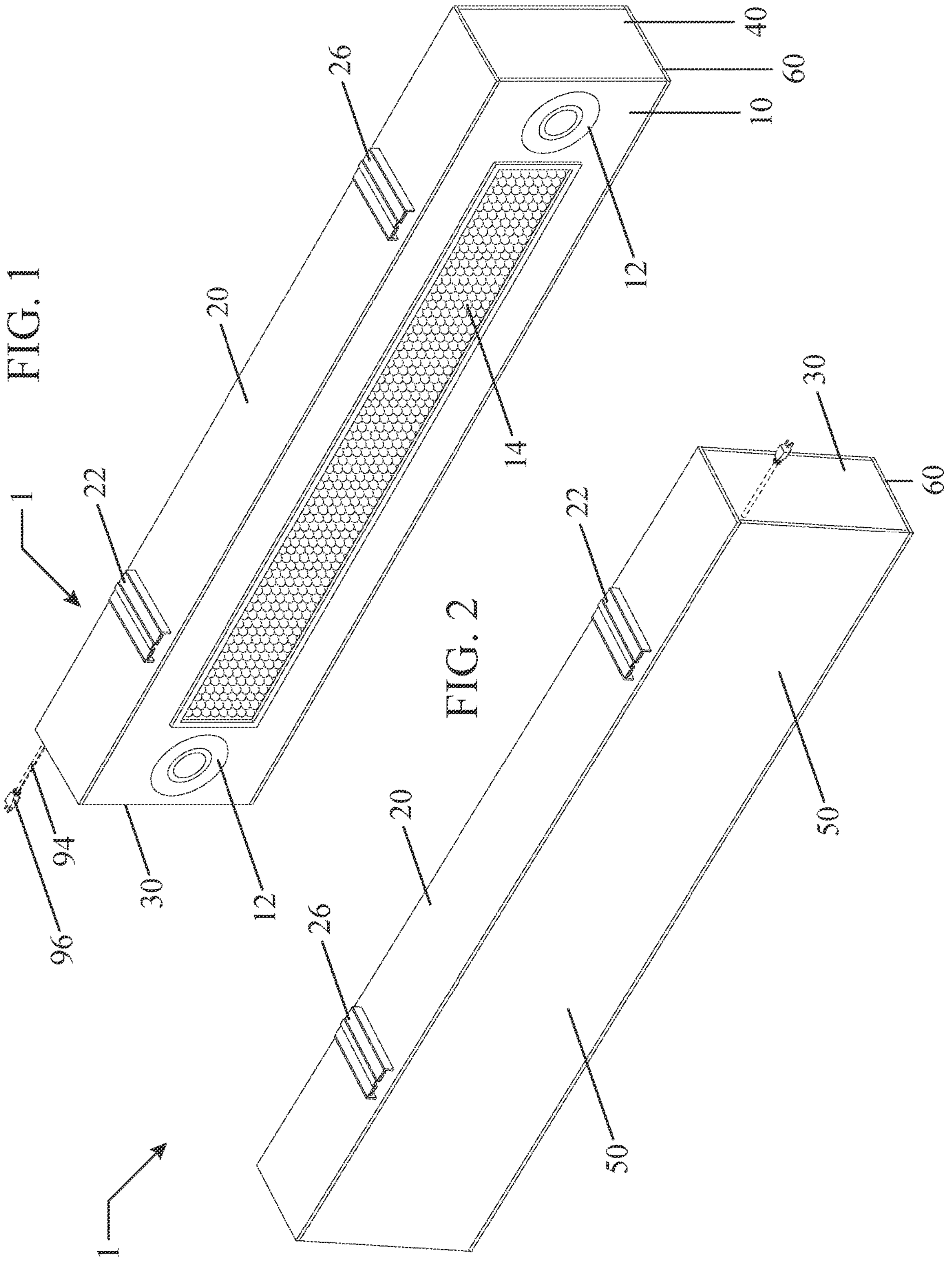
FIG. 1 is an upper front perspective view of the novel retractable holiday lights housing, with lights retracted inside the housing.
FIG. 2 is an upper rear perspective view of the retractable holiday lights housing of FIG. 1.
Figure 3:
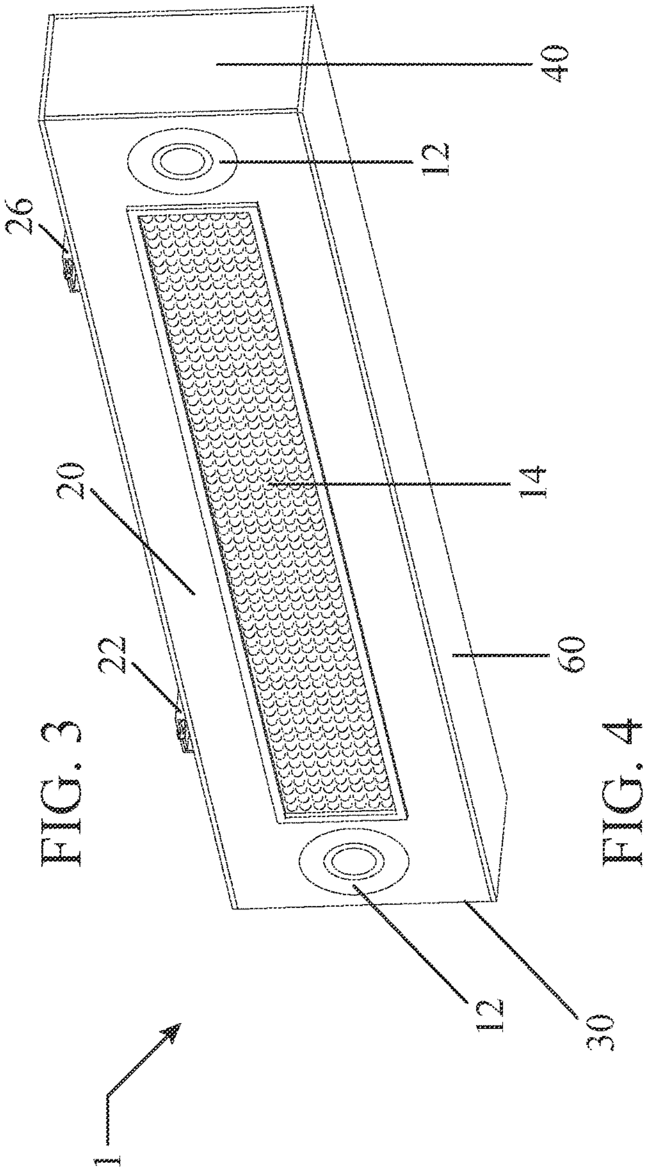
FIG. 3 is a lower front perspective view of the retractable holiday lights housing of FIG. 1.
Figure 4:
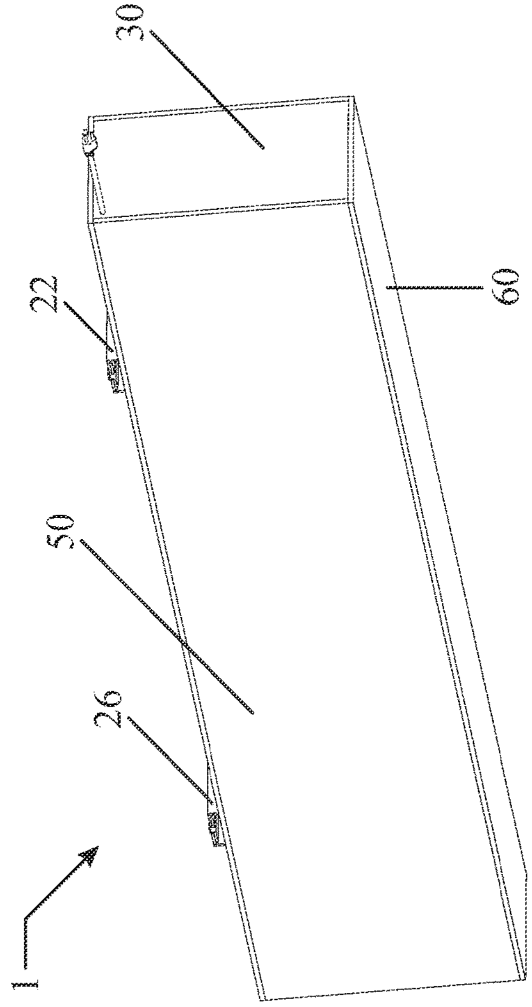
FIG. 4 is a lower rear perspective view of the retractable holiday lights housing of FIG. 1.
Figure 5:
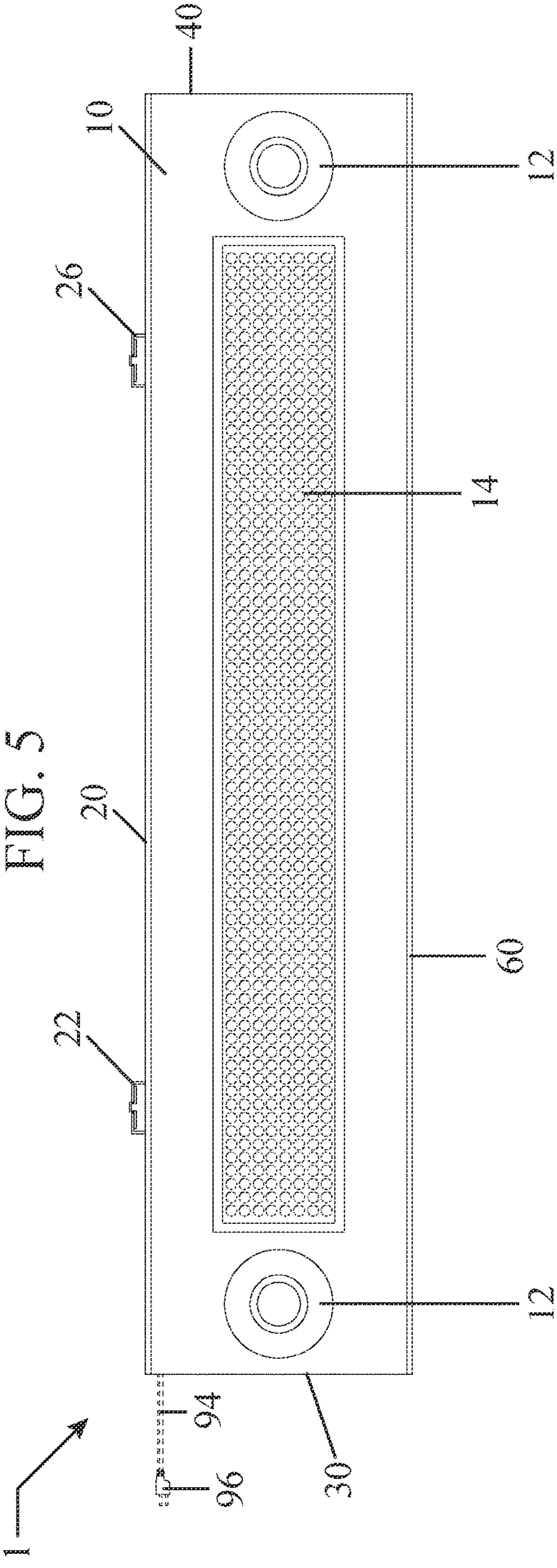
FIG. 5 is a front view of the retractable holiday lights housing of FIG. 1.
Figure 6:
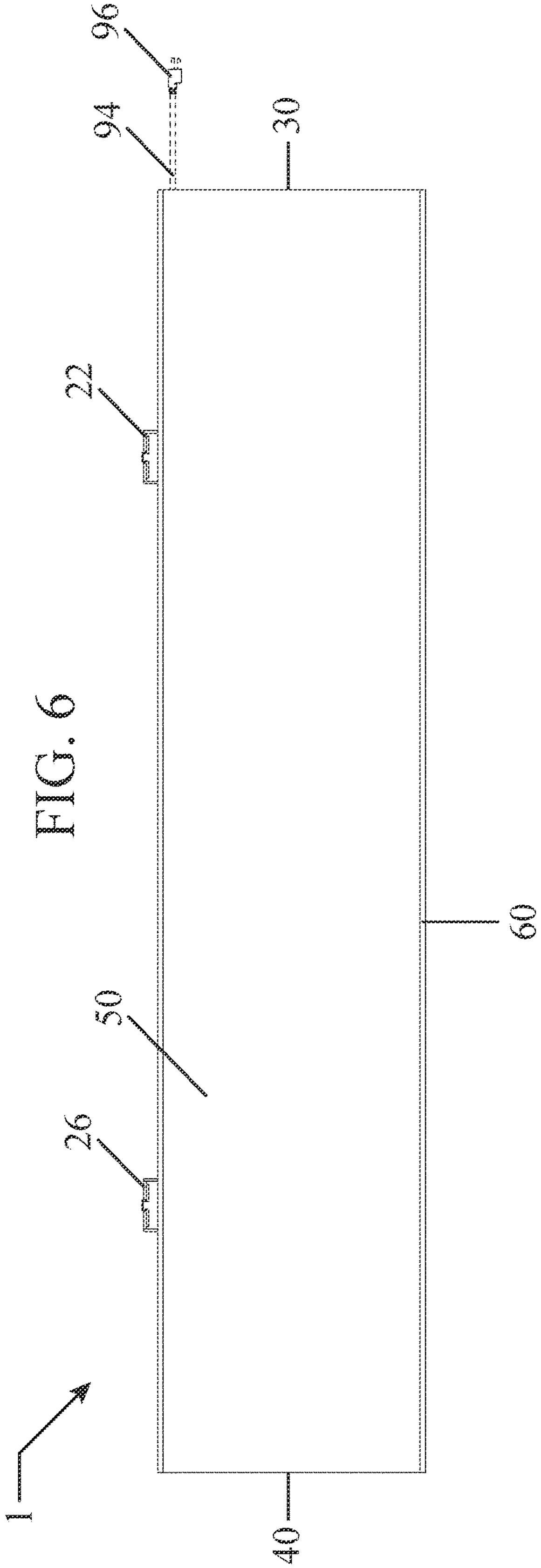
FIG. 6 is a rear view of the retractable holiday lights housing of FIG. 1.
Figure 7:
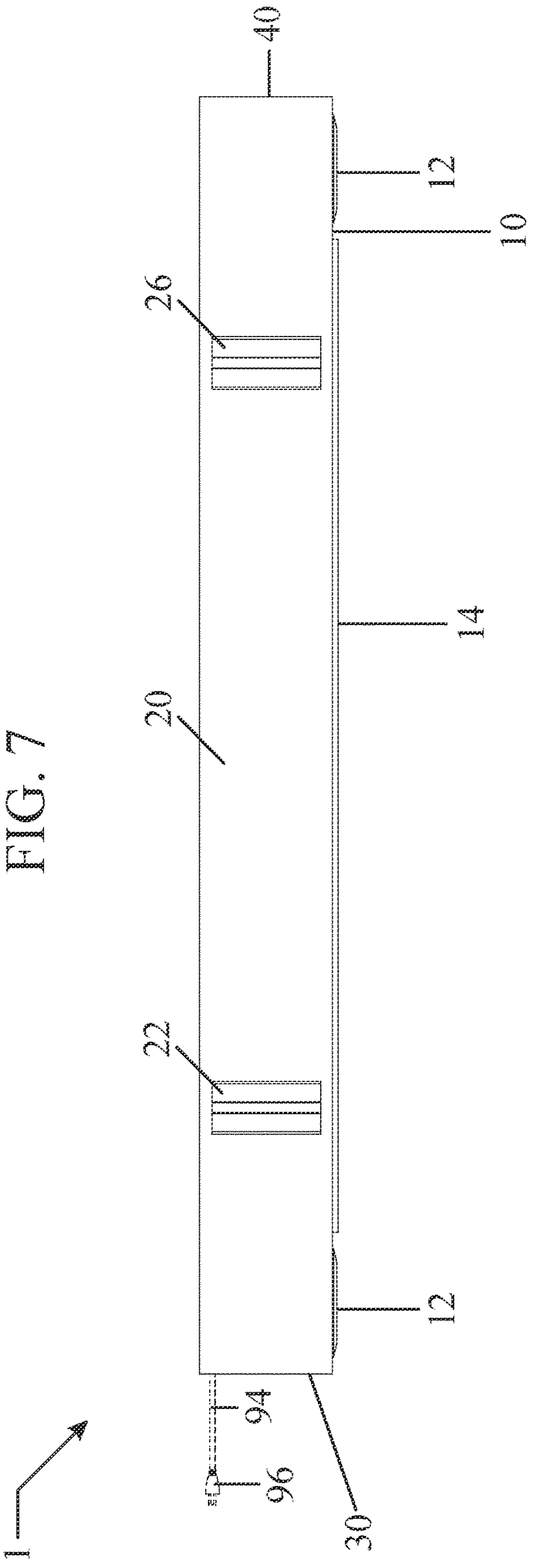
FIG. 7 is a top view of the retractable holiday lights housing of FIG. 1.
Figure 8:
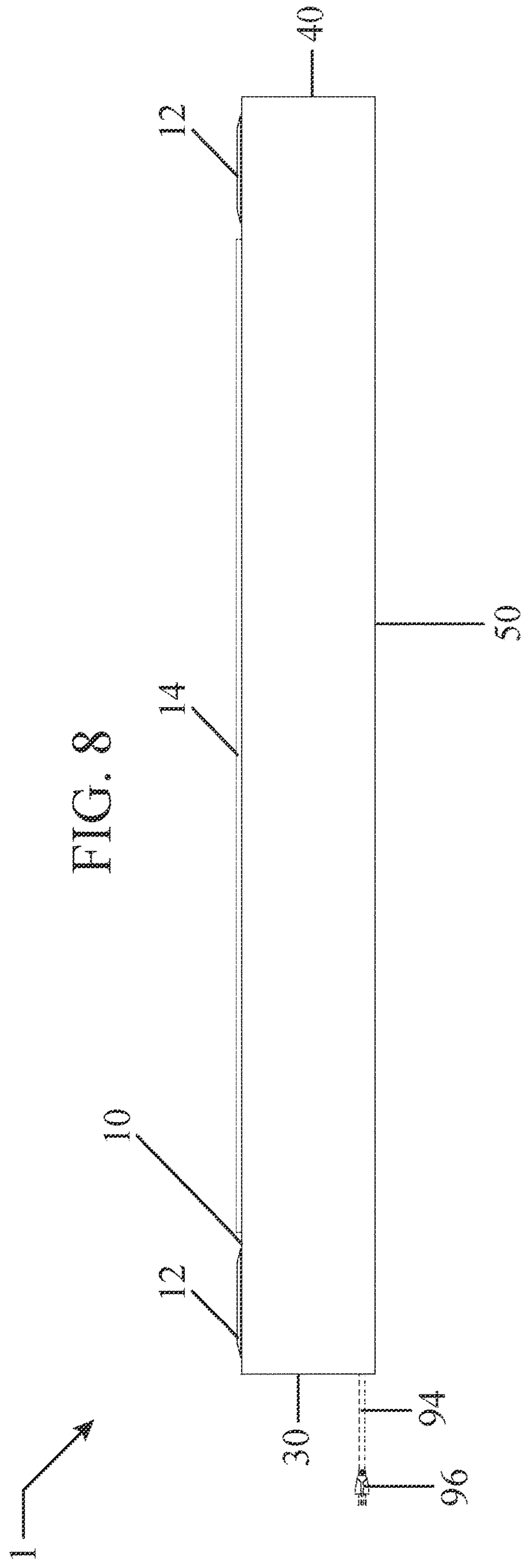
FIG. 8 is a bottom view of the retractable holiday lights housing of FIG. 1.
Figure 10:
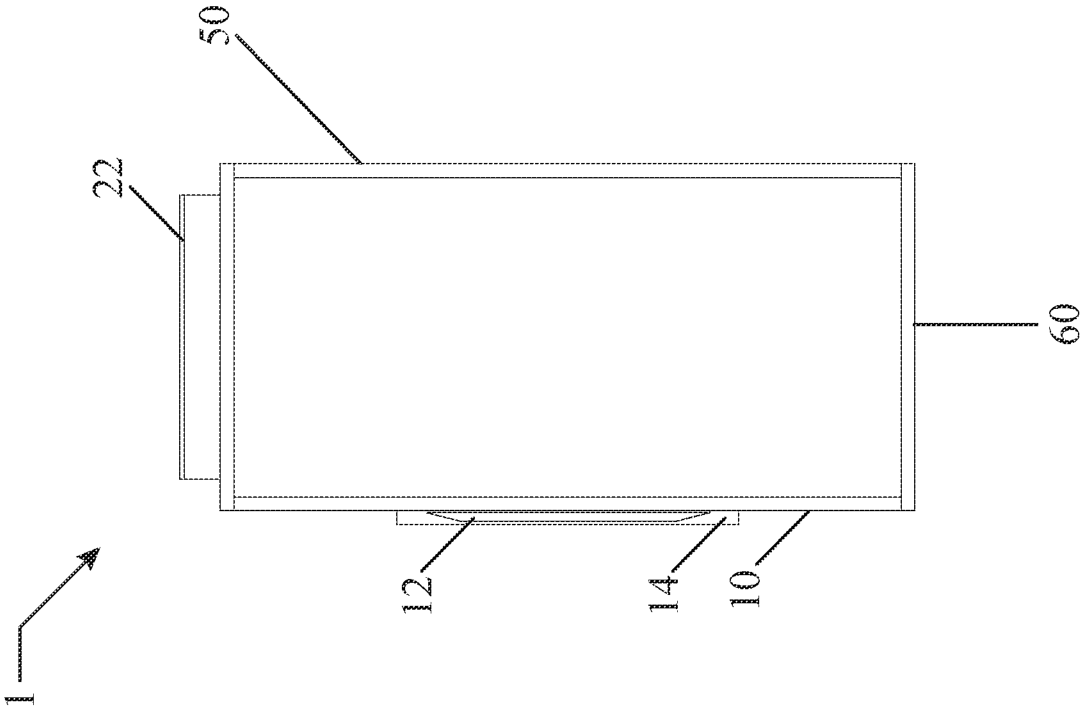
FIG. 10 is a right side view of the retractable holiday lights housing of FIG. 1.
Figure 9:
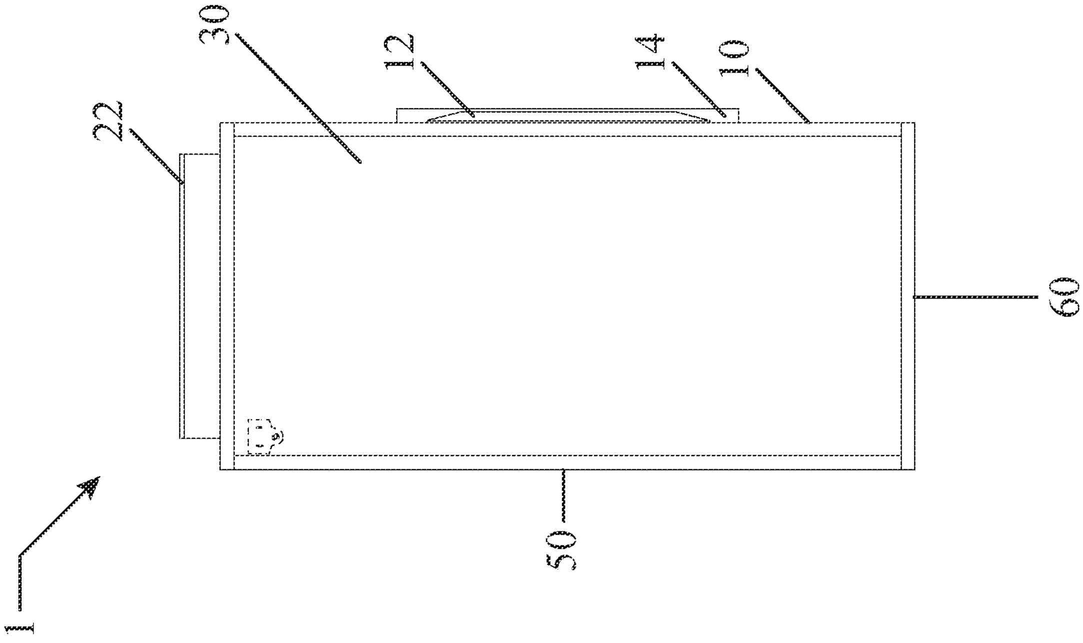
FIG. 9 is a left side view of the retractable holiday lights housing of FIG. 1.

1 retractable lights housing/box
10 front face panel
12 speakers
14 display
20 top panel
22 left top mount bracket
24 base mount bracket
26 right top mount bracket
30 left side panel
40 right side panel
50 rear panel
60 bottom panel/door
65 hinge
70 top platform
72 notched sides of top platform
74 lower platform with circuit board electronics
80 guide rails/tracks
81, 83 cables
82 left guide pulley
84 cable spool
88 right guide pulley
90 motor in motor housing
92 WI-FI and Electronics
94 power cord
95 spring/retractable power cord
96 plug
98 power supply/battery pack
100 icicle shaped light(s)
110 LEDs (light emitting diodes)
150 smart phone
160 master control unit
200 house application
210 eaves
220 windows
230 overhang
300 Drop down embodiment
310 front panel
315 speakers
320 rear panel
330 left panel
340 right panel
350 top
355 mount bracket
357 fasteners
360 bottom panel
365 plurality of through-holes
370 Moveable frame
375 threaded opening
378 tracks/guides
380 electric motor
385 power cord
390 threaded rod
400 plural lights
450 sign
500 Fold Out Embodiment
510 front panel
515 hinge
520 rear panel
530 left panel
540 right panel
550 top panel
555 Mount bracket
557 fasteners
560 bottom panel
570 rotatable frame
574 tab to open front panel
580 electric motor
585 power cord
590 pin for rotatable frame
600 lights
650 sign FIG. 1 is an upper front perspective view of the novel retractable holiday lights housing 1, with lights (not shown) retracted inside the housing 1. FIG. 2 is an upper rear perspective view of the retractable holiday lights housing 1 of FIG. 1. FIG. 3 is a lower front perspective view of the retractable holiday lights housing 1 of FIG. 1. FIG. 4 is a lower rear perspective view of the retractable holiday lights housing 1 of FIG. 1. FIG. 5 is a front view of the retractable holiday lights housing 1 of FIG. 1. FIG. 6 is a rear view of the retractable holiday lights housing 1 of FIG. 1. FIG. 7 is a top view of the retractable holiday lights housing 1 of FIG. 1. FIG. 8 is a bottom view of the retractable holiday lights housing 1 of FIG. 1. FIG. 9 is a left side view of the retractable holiday lights housing 1 of FIG. 1. FIG. 10 is a right side view of the retractable holiday lights housing 1 of FIG. 1.

Referring to FIGS. 1-10, the retractable lights housing 1 can include a front face panel 10 with one or more speakers 12 that can be located on opposite sides of a display screen 14. The display screen 14 can be a display of LEDs (light emitting diodes), neon lights, and the like. Alternatively, the display screen 14 can be a colored lens, and the like.

The retractable lights housing 1 can further include a top panel 20 having left top mount bracket 22 and right top mount bracket 26, a left side panel 30, a right side panel 40, a rear panel 50 and a hinged bottom panel/door 60.

Referring to FIGS. 1-10, the retractable lights housing 1 can have a generally rectangular box shape that can be made from aluminum, galvanized metal, plastic, and the like.

The box 1 can have a longitudinal length of approximately 2 feet to approximately 5 feet or more, and have a height of approximately 1 to approximately 2 feet, and a width of approximately 1 to approximately 1.5 feet. The box 1 can be sized to fit under an eave above a window opening, and the like. Additionally, the box 1 can have dimensions that have a width of a typical window width and a depth of less than the depth of an existing eave above a window, and a height that can fit in the space above a window.

The lights 100 can hang down up to approximately 10 inches or more, and be spaced apart from one another between approximately 2 to approximately 3 inches, less or more.

Figures 11, 12:
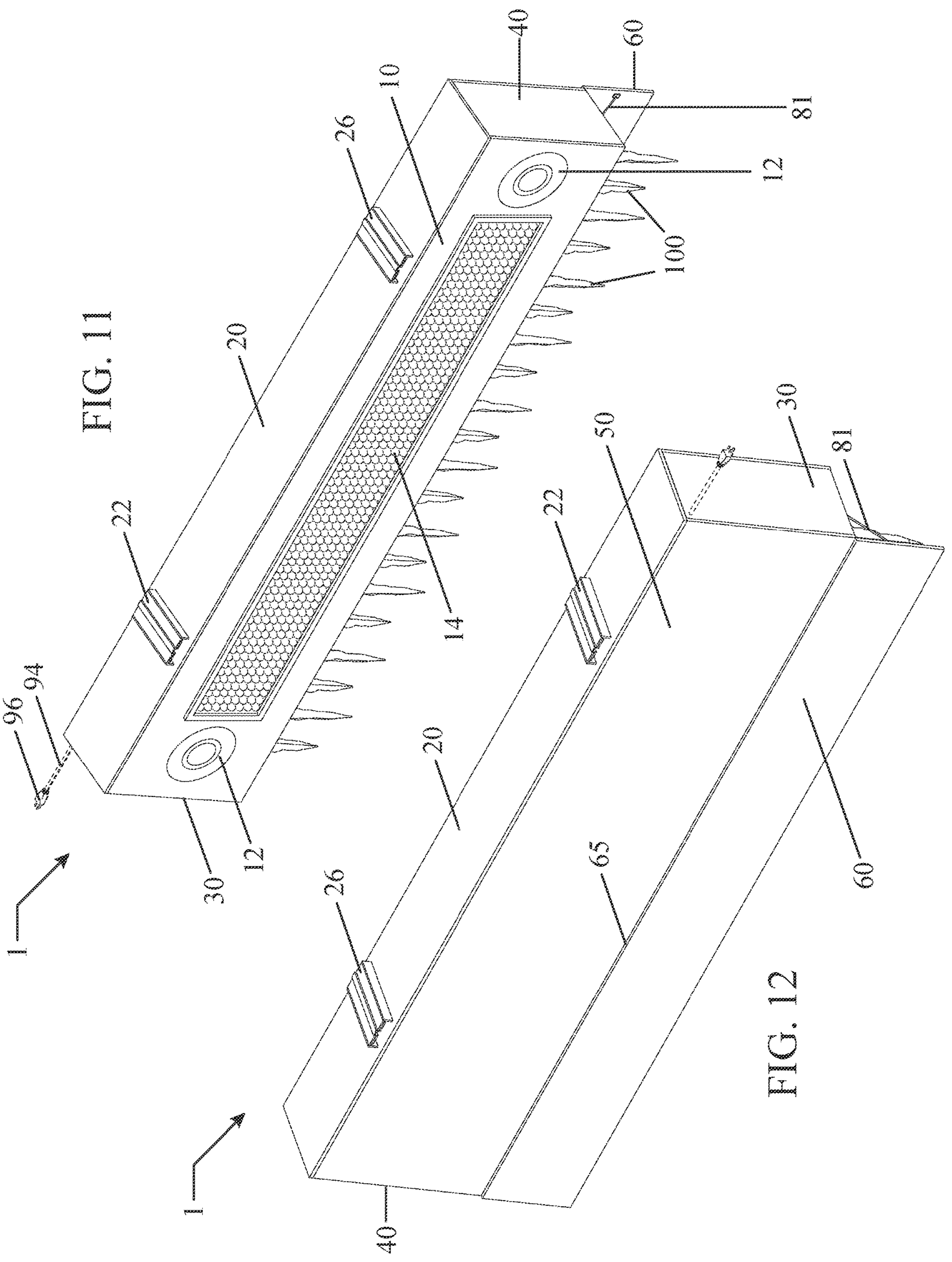
FIG. 11 is an upper front perspective view of the novel retractable holiday lights housing, with lights extended below the housing.
FIG. 12 is an upper rear perspective view of the retractable holiday lights housing of FIG. 11.
Figure 13:
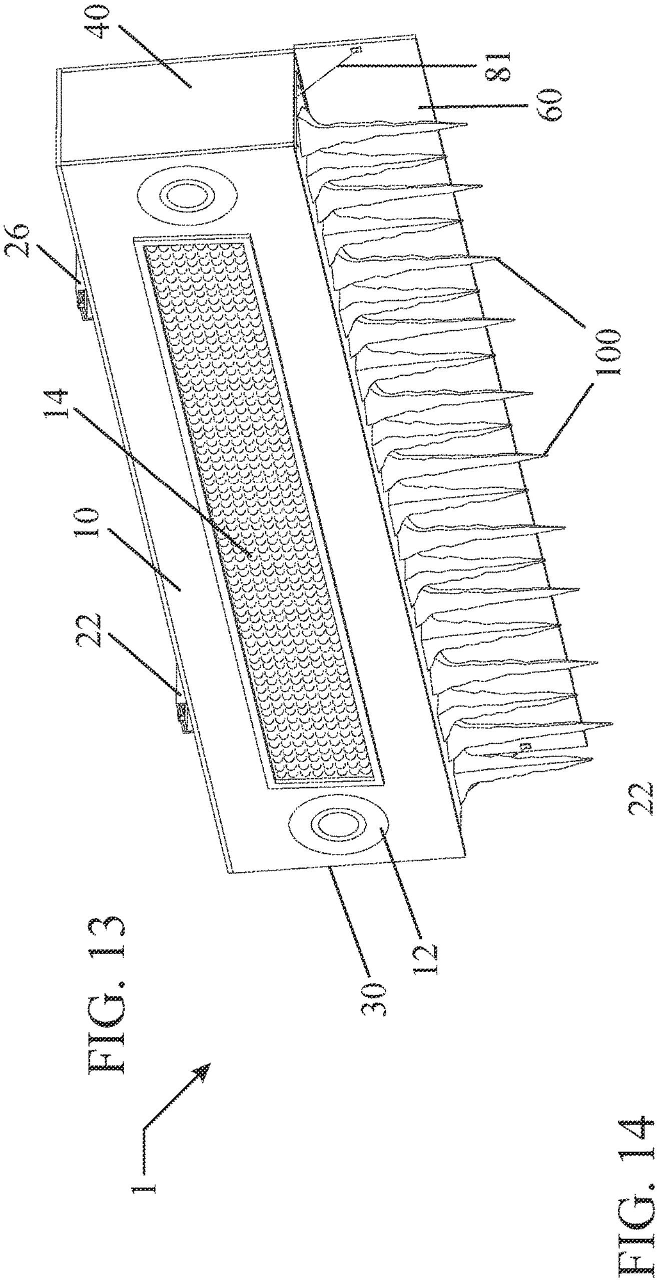
FIG. 13 is a lower front perspective view of the retractable holiday lights housing of FIG. 11.
Figure 14:
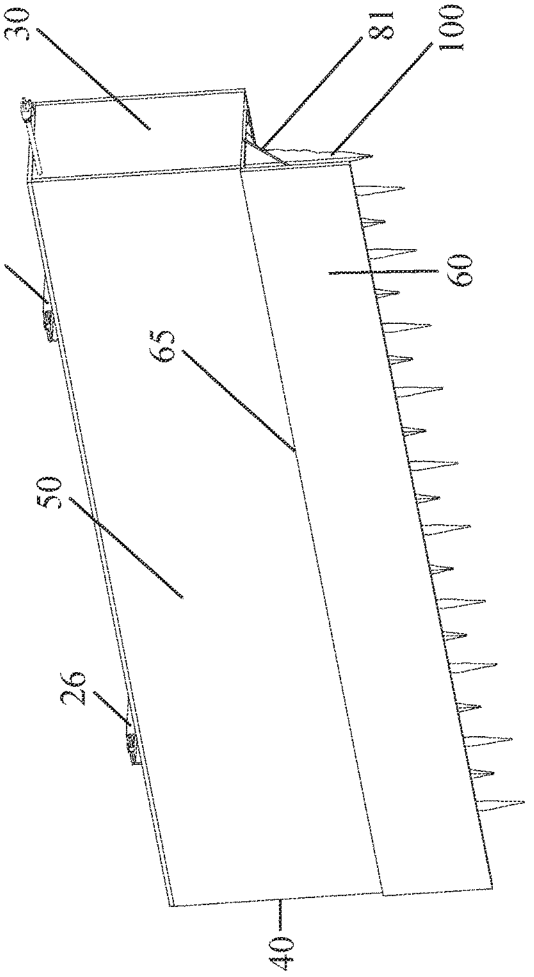
FIG. 14 is a lower rear perspective view of the retractable holiday lights housing of FIG. 11.
Figure 15:
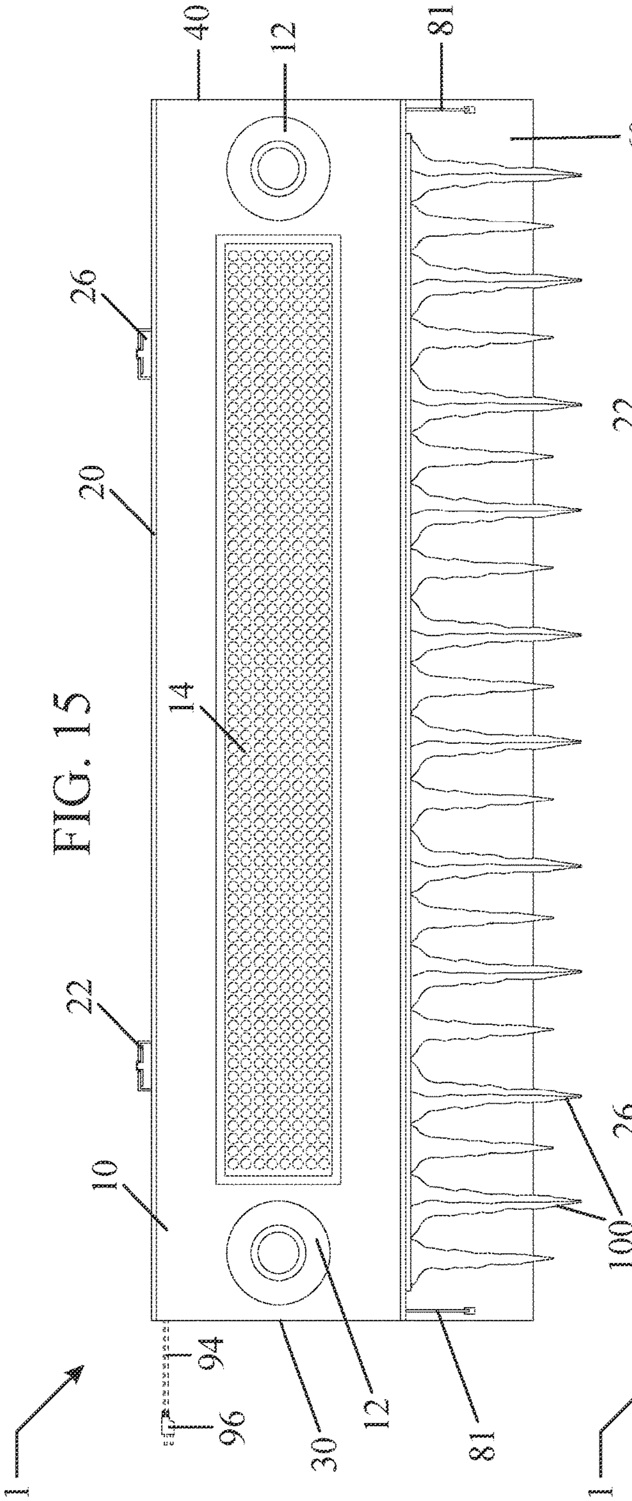
FIG. 15 is a front view of the retractable holiday lights housing of FIG. 11.

FIG. 11 is an upper front perspective view of the novel retractable holiday lights housing 1, with lights 100 extended below the housing 1. FIG. 12 is an upper rear perspective view of the retractable holiday lights housing 1 of FIG. 11. FIG. 13 is a lower front perspective view of the retractable holiday lights housing 1 of FIG. 11. FIG. 14 is a lower rear perspective view of the retractable holiday lights housing 1 of FIG. 11. FIG. 15 is a front view of the retractable holiday lights housing 1 of FIG. 11.

Figure 16:
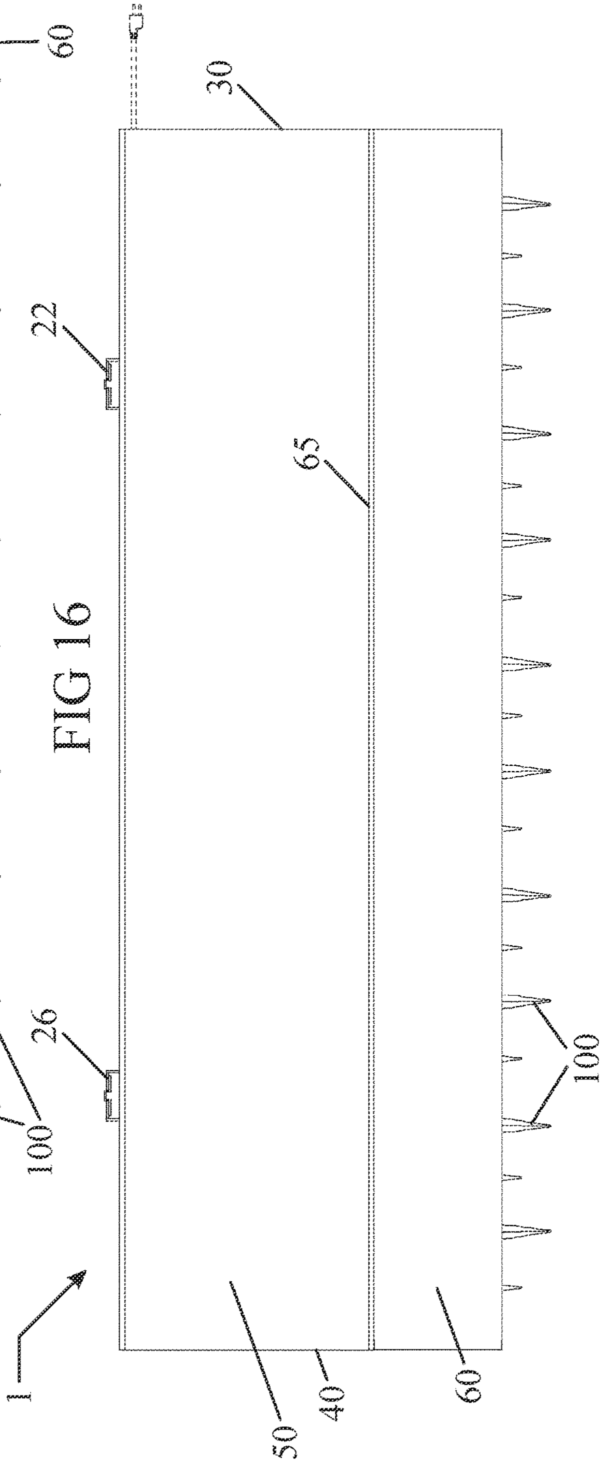
FIG. 16 is a rear view of the retractable holiday lights housing of FIG. 11.
Figure 17:
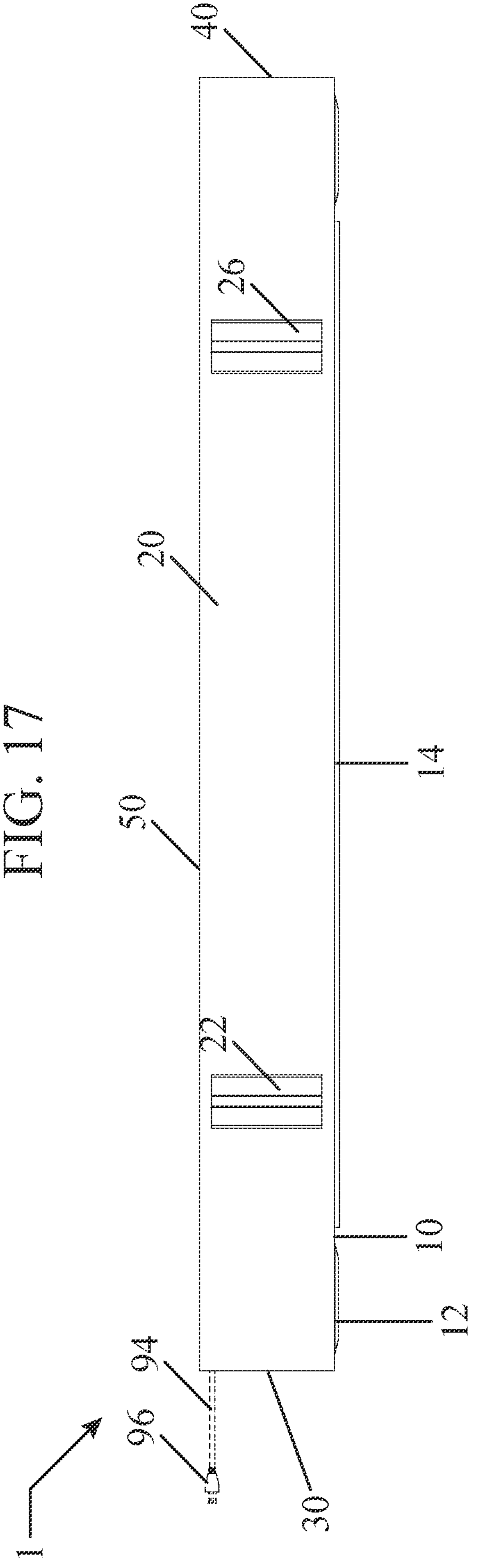
FIG. 17 is a top view of the retractable holiday lights housing of FIG. 11.
Figure 18:
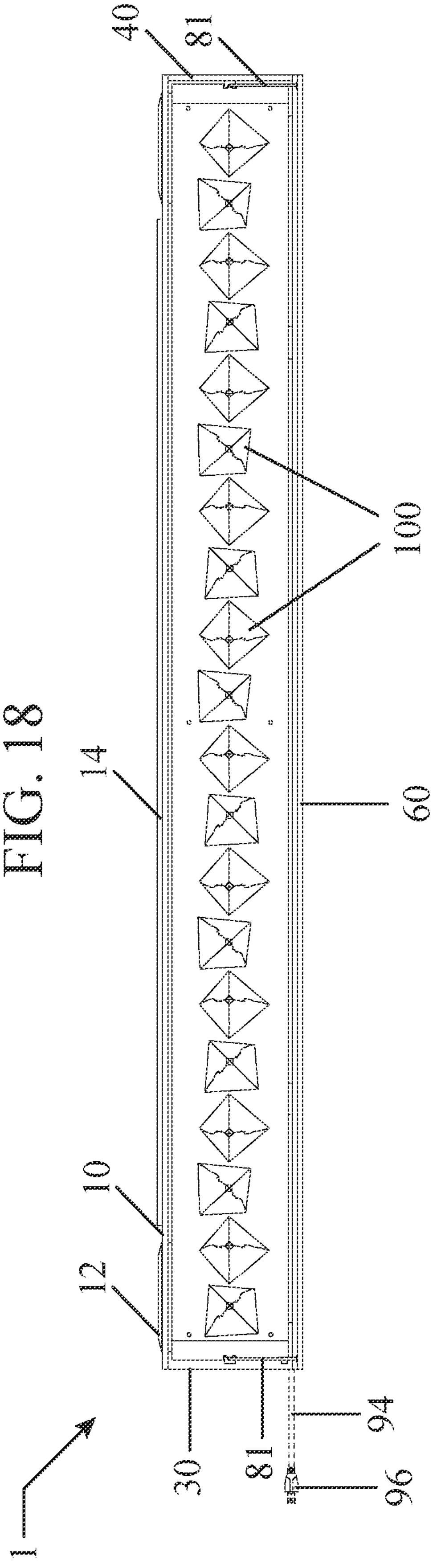
FIG. 18 is a bottom view of the retractable holiday lights housing of FIG. 11.
Figure 19:
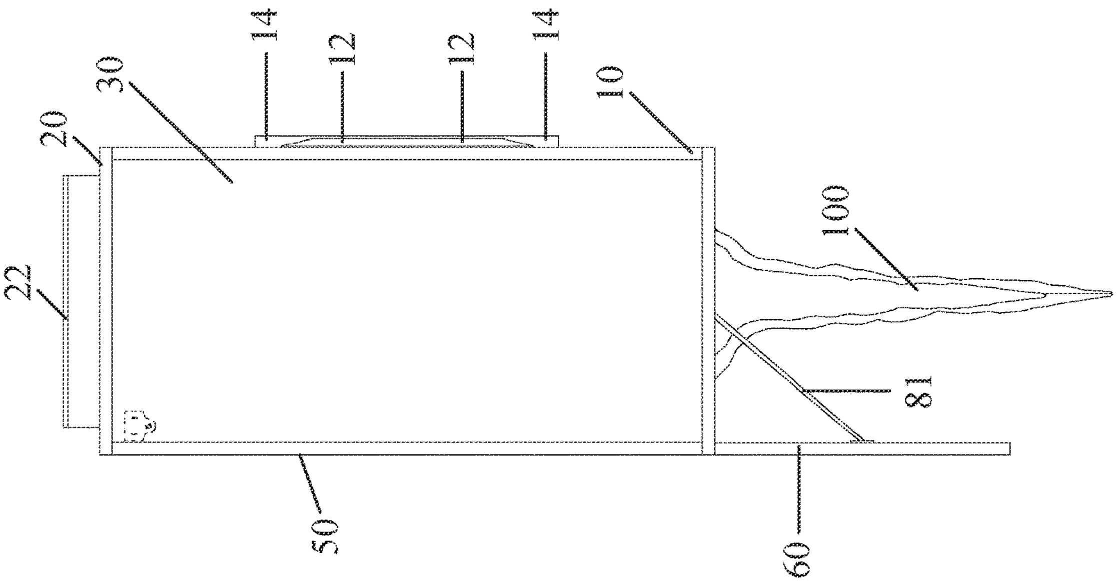
FIG. 19 is a left side view of the retractable holiday lights housing of FIG. 11.
Figure 20:
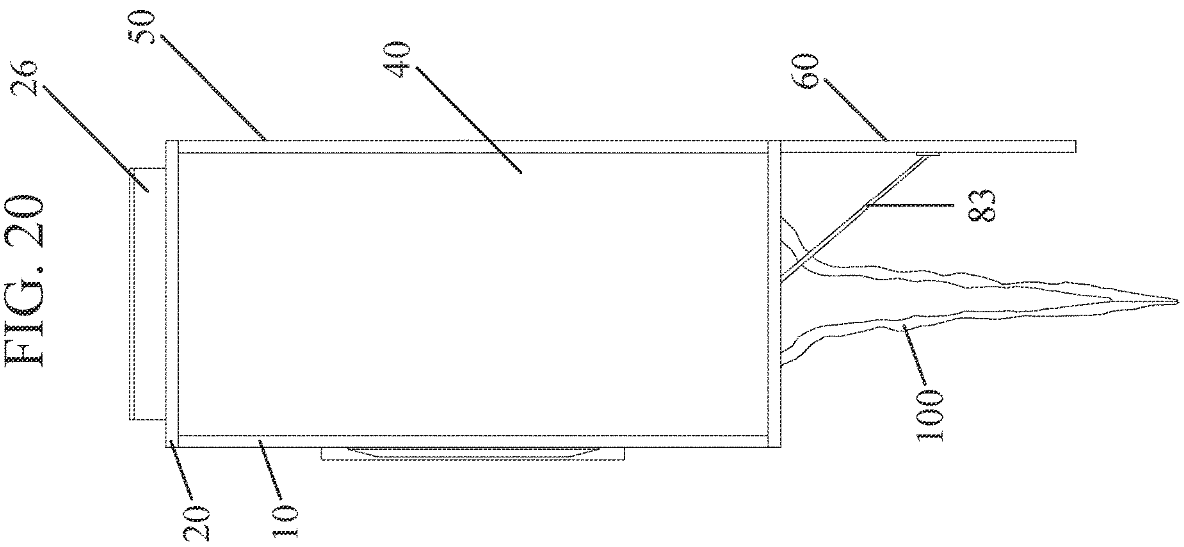
FIG. 20 is a right side view of the retractable holiday lights housing of FIG. 11.

FIG. 16 is a rear view of the retractable holiday lights housing 1 of FIG. 11. FIG. 17 is a top view of the retractable holiday lights housing 1 of FIG. 11. FIG. 18 is a bottom view of the retractable holiday lights housing 1 of FIG. 11. FIG. 19 is a left side view of the retractable holiday lights housing 1 of FIG. 11. FIG. 20 is a right side view of the retractable holiday lights housing 1 of FIG. 11.

Referring to FIGS. 11-20, in an extended position for the retractable housing 1 the bottom panel/door 60 opens on a hinge 65 based on the lowering of the icicles 100 from a cable 81 which will be shown and described in greater detail in the next figures.

Figure 21:
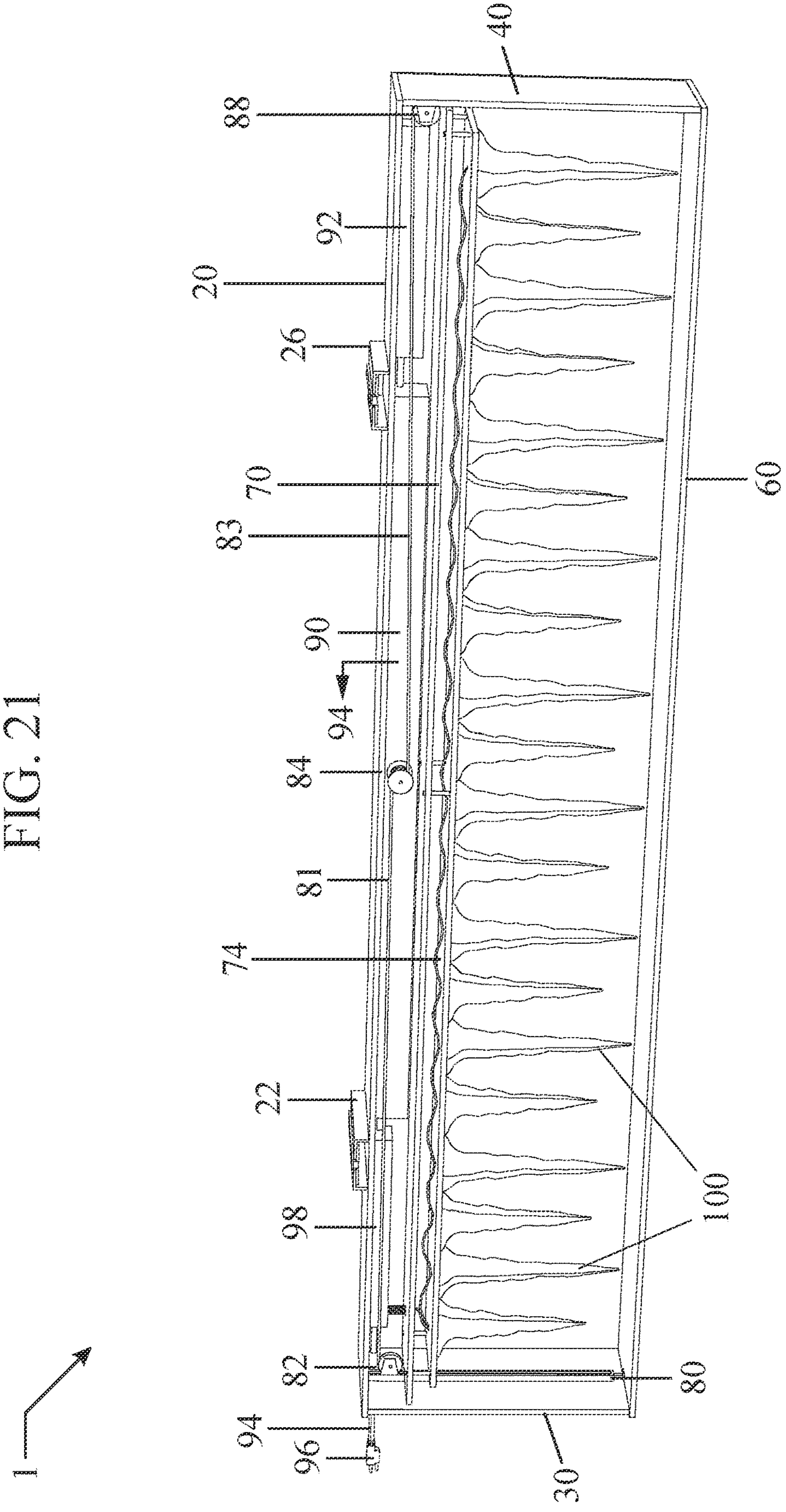
FIG. 21 is a front perspective view of the housing of FIG. 1 with the front face removed.
Figure 22:
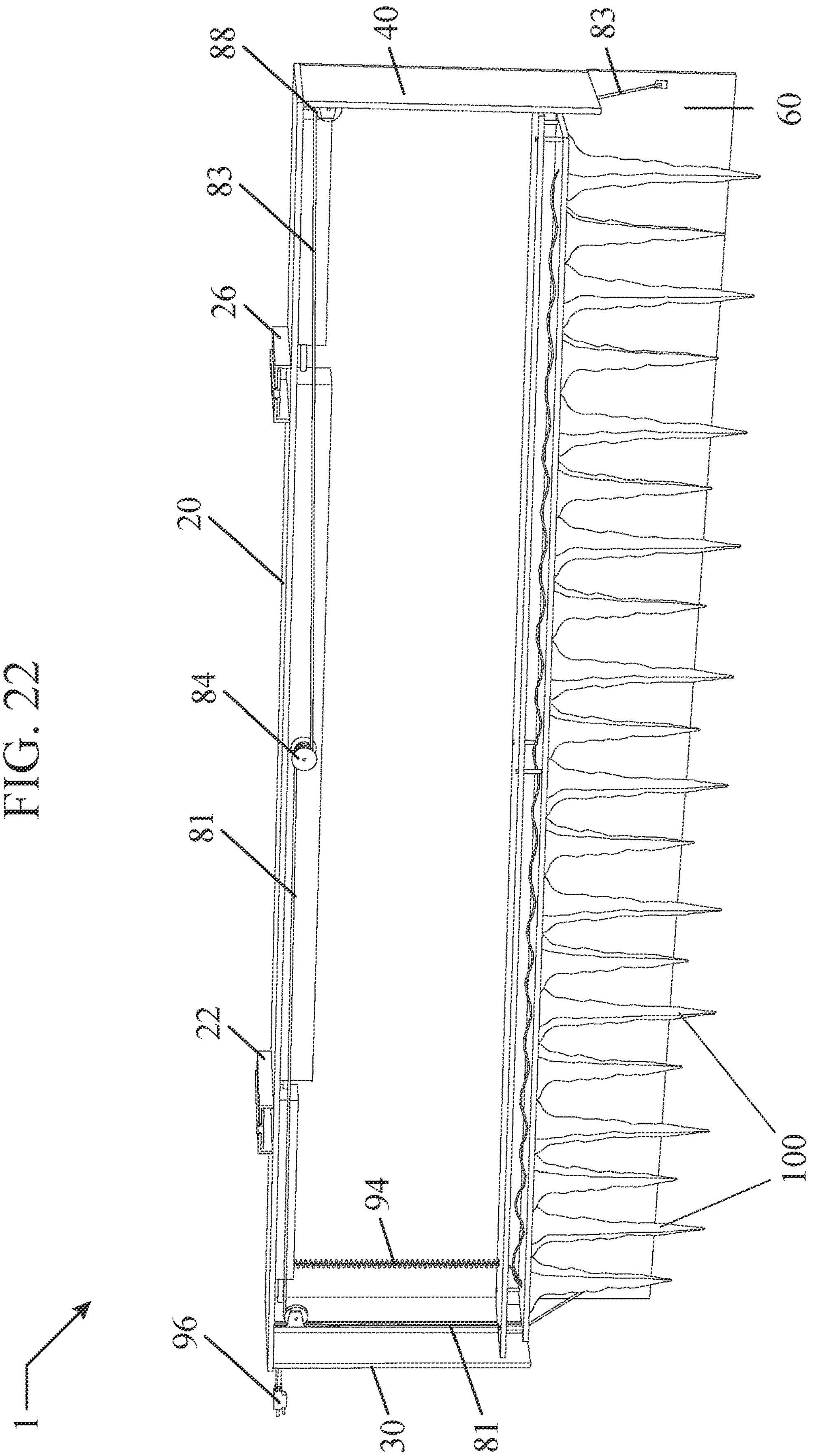
FIG. 22 is a front perspective view of the housing of FIG. 11 with the front face removed.
Figure 23:
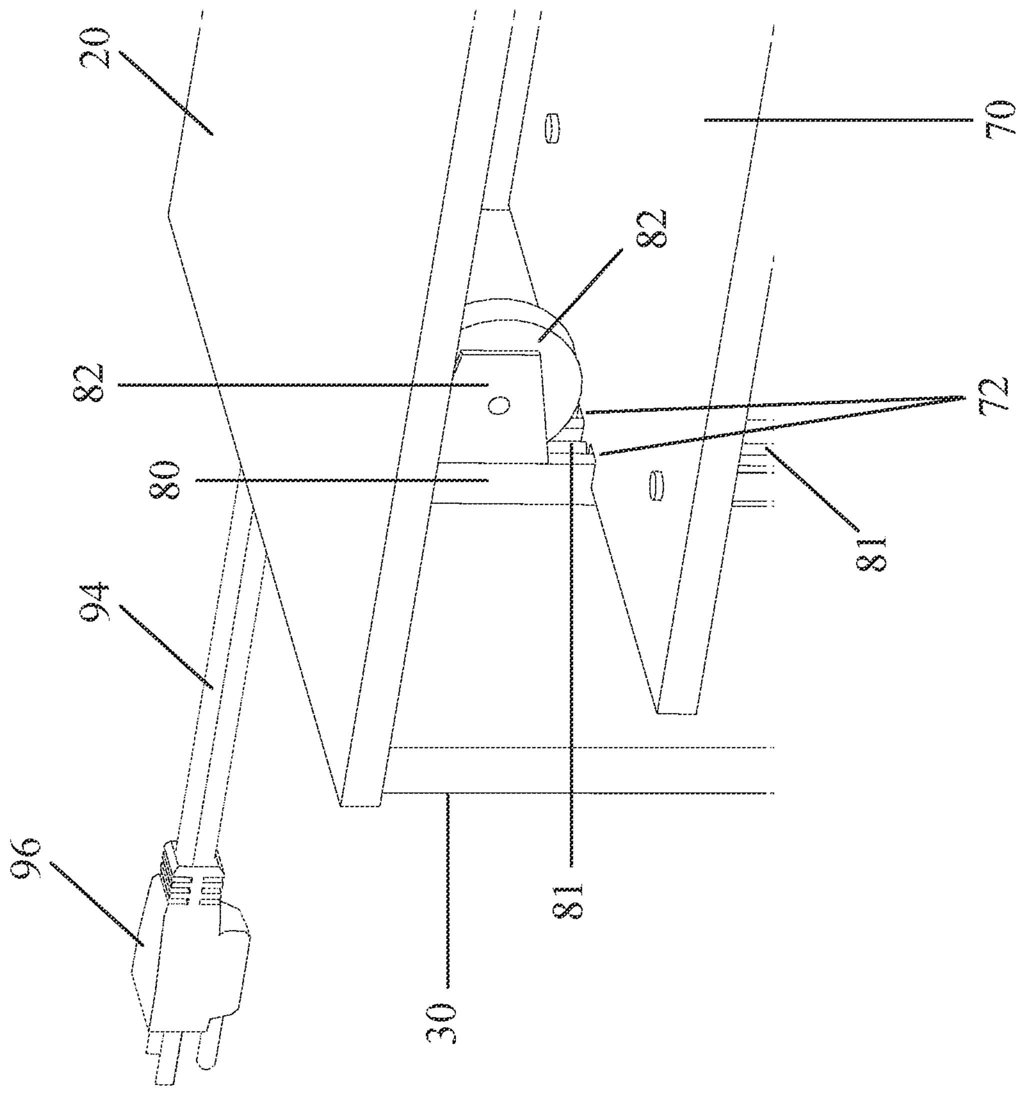
FIG. 23 is an enlarged perspective view of an inside portion within the housing of FIG. 1.
Figures 24A, 24B, 24C:
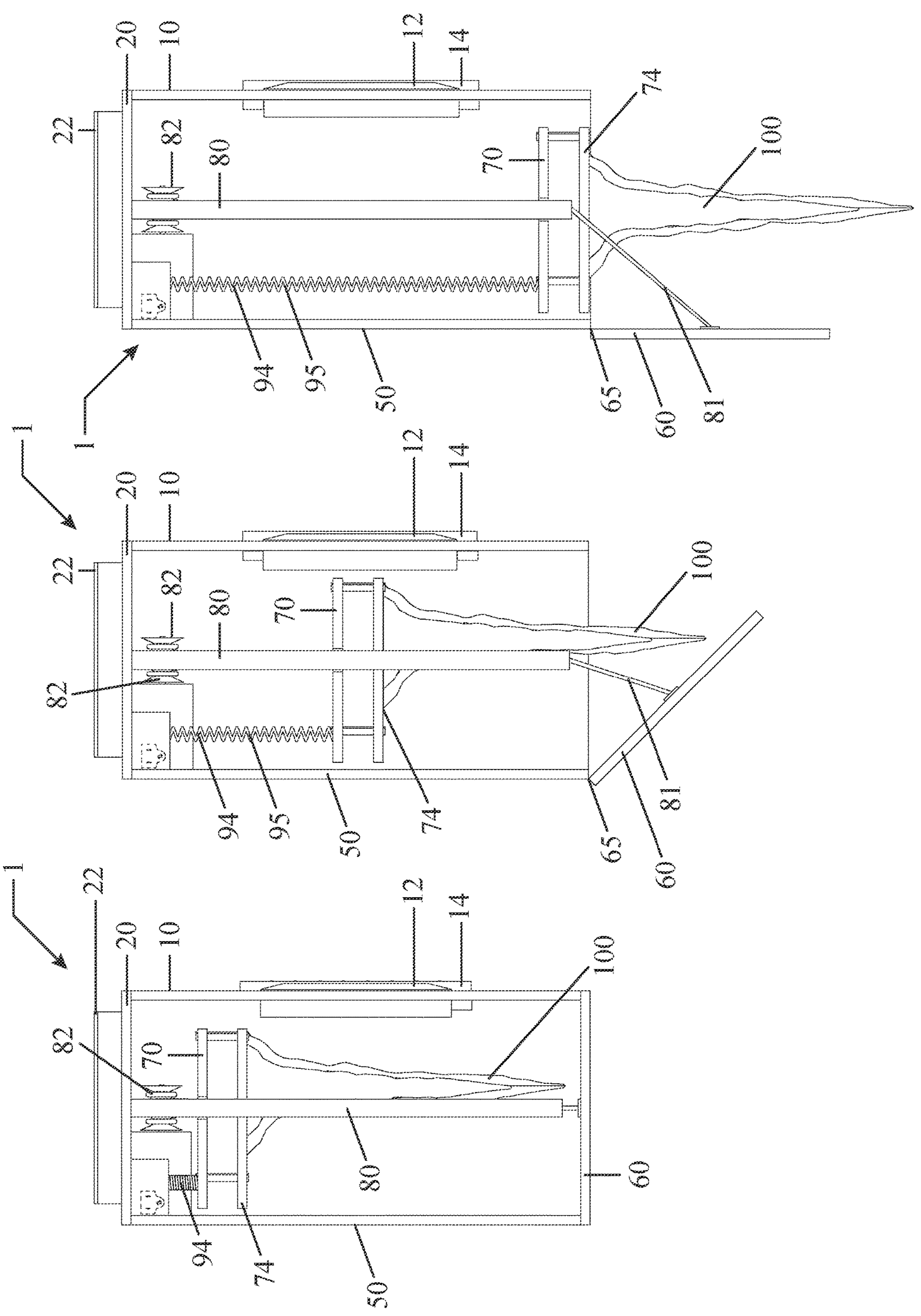
FIG. 24A is a side cross-sectional view of the housing of FIG. 1.
FIG. 24B is another side cross-sectional view of the housing of FIG. 24A with the lower door half open and the lights beginning to extend below the housing.
FIG. 24C is another side cross-sectional view of the housing of FIG. 24B with the lower door fully open and the lights fully extended below the housing.

FIG. 21 is a front perspective view of the housing 1 of FIG. 1 with the front face panel 10 removed. FIG. 22 is a front perspective view of the housing 1 of FIG. 11 with the front face panel 10 removed. FIG. 23 is an enlarged perspective view of an inside portion within the housing 10 of FIG. 1. FIG. 24A is a side cross-sectional view of the housing 1 of FIG. 1 with the lights 100 in a retracted position inside the housing 1. FIG. 24B is another side cross-sectional view of the housing 1 of FIG. 24A with the lower door 60 half open on its' hinge 65 and the lights 100 beginning to extend below the housing 1. FIG. 24C is another side cross-sectional view of the housing 1 of FIG. 24B with the lower door 60 fully open and the lights 100 fully extended below the housing 1.

Referring to FIGS. 1-24C, an electric type motor powered by power cord 94 that can be plugged 96 in a household power supply, can rotate a cable spool 84 that can wind and unwind one or two cables 81, 83 thereon. The outer end(s) of the cables 81, 83 can be attached to both a side of top platform 70 followed by outer ends that can be attached to a bottom panel/door 60 that can be hinged 65 against the bottom edge of a rear panel 50. As the spool 84 unwinds, the cables 81, 83 can lower the platform 70 with the lights 100 downward, while opening bottom panel/door 60, until the lights 100 extend below box 1.

Reversing the rotation of spool 84 can pull up both cables 81, 83 and raise the platform 70 with downwardly extending lights 100 and close bottom panel/door 60. A left rail pulley 82 and right rail pulley 88 can orient outer the cables 81, 83 to fit about sides of the platform 70. The sides of the platform 70 can have notches 72 to allow the platform 70 to slide about the guide rails/tracks 80.

The wall plug 92 can also be used to charge a battery type power supply pack 98 to run motor 90.

Figure 25B:
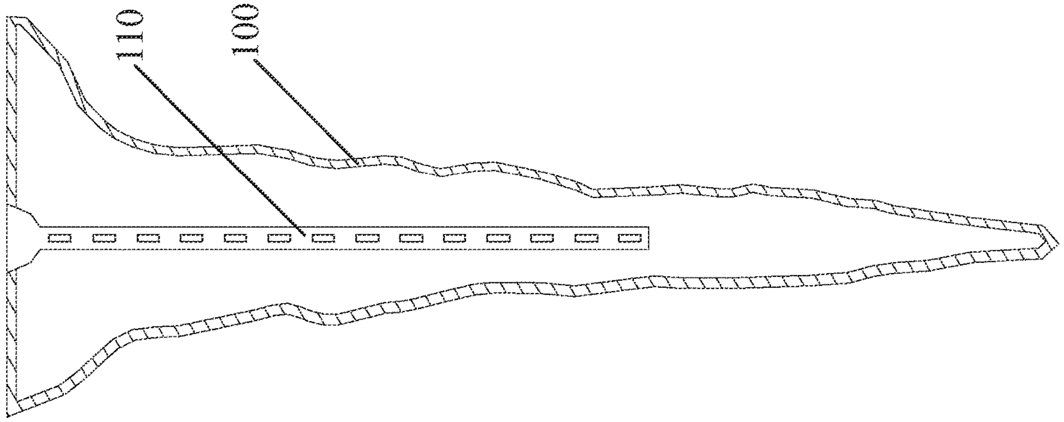
FIG. 25B is a cross-sectional view of the light of FIG. 25A.
Figure 25A:
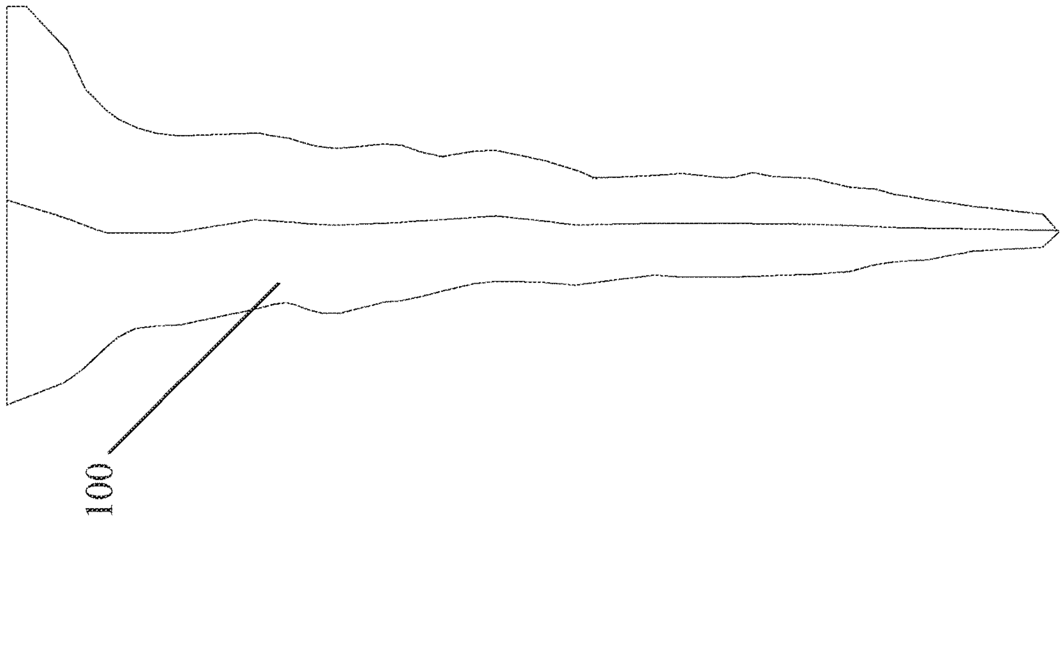
FIG. 25A is an enlarged view of one of the lights of the preceding figures.

FIG. 25A is an enlarged view of one of the lights 100 of the preceding figures. FIG. 25B is a cross-sectional view of the light 100 of FIG. 25A.

Referring to FIGS. 21-25B, the lights 100 can have decorative shapes, such as an icicle shape. Inside can be a plurality of lights 110, such as light emitting diodes (LEDS) and the like. The lights 110 can be white and/or include different decorative colors, such as but not limited to red, blue, yellow, green, and the like.

Figure 26:
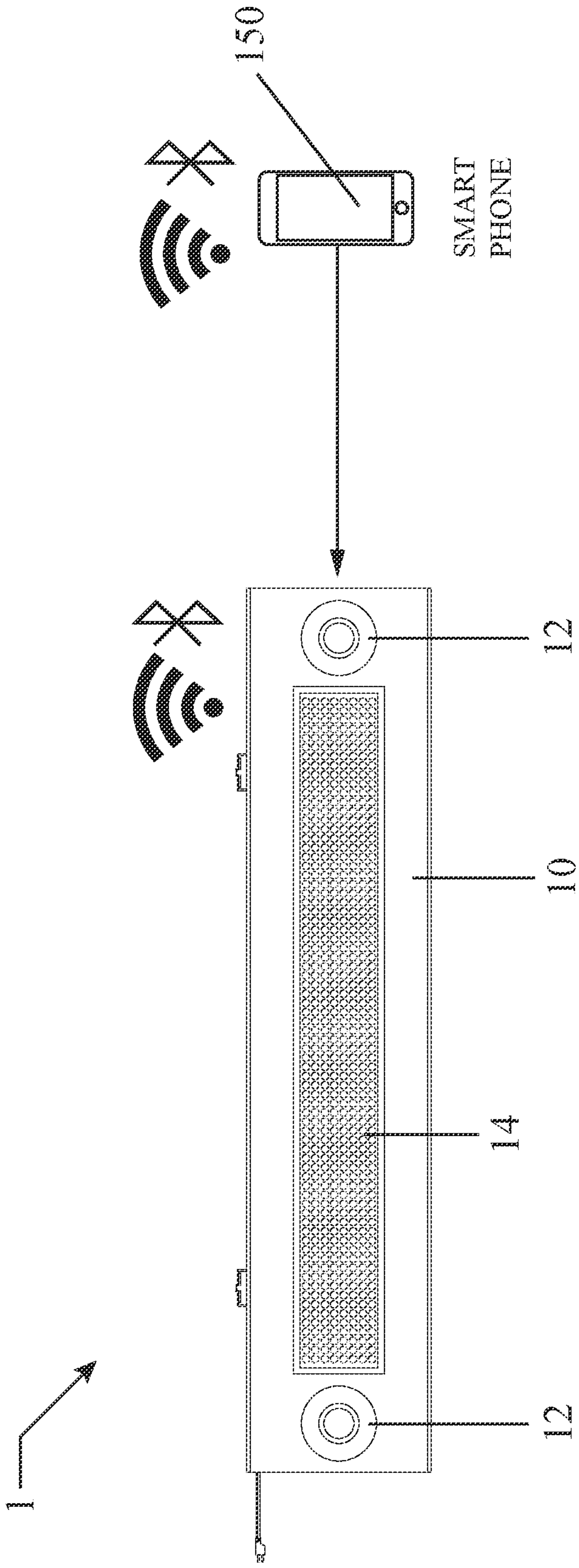
FIG. 26 shows the retractable lights housing of the preceding figures with a smart phone control.
Figure 27:
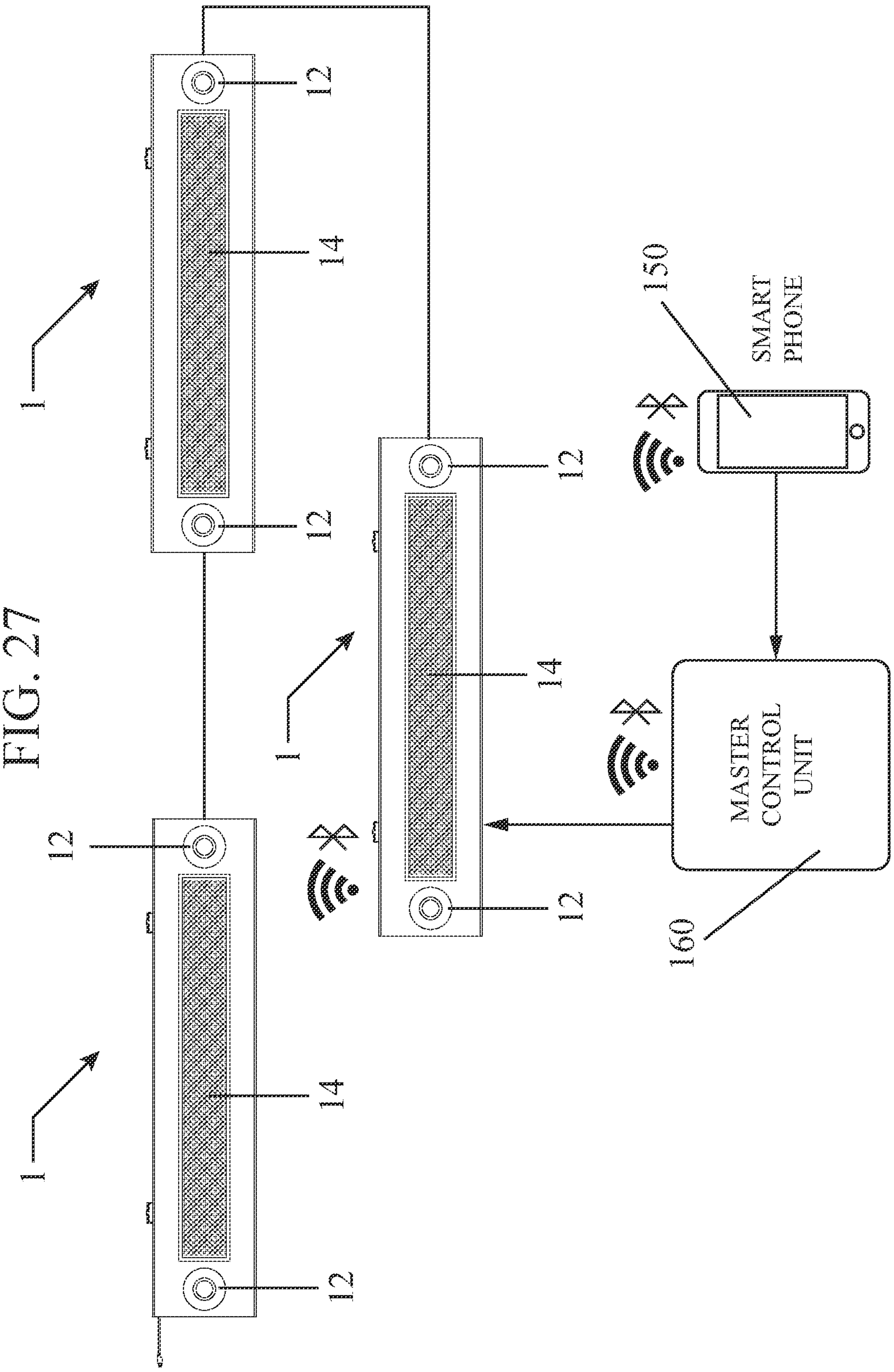
FIG. 27 shows a plurality of retractable lights housings of the preceding figures with a smart phone control.

FIG. 26 shows the retractable lights housing 1 of the preceding figures with a smart phone control 150. FIG. 27 shows a plurality of retractable lights housings 1 of the preceding figures with a master control unit 160 and smart phone 150.

Referring to FIGS. 21-27, the retractable light housing(s) 1 can be operated remotely, such as but not limited to a smart phone 150 and the like. A series of retractable light housing(s) 1 can be connected in series which can each be separately remotely controlled by a master control unit 160 which can be remotely controlled by a smart phone 150. The lights 100 can be supported by a lower platform 74 having a circuit board thereon, and control of turning the lights on and off and operating both the speakers 12 and display 14 can be operated remotely using connections, such as but not limited to WI-FI and the like.

The display 14 can display selected messages, such as but not limited to Merry Christmas, Happy New Year, Happy Birthday, and the like. The speaker(s) 12, can play selected music, such as but not limited to holiday music and the like, that can be downloaded from the web or from a smart phone, and the like. The individual lights can light up in sequence with music playing on the speakers.

The controls for the smart phone 150 for the lights 100 and speakers 12 can be similar to those shown and described in U.S. Patent Application Publications: 2014/0091719 to Tsai; 2016/0215971 to Silver et al.; 2015/0102731 to Altamura et al., and U.S. Pat. No. 6,984,944 to Garrity, which are all incorporated by reference in their entirety. The display 14 can include message displays, such as those shown and described in U.S. Pat. No. 7,825,790 to Tallinger, which is incorporated by reference in its' entirety.

FIG. 28A is an exploded side view of the mounting hardware 22/26 and 24 that can be used to support the retractable lights housing 1. FIG. 28B is a perspective view of mounting hardware 22/26 and 24 of FIG. 26A assembled.

Figure 29:
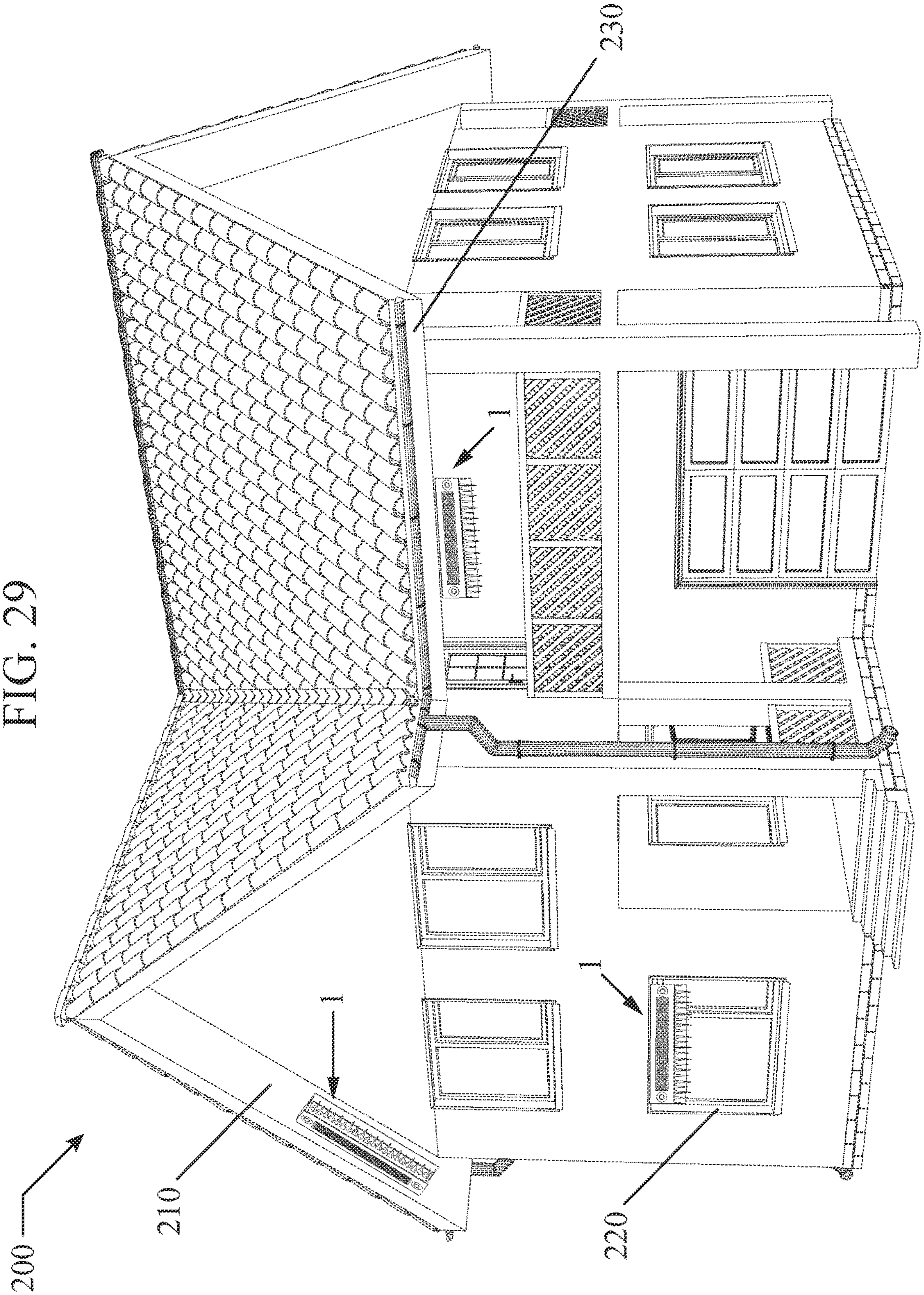
FIG. 29 is a perspective view of a house with a plurality of the retractable lights housings of the preceding figures mounted adjacent to windows and under an overhanging eave.

FIG. 29 is a perspective view of a house 200 with a plurality of the retractable lights housings 1 of the preceding figures mounted adjacent to windows 220 and under an eave 210 and/or overhang 230.

Referring to FIGS. 28A-29, the retractable light housing(s) 1 can be mounted in multiple locations, where the base mount 24 is attached to a structure, such on an eave 210, on top of a window 220 and/or under an overhang 230. The top mounts 22/26 which are pre-attached to the top of the housings 1 can be slide sideways over the pre-attached base mounts 24.

The retractable lights housing 1 can be weatherproofed and sealed to eliminate any water seepage inside. The bottom panel/door 60 can also have seals when closed to eliminate any small animals, such as but not limited to squirrels and the like, birds, and the like, or insects from entering inside when the bottom panel/door 60 is in a closed position.

The easy attachable mounts 22/26 and 24 allows for the retractable lights housing to be easily installed when needed in a short time and allows the housing 1 to be easily removed and stored away.

Although the display 14 is described for having messages, such as holiday greetings, birthday greetings, and the like, other types of messages can be displayed. For example, the display can provide information for first responders, such as but not limited to fireman, paramedics, police, and the like, by having messages, such as but not limited to "HELP", "SEND HELP", "FIRE", "MEDICAL EMERGENCY" and the like. The display can also generate the house address so that the house 200 is easy to locate in the dark or during bad weather conditions.

While FIG. 29 shows the retractable lights housing 1 outside of a window 220, the retractable lights housing 1 can be mounted inside of the window 220 on the inside of the building 200.

Drop Down Embodiment

Figure 31:
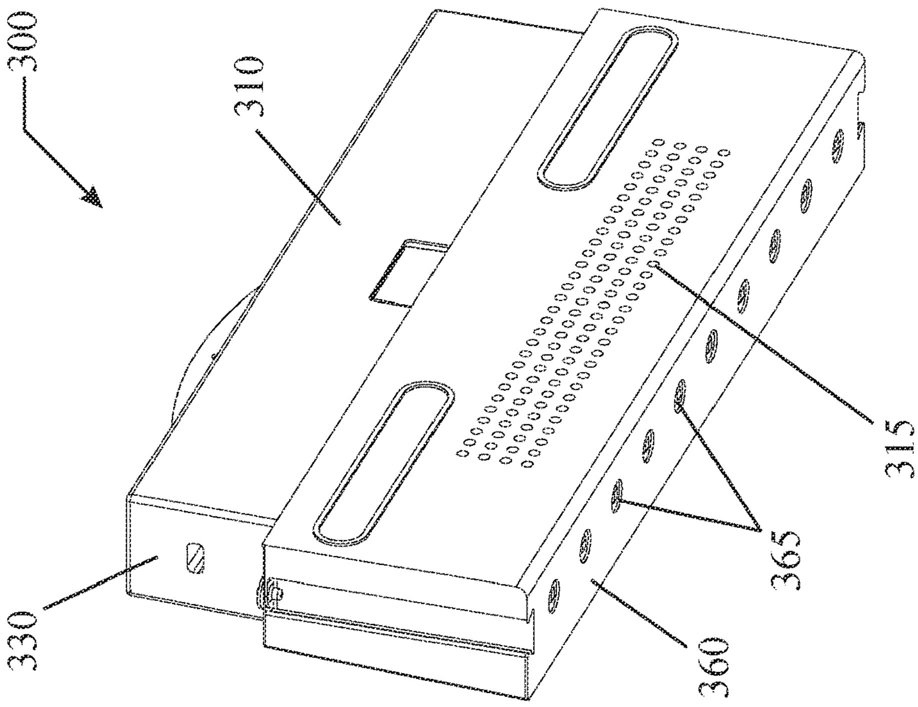
FIG. 31 is a lower front perspective view of FIG. 30
Figure 30:
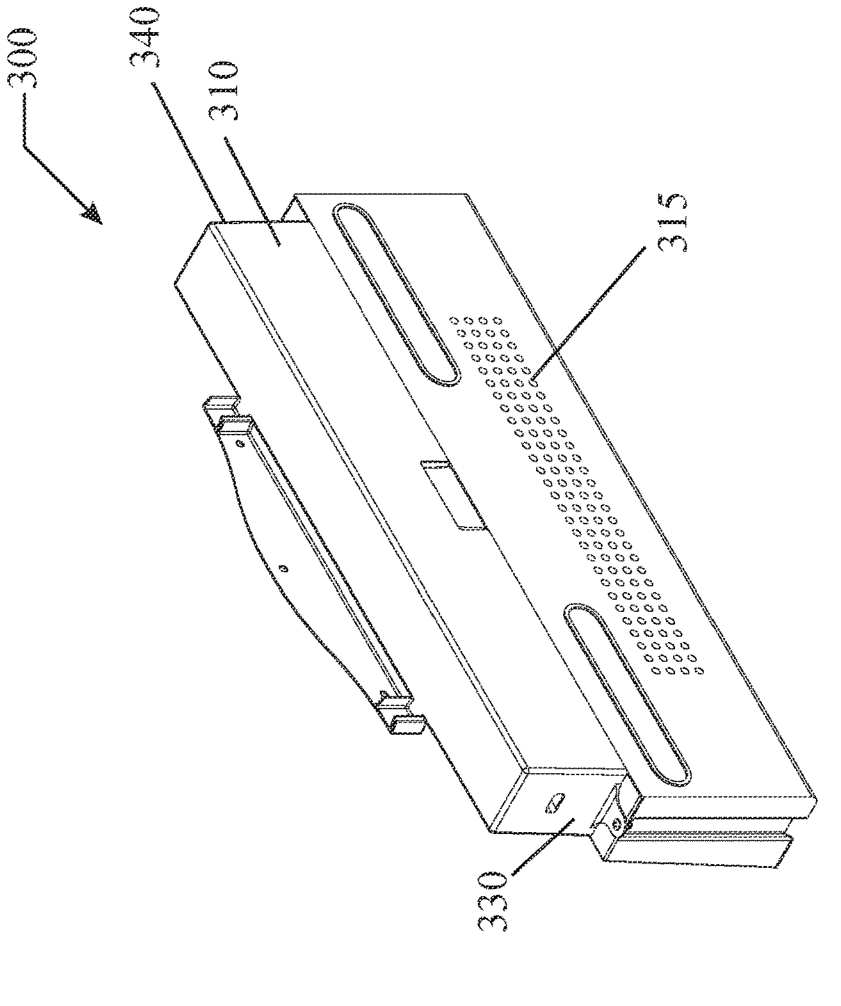
FIG. 30 is an upper front perspective view of a drop down retractable lighting embodiment.
Figure 33:
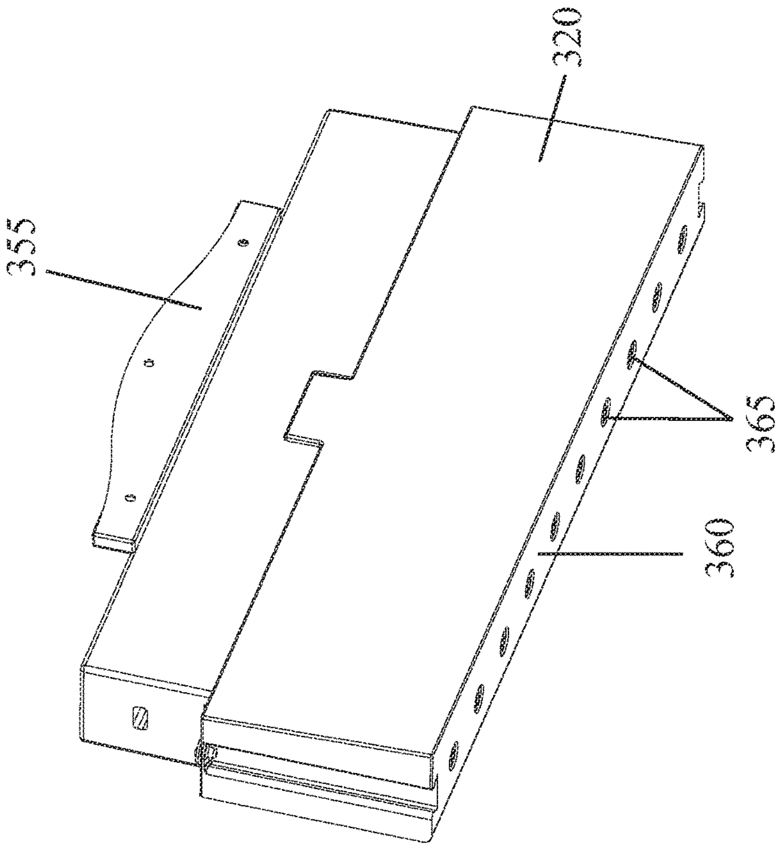
FIG. 33 is a lower perspective view of FIG. 32.
Figure 32:
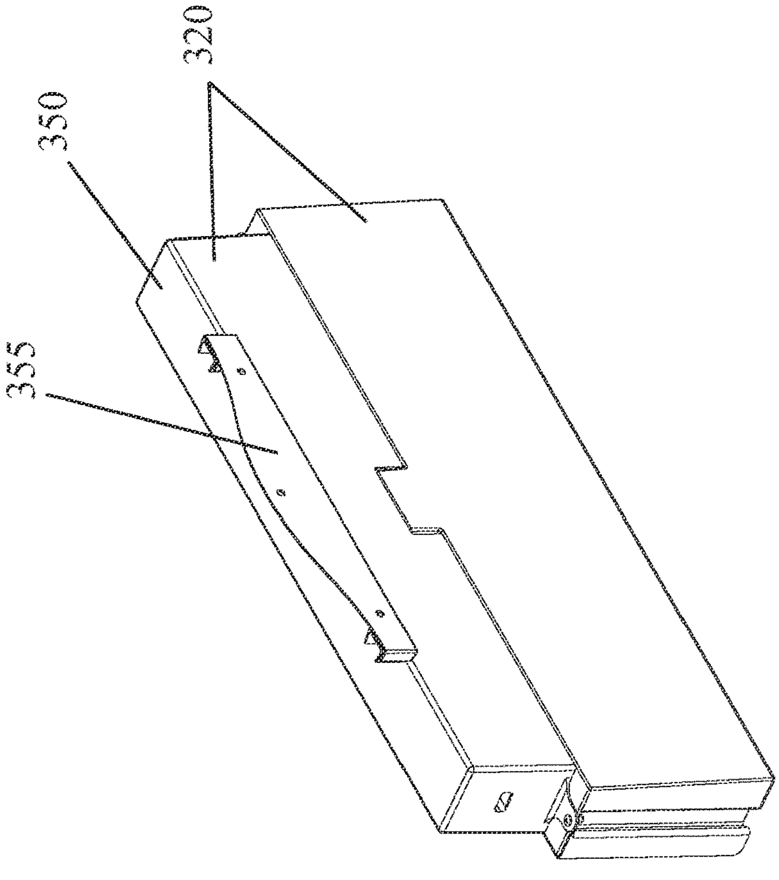
FIG. 32 is an upper rear perspective view of FIG. 30.
Figure 35:
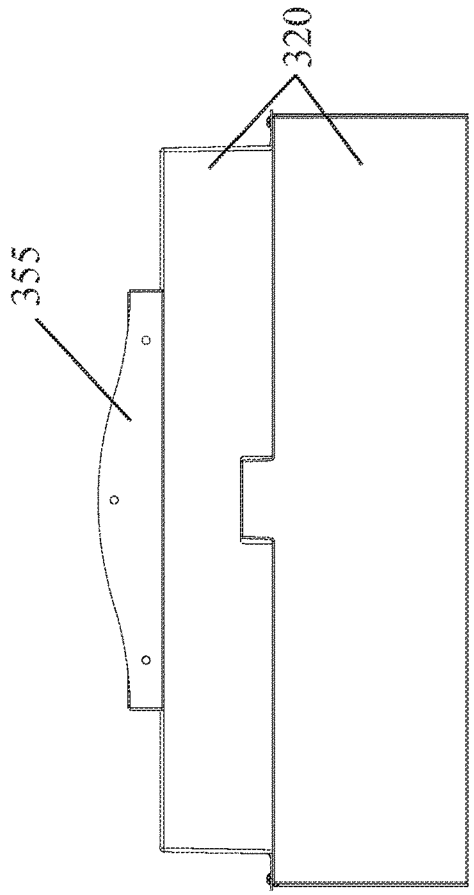
FIG. 35 is a rear view of FIG. 30.
Figure 34:
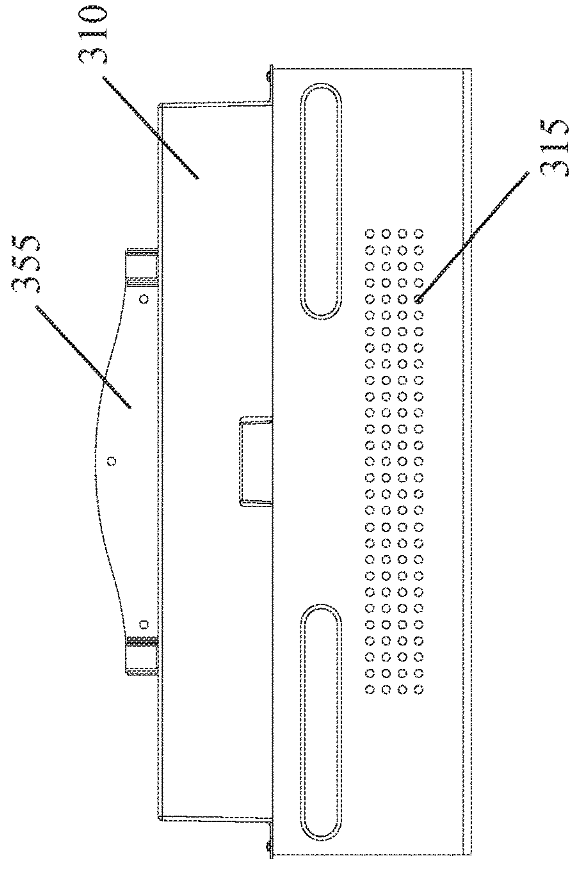
FIG. 34 is a front view of FIG. 30
Figure 36:
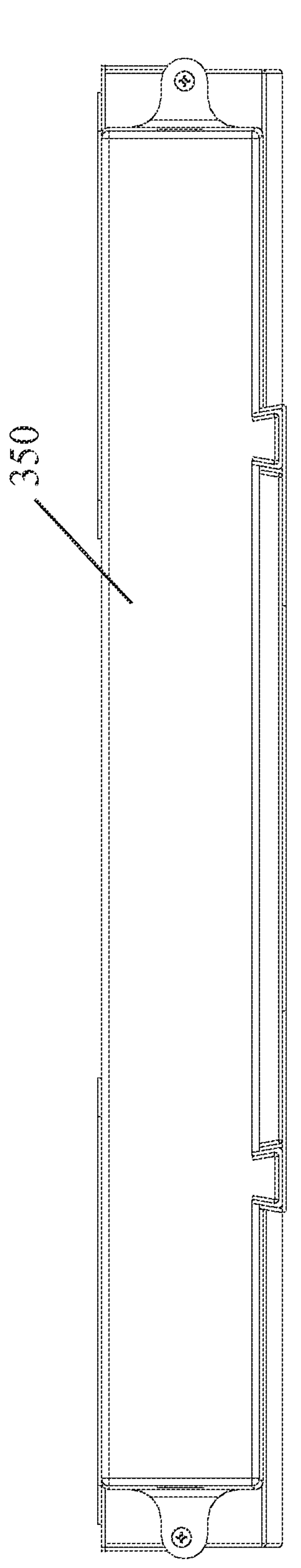
FIG. 36 is a top view of FIG. 30.
Figure 37:
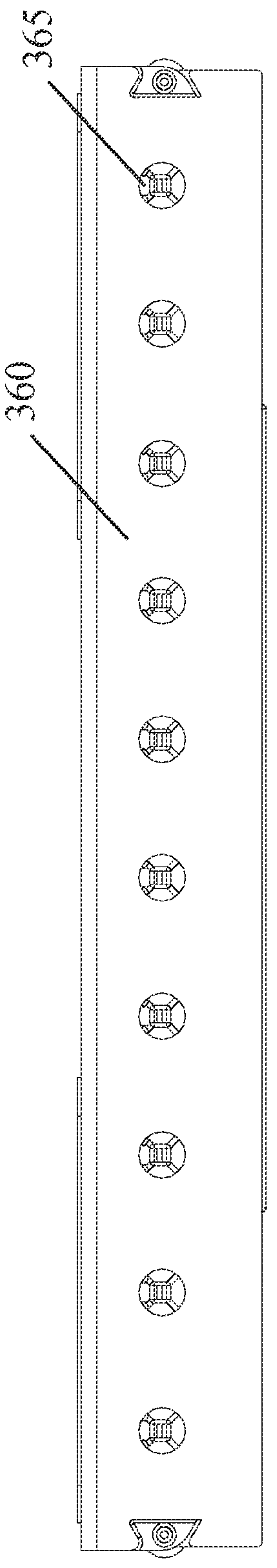
FIG. 37 is a bottom view of FIG. 30.
Figure 39:
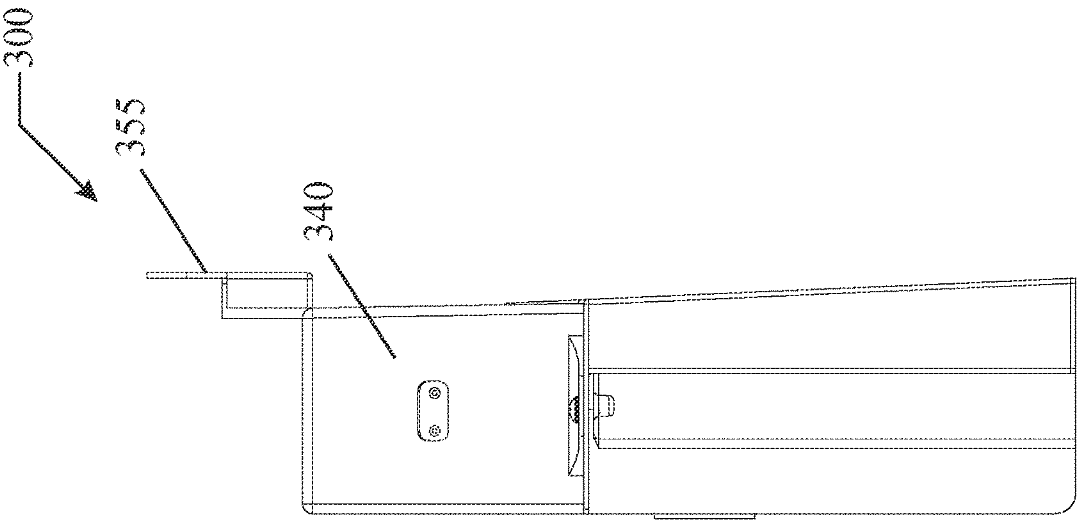
FIG. 39 is a right side view of FIG. 30.
Figure 38:
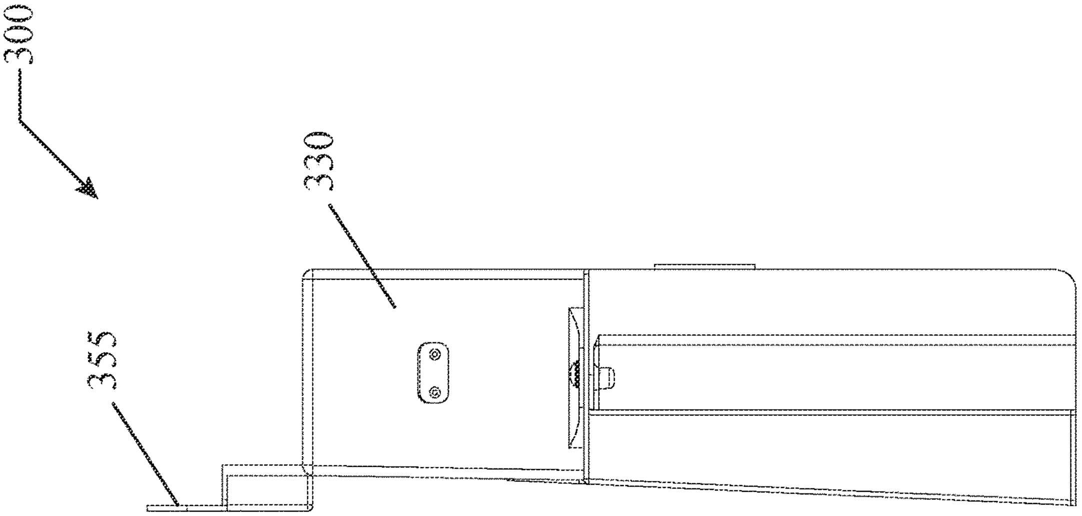
FIG. 38 is a left side view of FIG. 30.

FIG. 30 is an upper front perspective view of a drop down retractable lighting embodiment 300. FIG. 31 is a lower front perspective view of the embodiment 300 of FIG. 30 FIG. 32 is an upper rear perspective view of the embodiment 300 of FIG. 30. FIG. 33 is a lower perspective view of the embodiment 300 of FIG. 32. FIG. 34 is a front view of the embodiment 300 of FIG. 30 FIG. 35 is a rear view of the embodiment 300 of FIG. 30. FIG. 36 is a top view of the embodiment 300 of FIG. 30. FIG. 37 is a bottom view of the embodiment 300 of FIG. 30. FIG. 38 is a left side view of FIG. 30. FIG. 31 is a right side view of the embodiment 300 of FIG. 30

Figure 40:
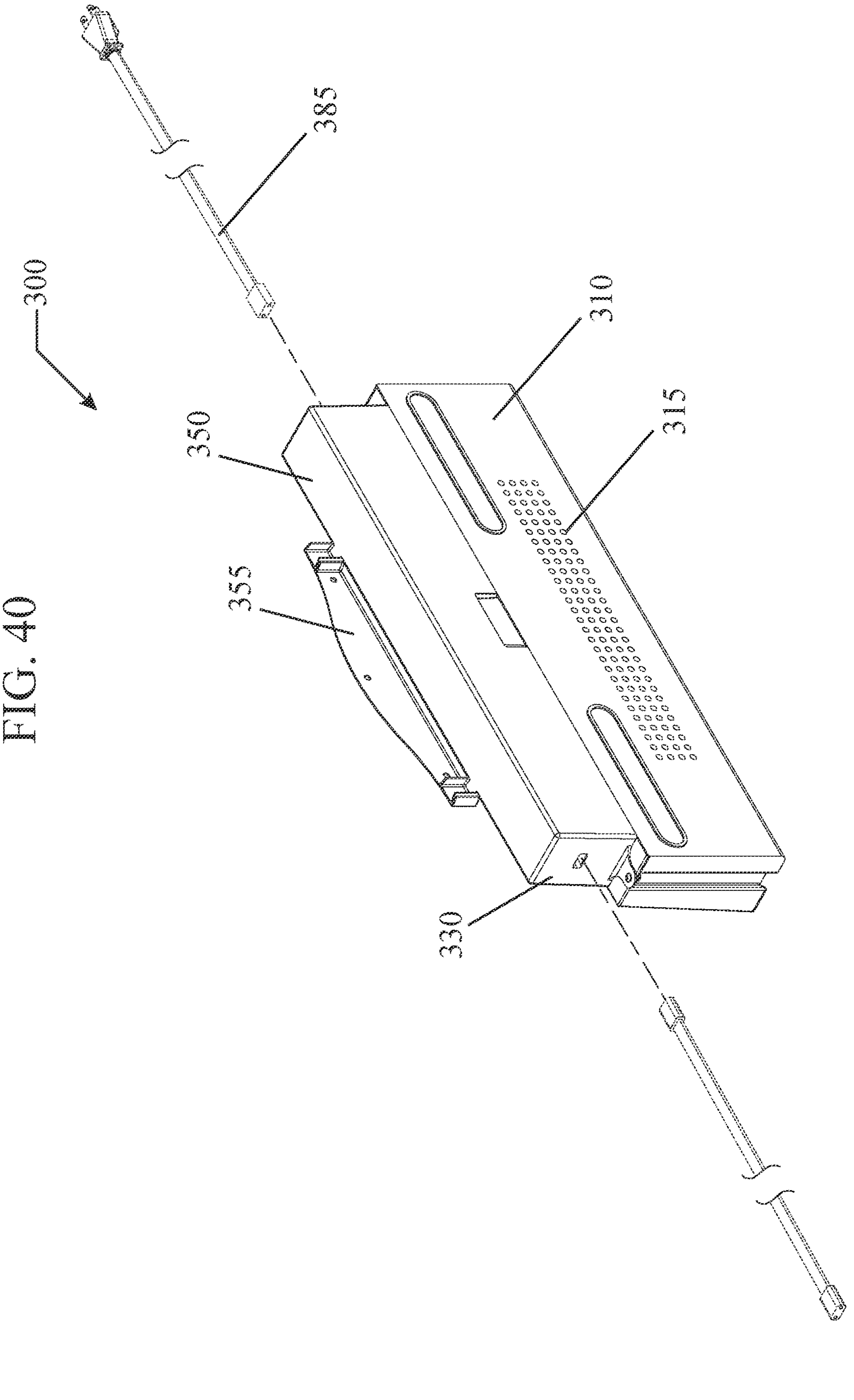
FIG. 40 is another perspective view of FIG. 30 and power cord.

FIG. 40 is another perspective view of FIG. 30 and power cord.

Figure 41:
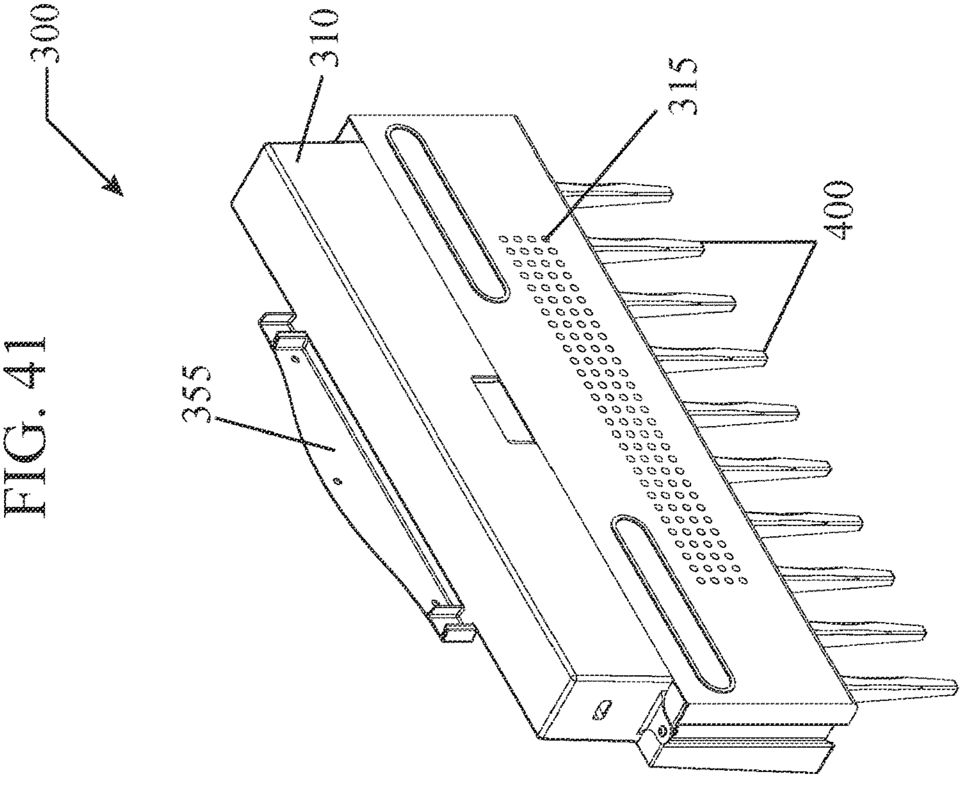
FIG. 41 is another view of FIG. 33 with lights extended.

FIG. 41 is another view of FIG. 33 with lights extended.

Figure 42:
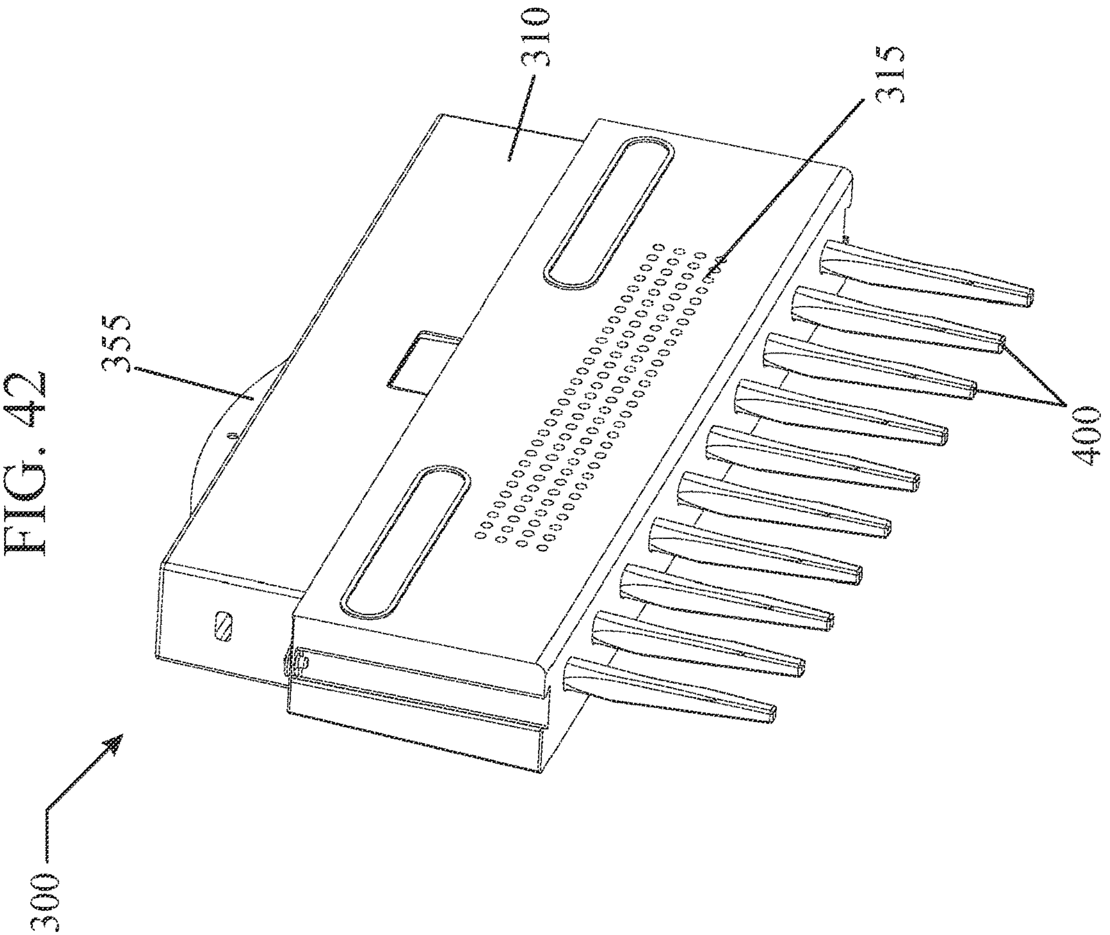
FIG. 42 is another view of FIG. 31 with light extended.

FIG. 42 is another view of FIG. 31 with light extended.

Figure 43:
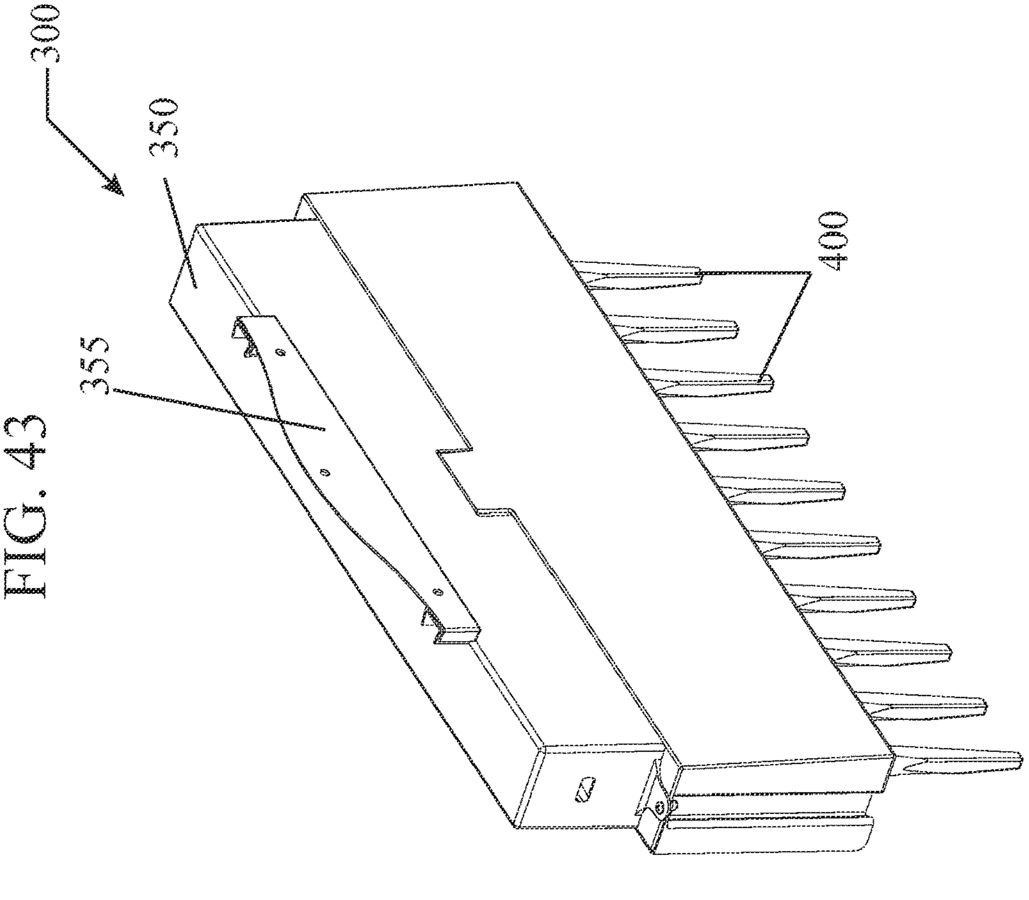
FIG. 43 is another view of FIG. 32 with lights extended.

FIG. 43 is another view of FIG. 32 with lights extended.

Figure 44:
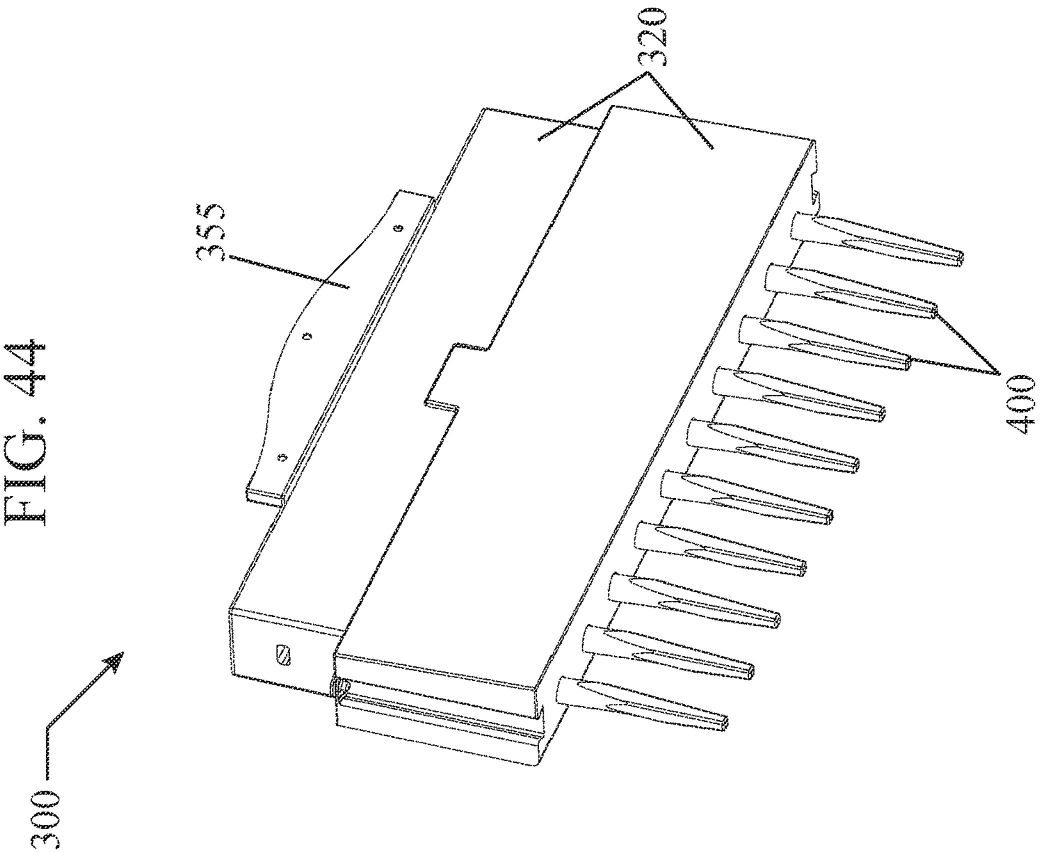
FIG. 44 is another view of FIG. 33 with lights extended.

FIG. 44 is another view of FIG. 33 with lights extended.

Figure 45:
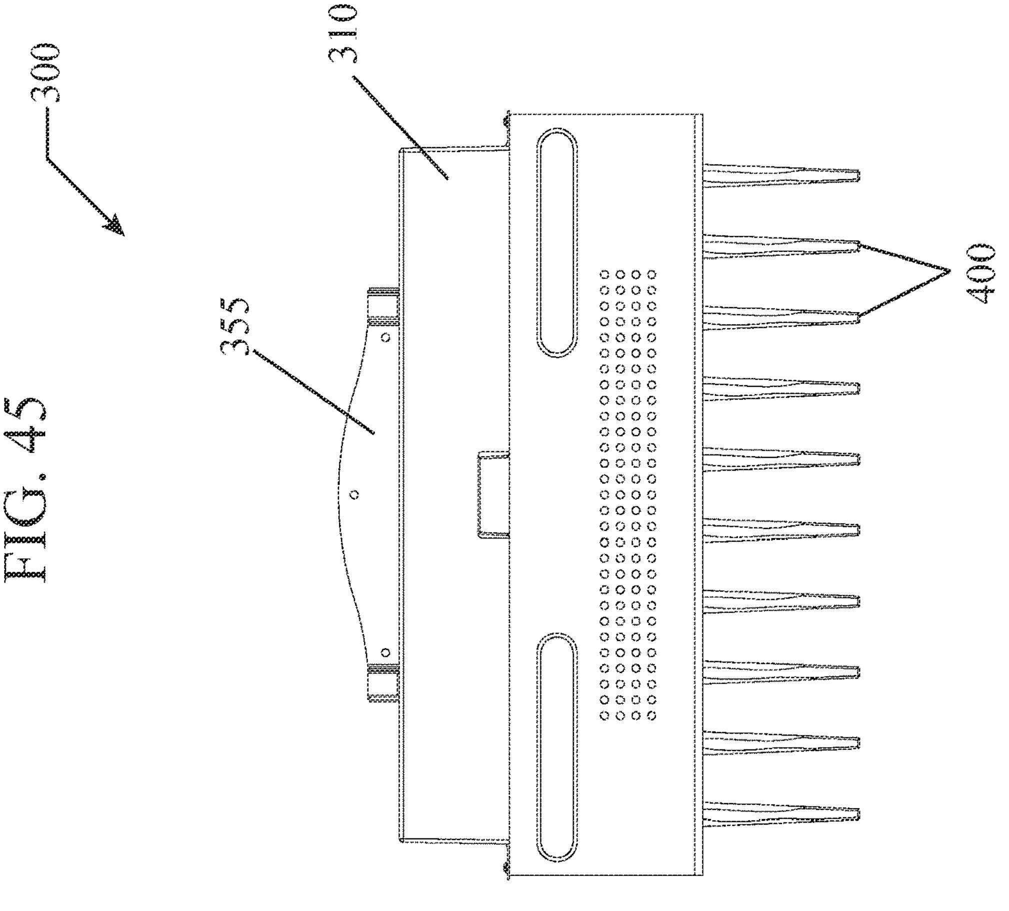
FIG. 45 is another view of FIG. 34 with lights extended.

FIG. 45 is another view of FIG. 34 with lights extended.

Figure 46:
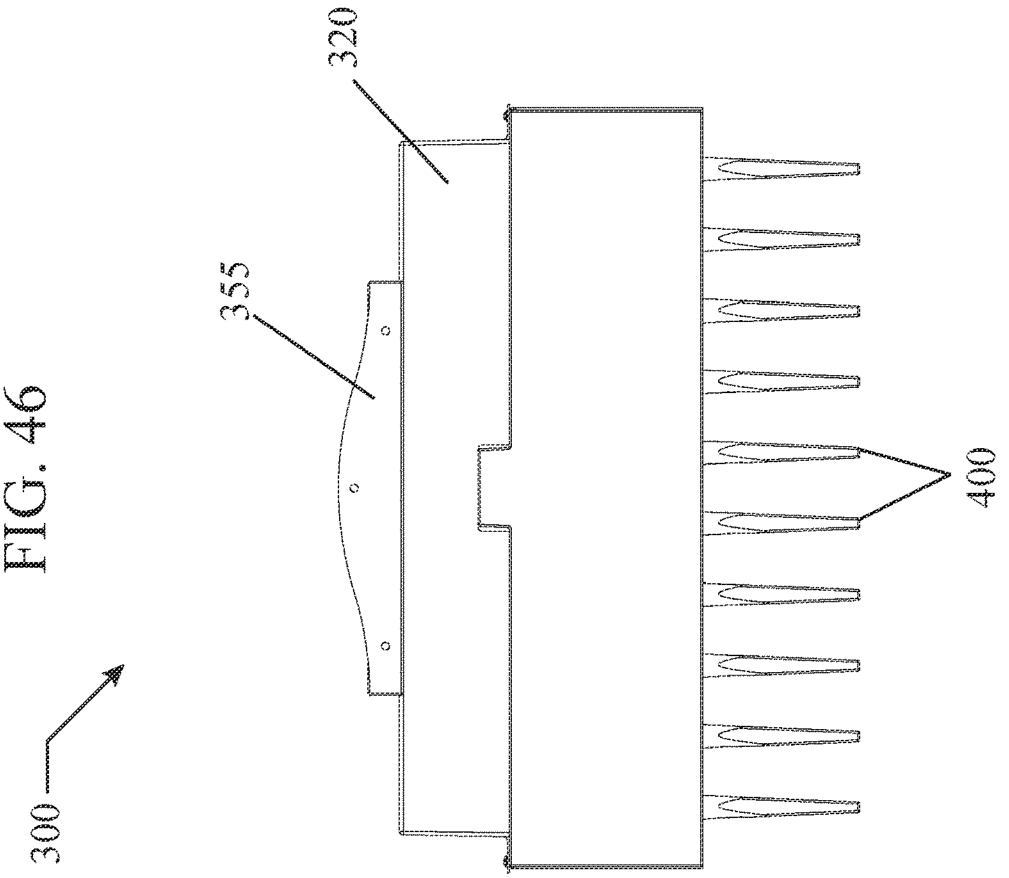
FIG. 46 is another view of FIG. 35 with lights extended.

FIG. 46 is another view of FIG. 35 with lights extended.

Figure 47:
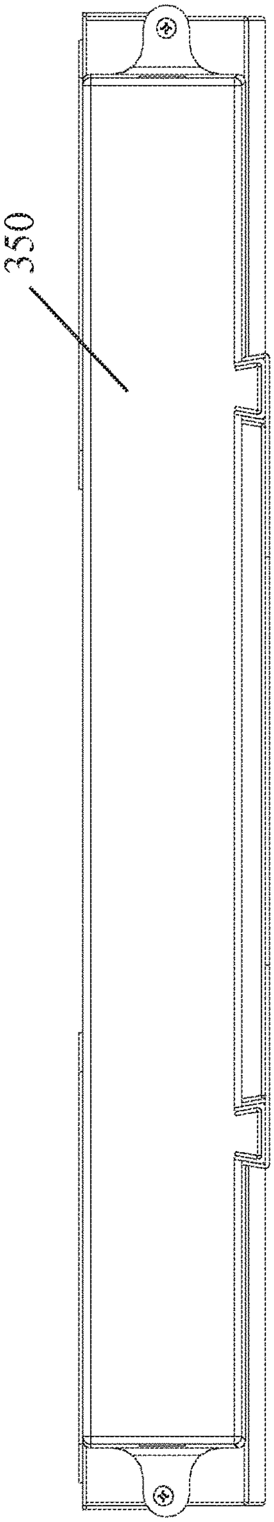
FIG. 47 is a top view of FIG. 41.

FIG. 47 is a top view of FIG. 41.

Figure 48:
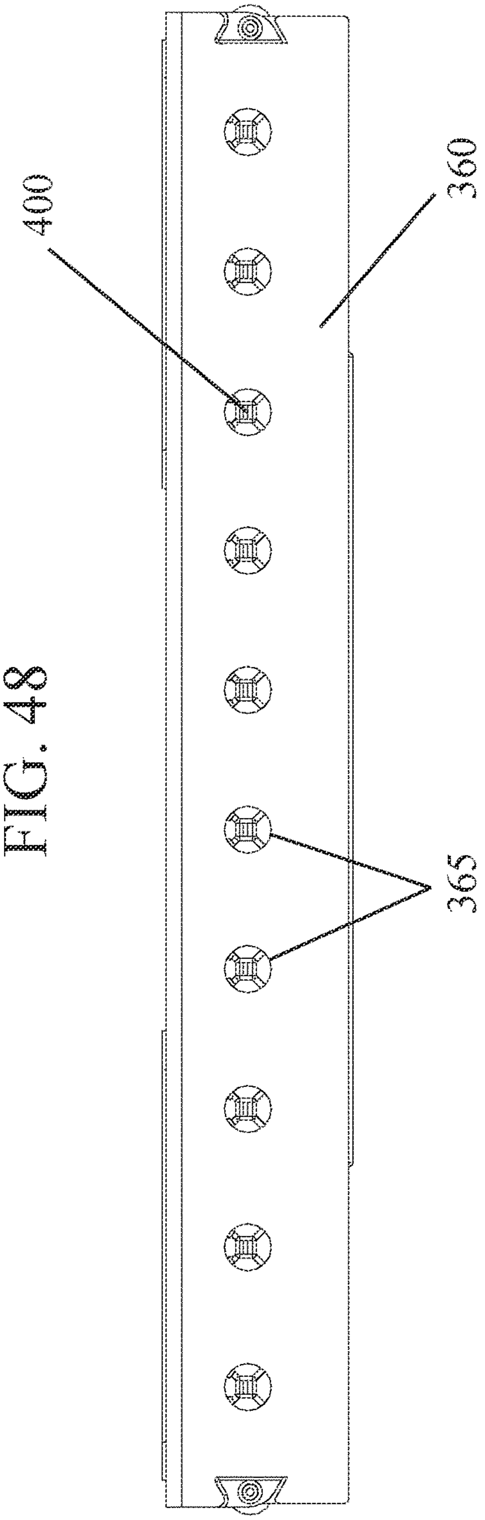
FIG. 48 is a bottom view of FIG. 41.

FIG. 48 is a bottom view of FIG. 41.

Figure 49:
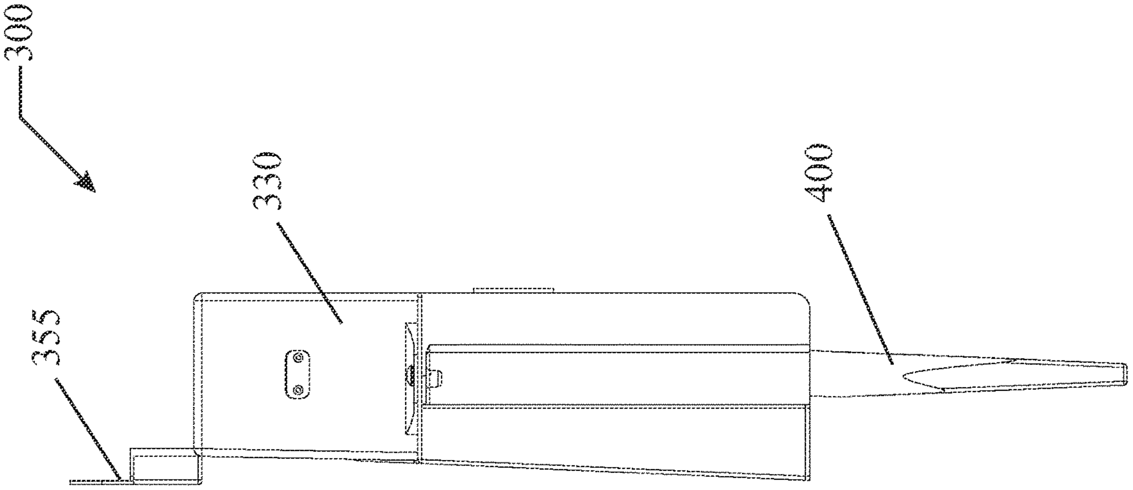
FIG. 49 is a left side view of FIG. 41.

FIG. 49 is a left side view of FIG. 41

Figure 50:
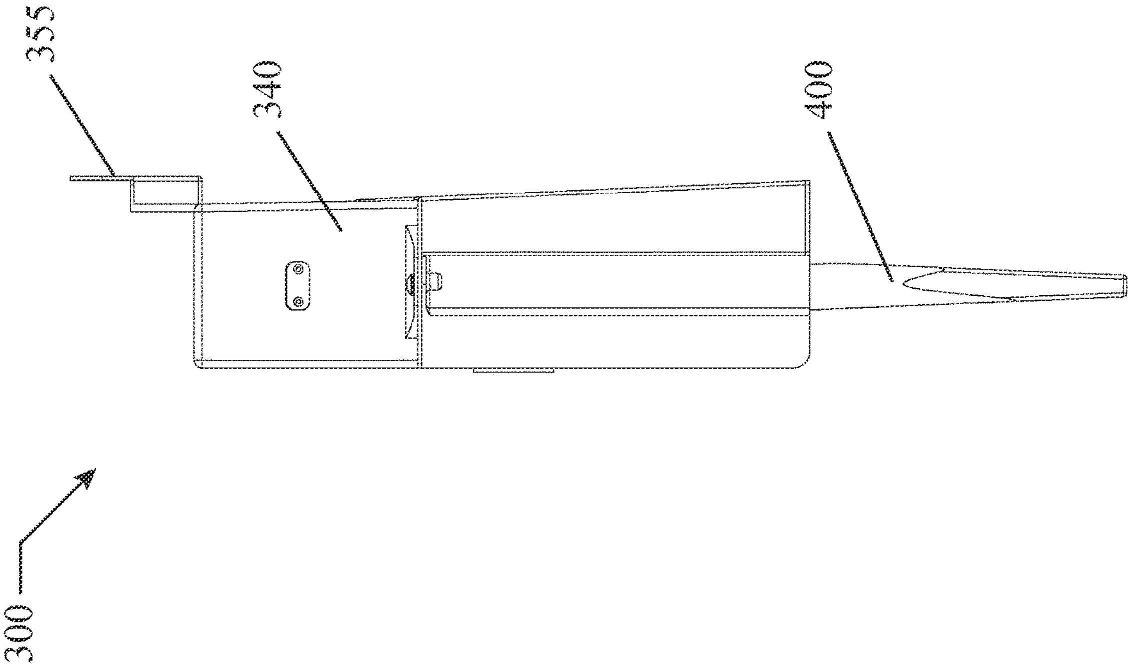
FIG. 50 is a right side view of FIG. 41.

FIG. 50 is a right side view of FIG. 41

Figure 51:
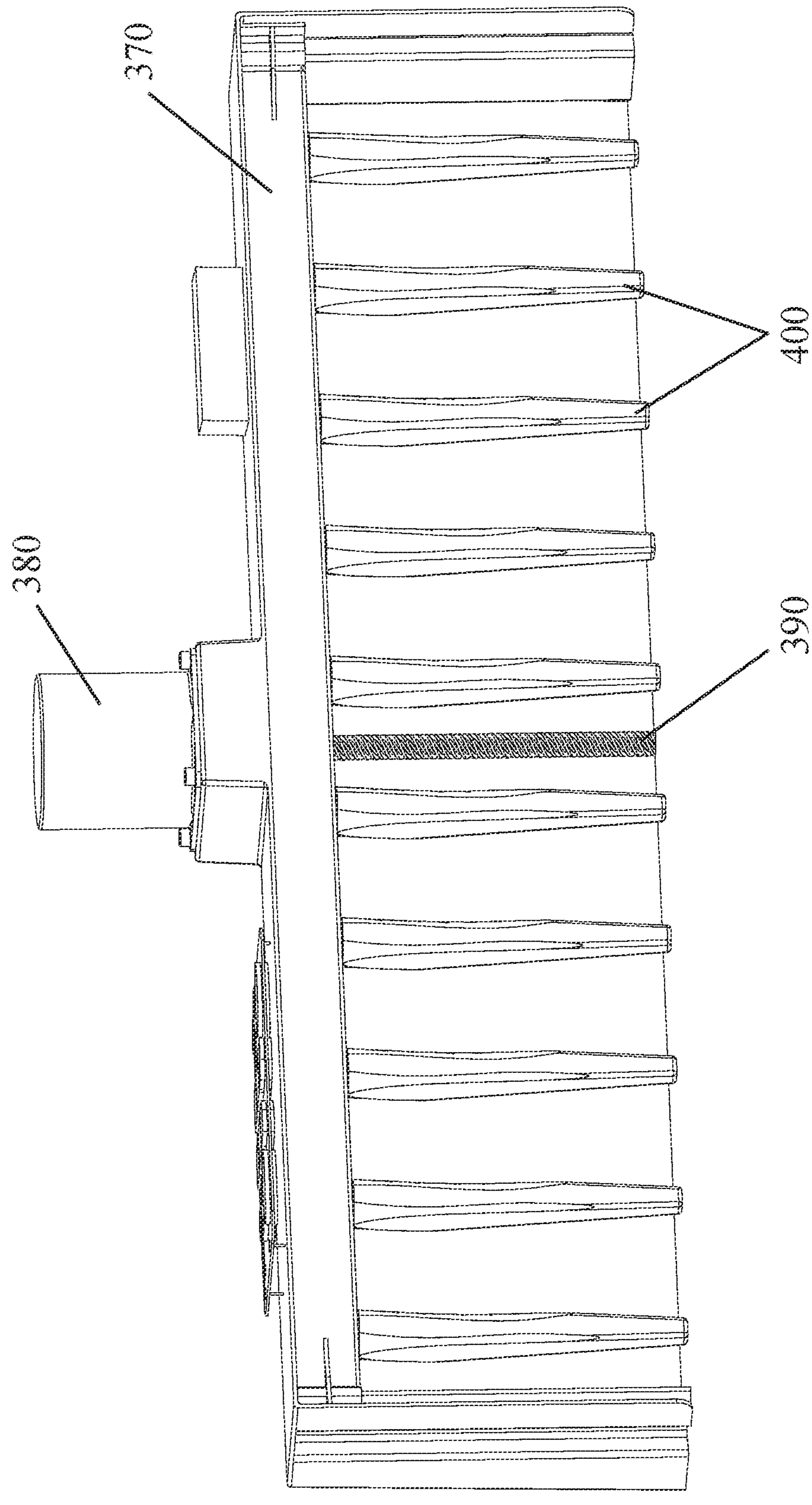
FIG. 51 is a front view of the embodiment of FIG. 30 with front panel removed and moveable frame with lights raised.

FIG. 51 is a front view of the embodiment of FIG. 30 with front panel removed and moveable frame with lights raised.

Figure 52:
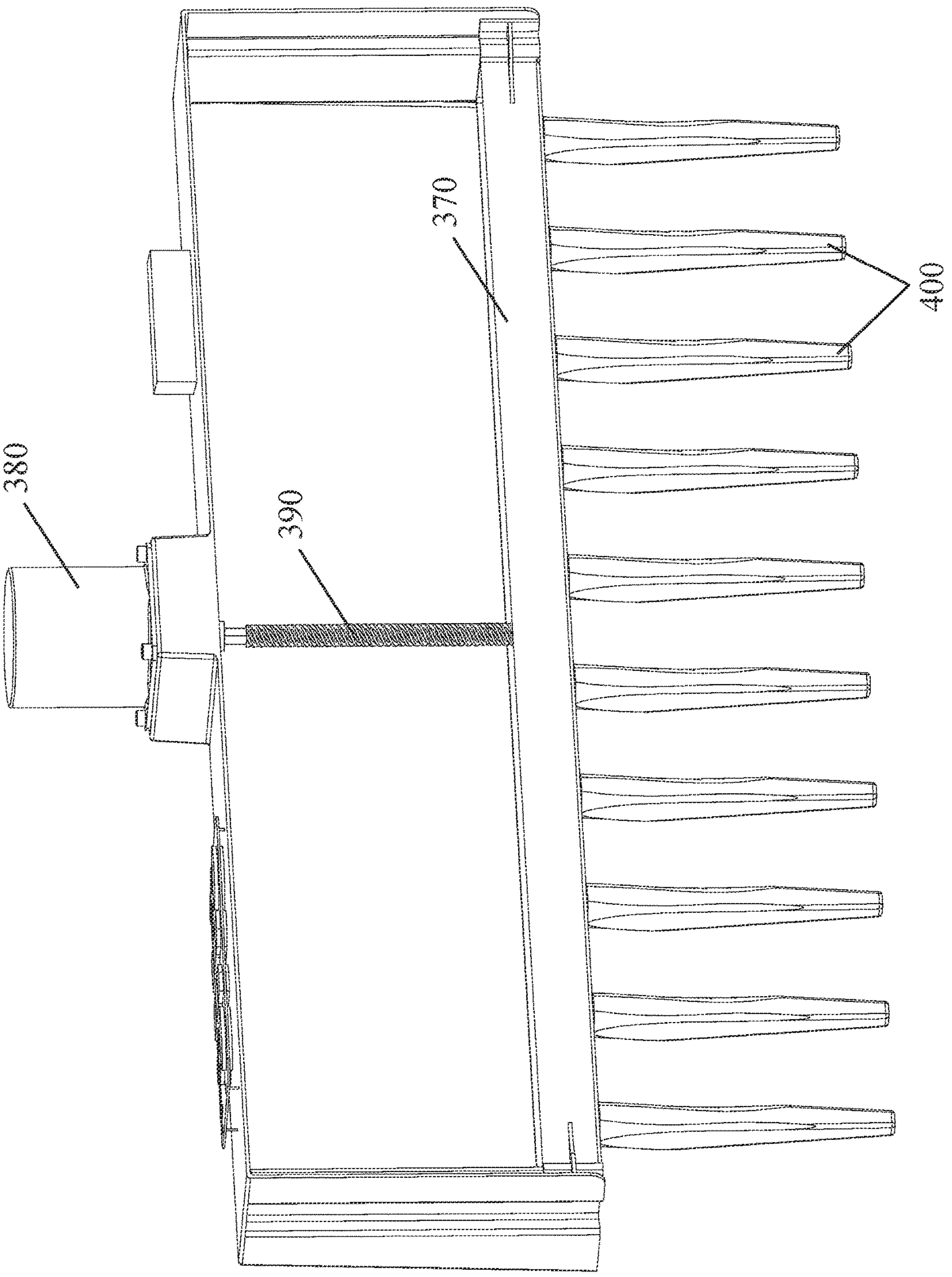
FIG. 52 is another view of the embodiment in FIG. 51 with moveable frame lowered and lights extending below.

FIG. 52 is another view of the embodiment in FIG. 51 with moveable frame lowered and lights extending below.

Figure 53C:
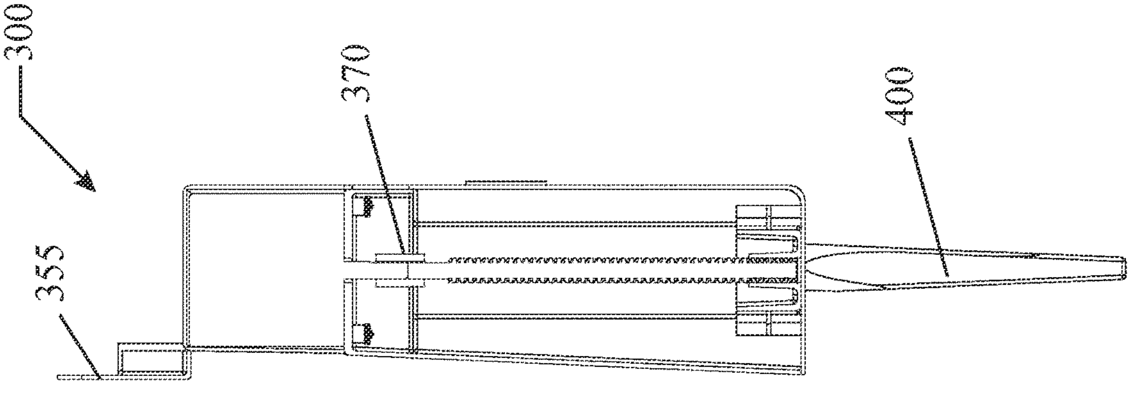
FIG. 53C is another left side view of the embodiment in FIG. 53B with moveable frame lowered and lights extending below.
Figure 53B:
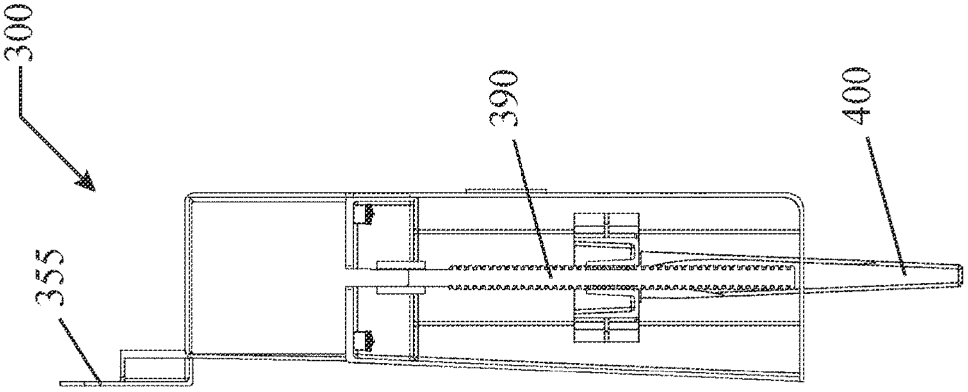
FIG. 53B is another left side view of the embodiment in FIG. 53A with moveable frame partially lowered.
Figure 53A:
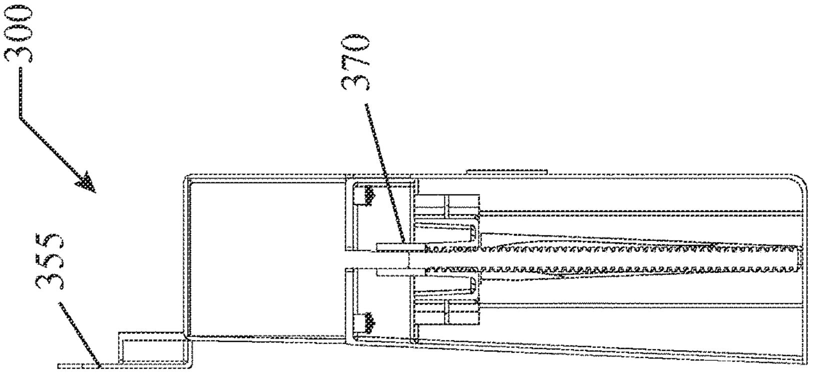
FIG. 53A is another left side view of the embodiment in FIG. 51 with moveable frame raised and lights raised.

FIG. 53A is another left side view of the embodiment in FIG. 51 with moveable frame raised and lights raised.

FIG. 53B is another left side view of the embodiment in FIG. 53A with moveable frame partially lowered.

FIG. 53C is another left side view of the embodiment in FIG. 53B with moveable frame lowered and lights extending below.

Figure 54:
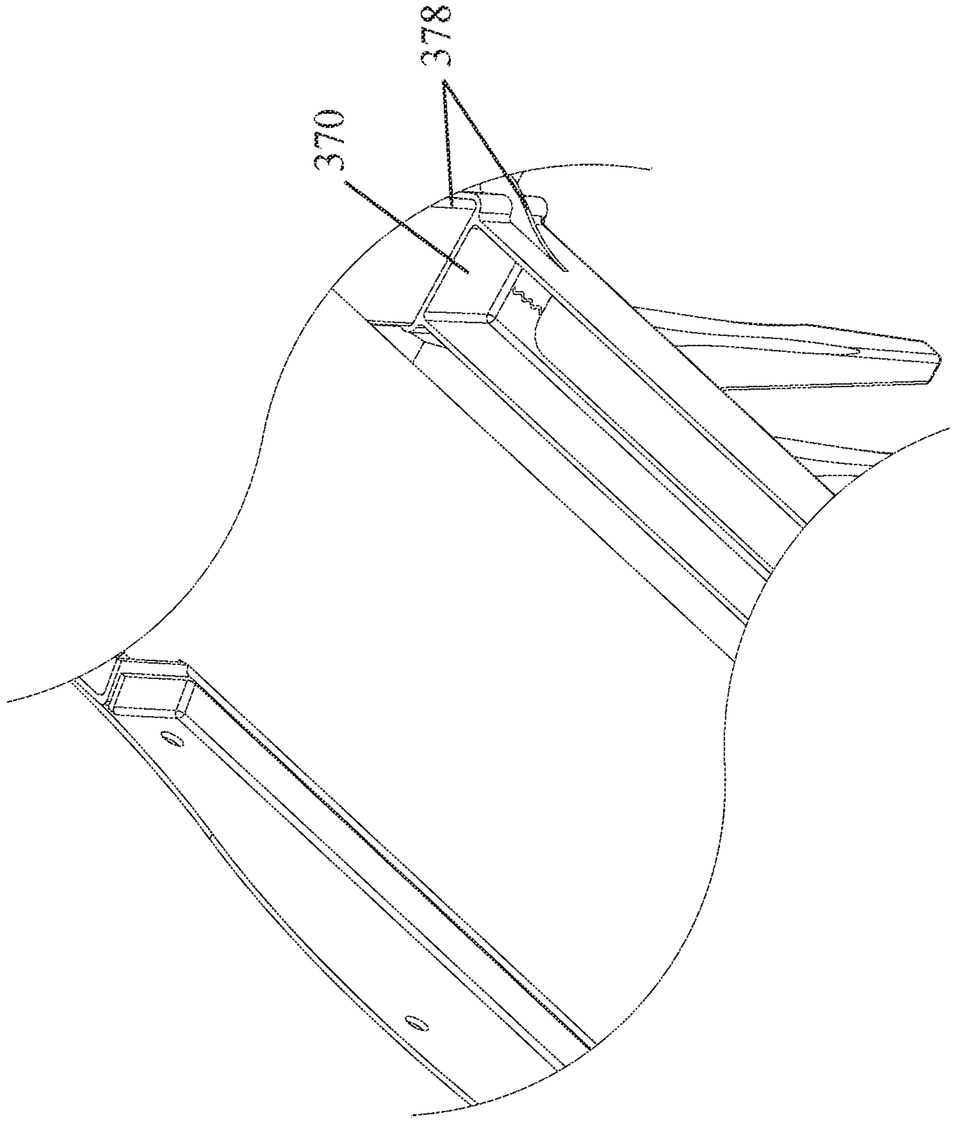
FIG. 54 is an inside view of the embodiment in FIGS. 53A-53C of the moveable frame and internal tracks/guides
Figure 55:
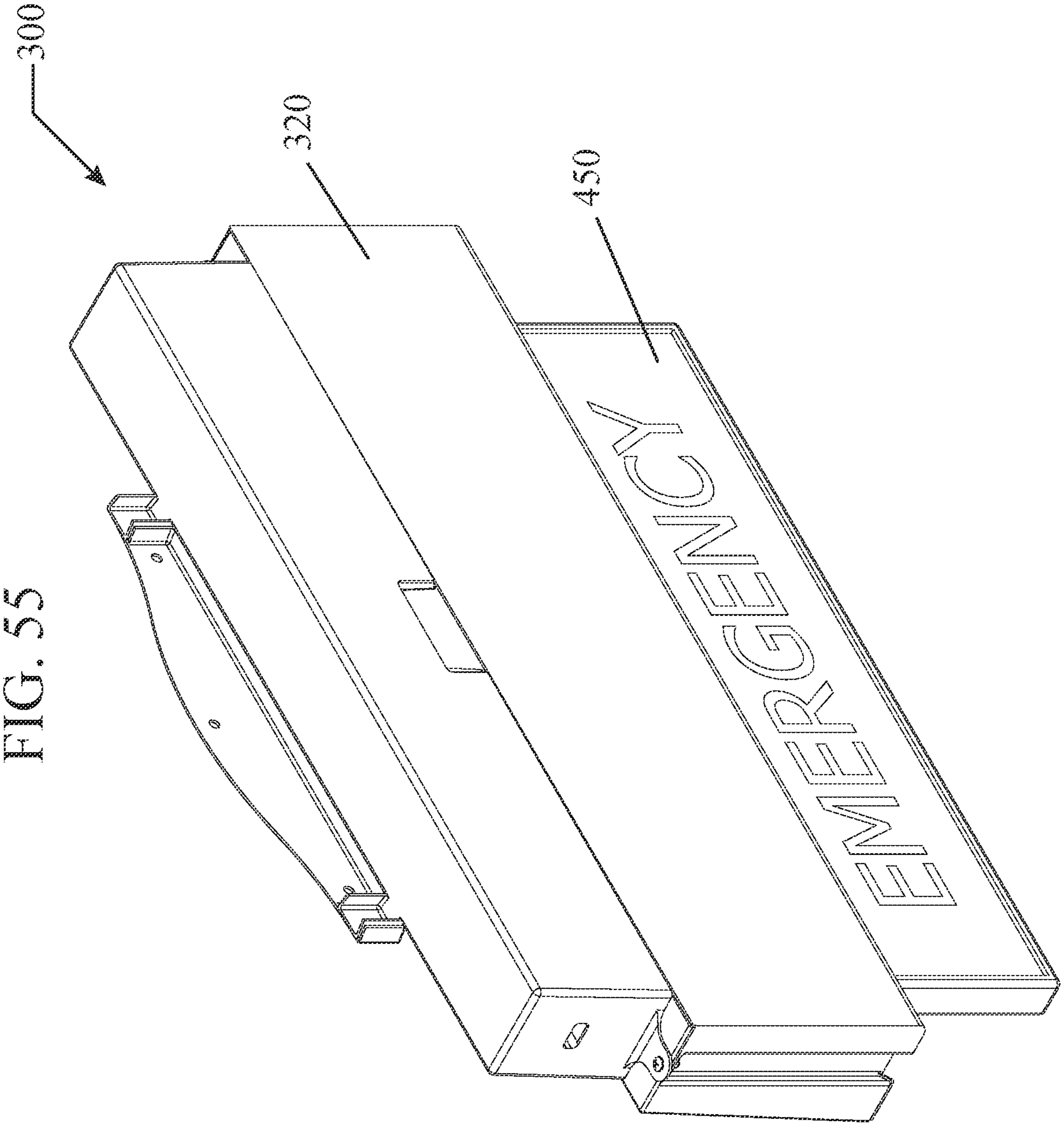
FIG. 55 is another view of the embodiment of FIG. 30 with a sign extending below.

FIG. 54 is an inside view of the embodiment in FIGS. 53A-53C showing the moveable frame and internal tracks FIG. 55 is another view of the embodiment of FIG. 30 with a sign extending below.

Figure 56:
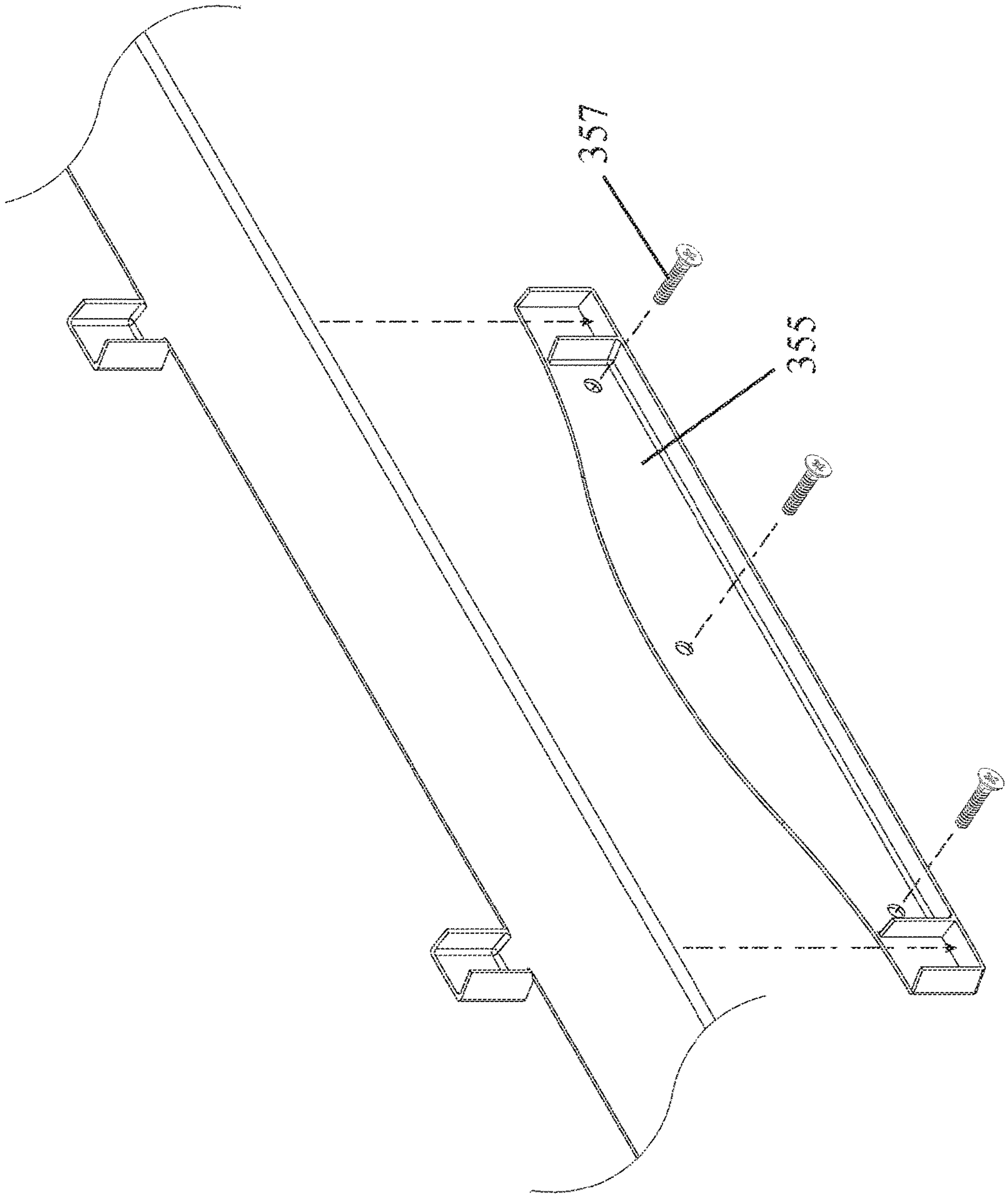
FIG. 56 is another view of FIG. 55 with mounting fasteners.

FIG. 56 is another view of FIG. 55 with mounting fasteners.

Figure 57A:
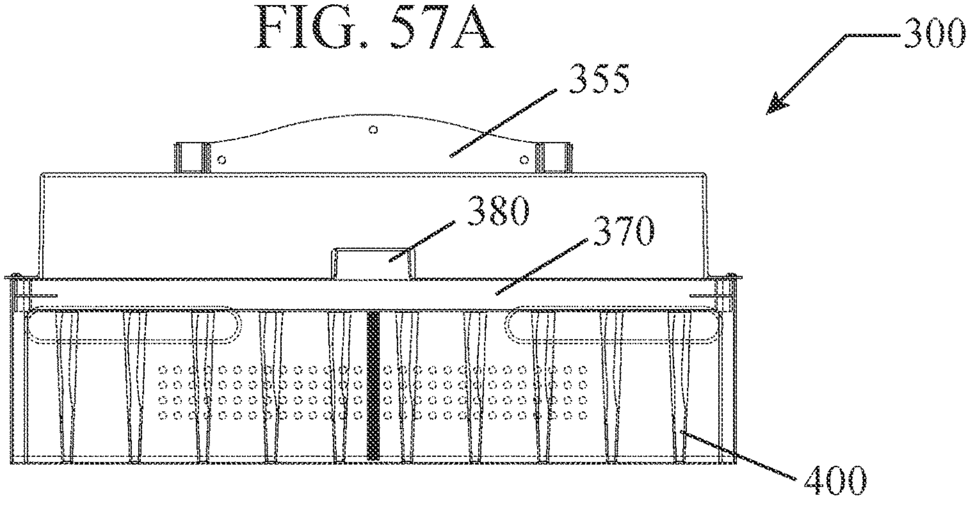
FIG. 57A is a front view of the embodiment in FIG. 53A.

FIG. 57A is a front view of the embodiment in FIG. 53A.

Figure 57B:
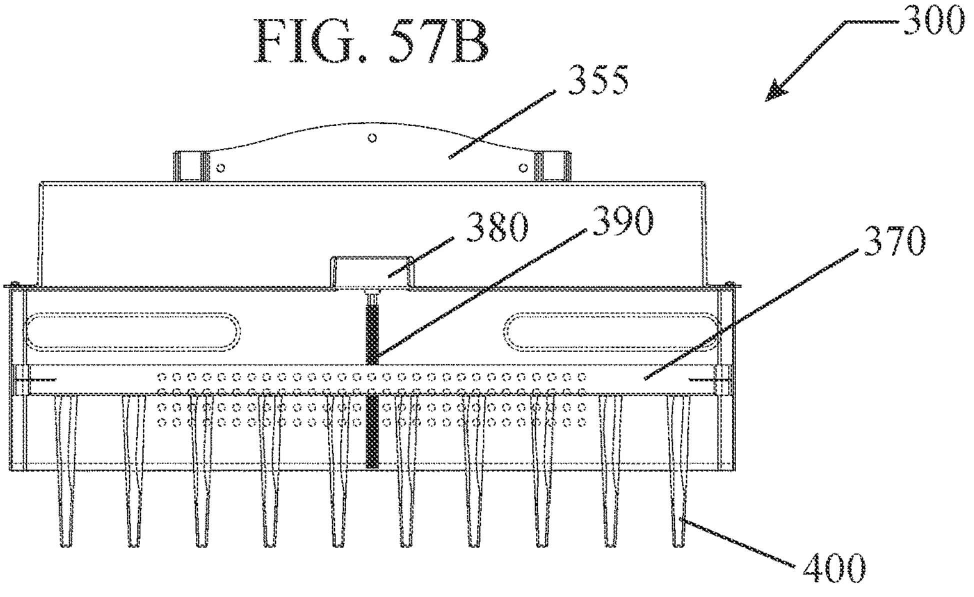
FIG. 57B is a front view of the embodiment in FIG. 53B.

FIG. 57B is a front view of the embodiment in FIG. 53B.

Figure 57C:
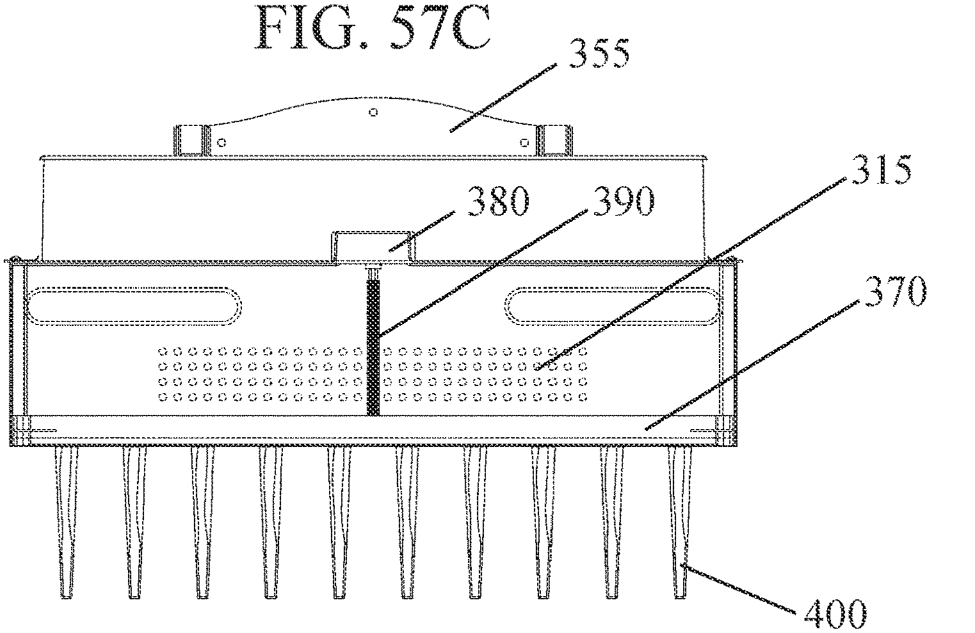
FIG. 57C is a front view of the embodiment in FIG. 53C.

FIG. 57C is a front view of the embodiment in FIG. 53C.

FIG. 68A is a front view of the embodiment in FIG. 55 with sign fully raised.

Figure 58A:
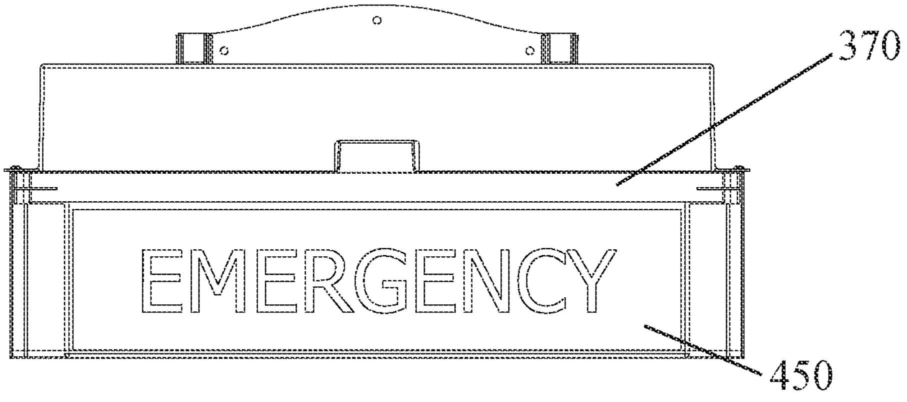
FIG. 58A is a front view of the embodiment in FIG. 55 with sign fully raised.
Figure 58B:
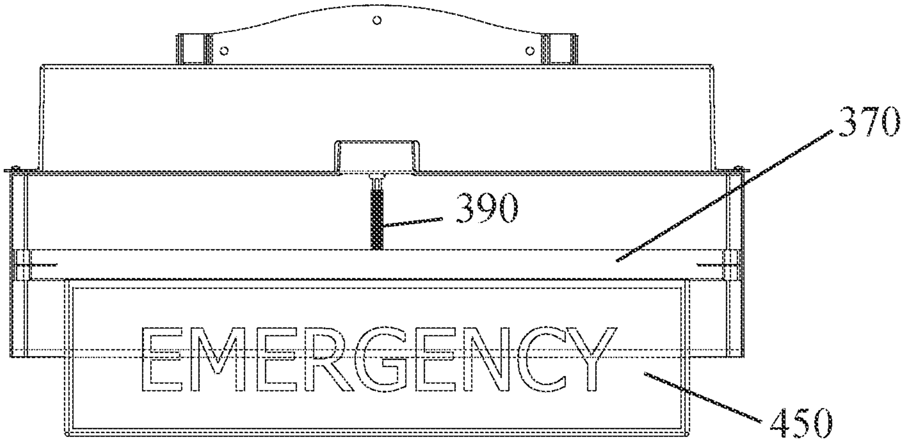
FIG. 58B is a front view of FIG. 58A with a sign about to lower.

FIG. 58B is a front view of FIG. 68A with sign about to lower.

Figure 58C:
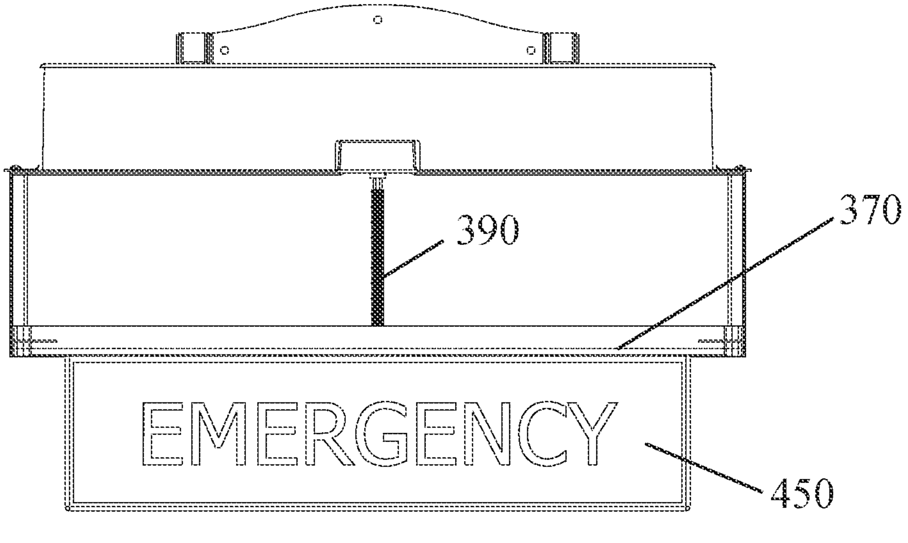
FIG. 58C is a front view of FIG. 58B with sign lowered.
Figure 68:
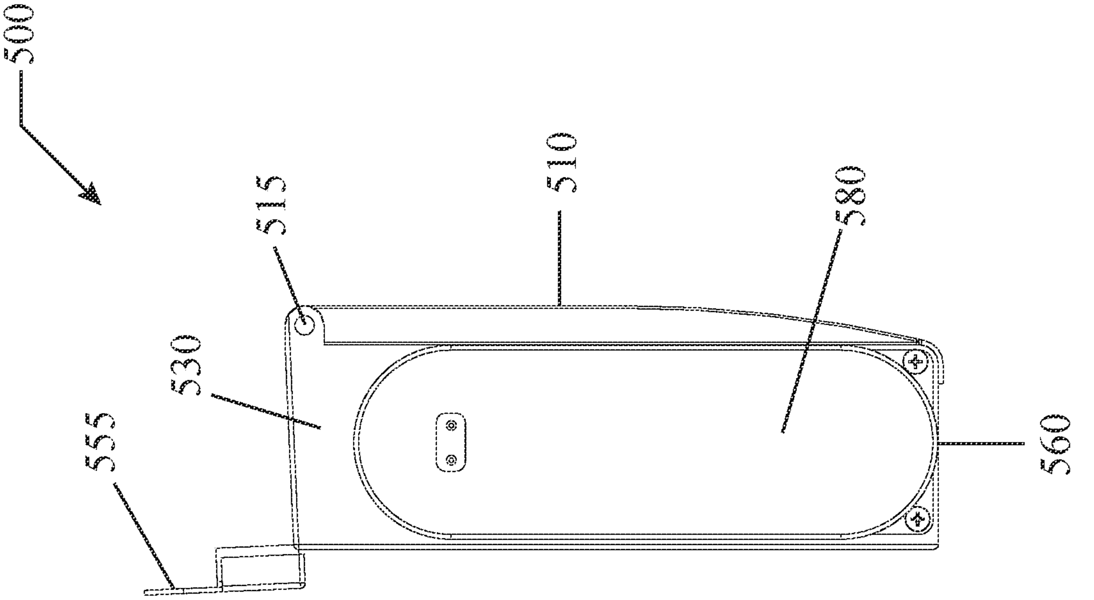
FIG. 68 is a left side view of FIG. 60.

FIG. 58C is a front view of FIG. 68 with sign lowered.

Figure 59:
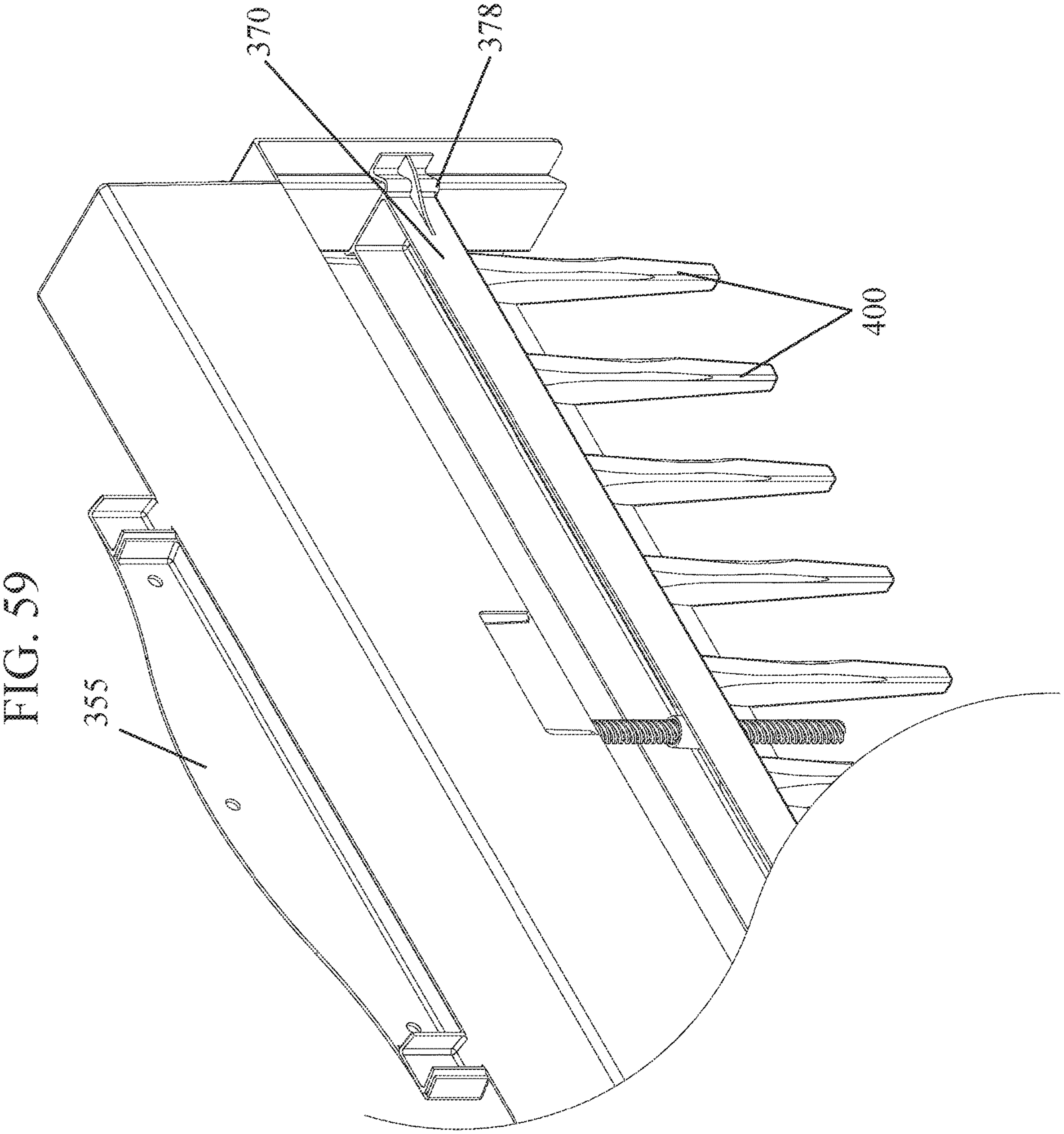
FIG. 59 is another view FIG. 54 showing the moveable frame and internal tracks.

FIG. 59 is another view FIG. 54 showing the moveable frame and internal tracks/guides.

Referring to FIGS. 30-59, the drop down embodiment 300 can include a housing having a front panel 310, with an optional speaker 315 that can function similar to the previous speakers described. The embodiment 300 housing can include a rear panel 320, left panel 330, right panel 340, and top 350 having a mount bracket 355 that extends upward, and can be attached to a support surface by fasteners 357, such as screws and bolts. The embodiment 300 housing can include a bottom panel 360 having a plurality of side by side through-holes 365, that can each allow for the lights 400 to pass therethrough.

Inside of the embodiment 300 housing can be an electrical motor 380, that can be powered by a power cord 385. The motor 380 can also be powered by batteries as described in previous embodiments.

Extending below the motor 380 can be a threaded rod 390 that can pass through a threaded opening 375 in a moveable frame 370. The motor 380 when turned on can rotate the threaded rod 390, which in turn can move the moveable frame 370 up or downward depending on rotating the rod 3990 clockwise or counter-clockwise. The moveable frame 370 can be guided downward and upward within the embodiment 300 housing by tracks/guides 378.

Attached to and extending downward from the moveable frame 370 can be mounted a plurality of spaced apart lights 400, such as icicles, which can be light emitting diodes, similar to the lights described in the previous embodiments.

As the moveable frame 370 is moved downward the boom the each of the plurality of lights 400 can pass through each of the through-holes 365 in in the bottom panel 360 of the embodiment 300 housing, and when the moveable frame 370 rests against the inside of bottom panel 360, the lights 400 can be fully extended below the embodiment housing 300. Control of the motor 380 and turning on and off the lights 400 can be controlled remotely as described in the previous embodiments.

Fold Down Embodiment

Figure 61:
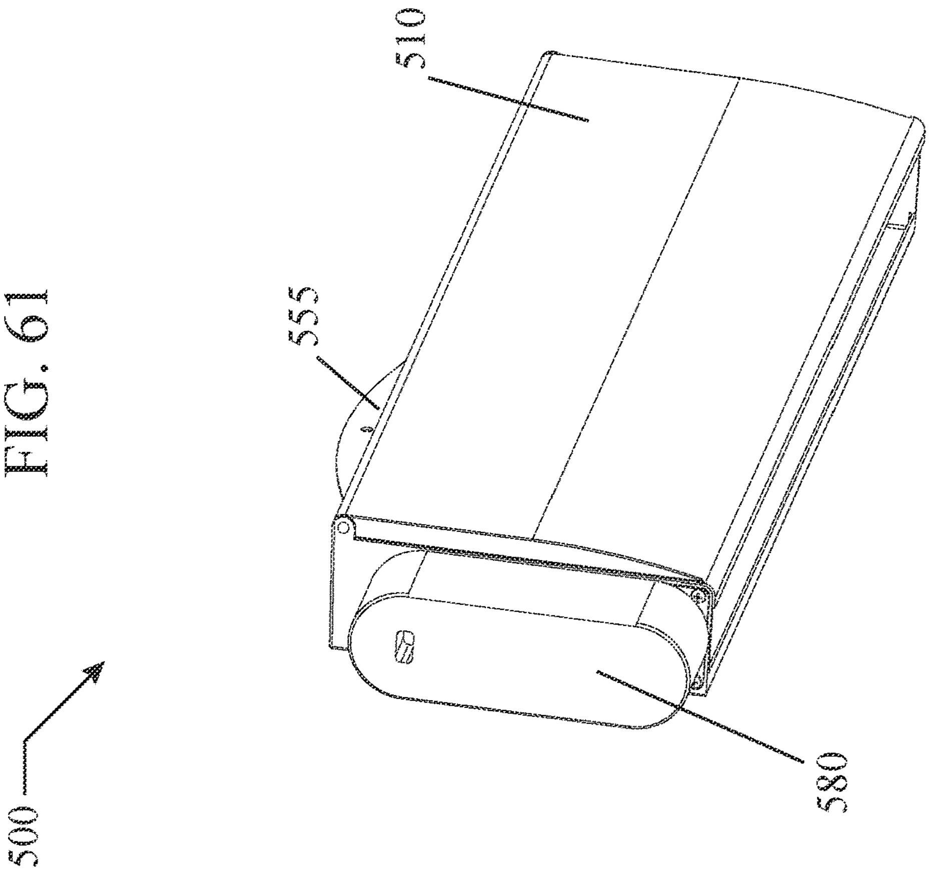
FIG. 61 is a left front perspective view of FIG. 60.
Figure 60:
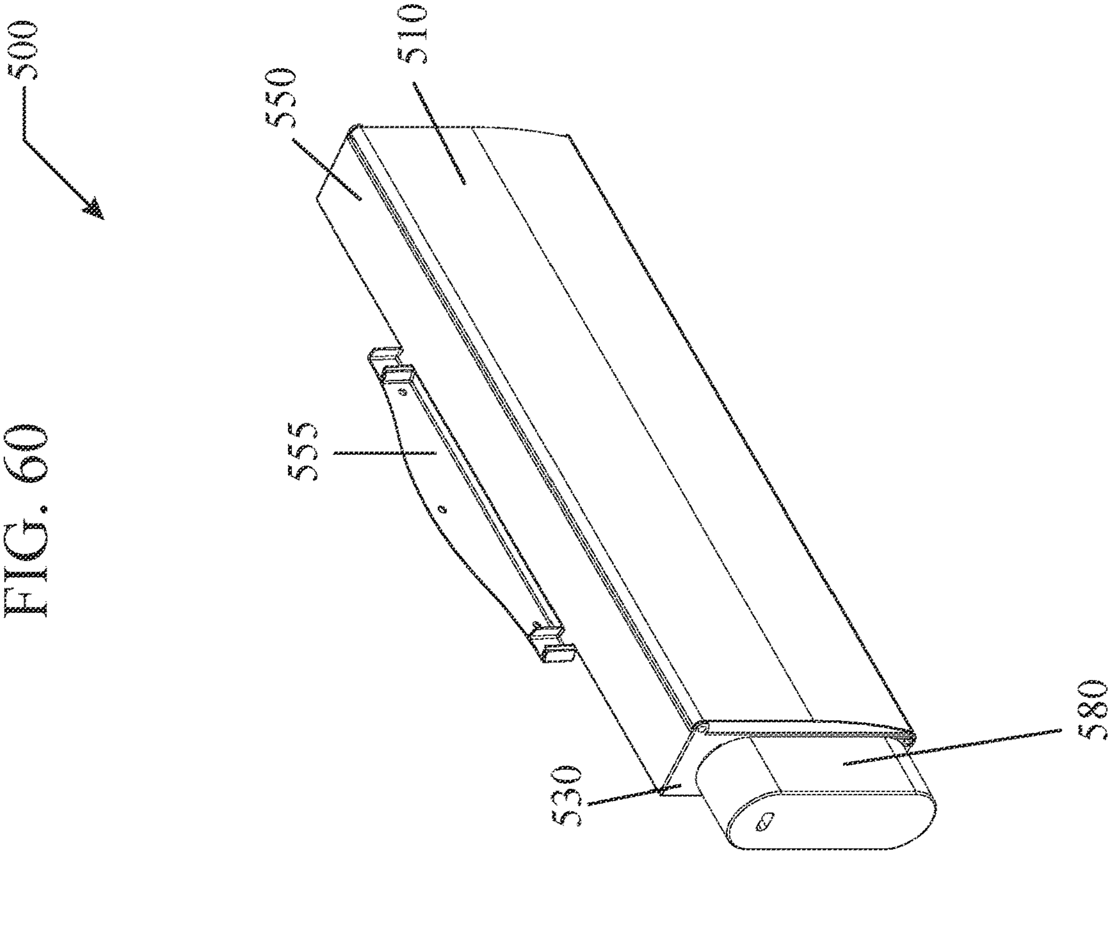
FIG. 60 is an upper front perspective view of a fold out retractable lighting system embodiment with lights retracted.
Figure 63:
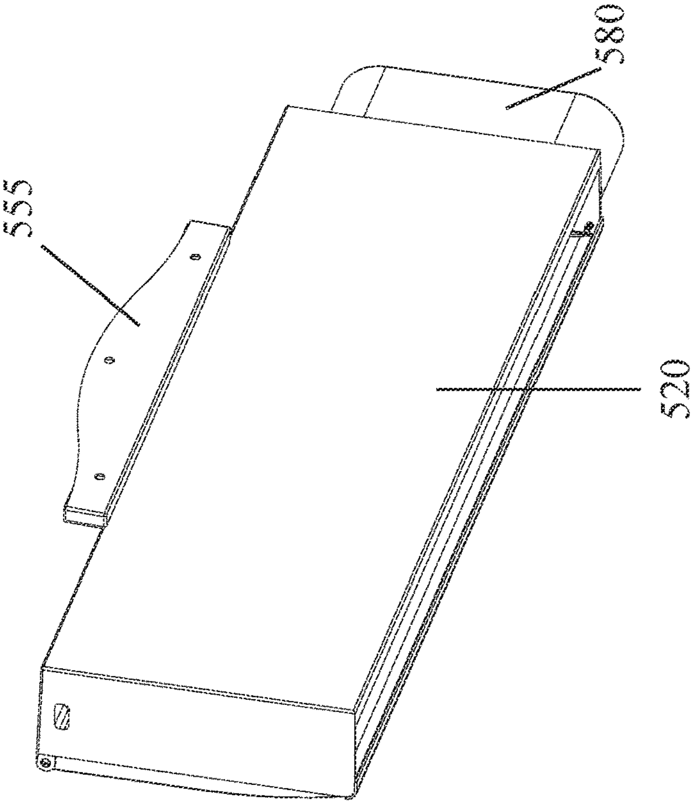
FIG. 63 is a rear perspective view of FIG. 62.
Figure 62:
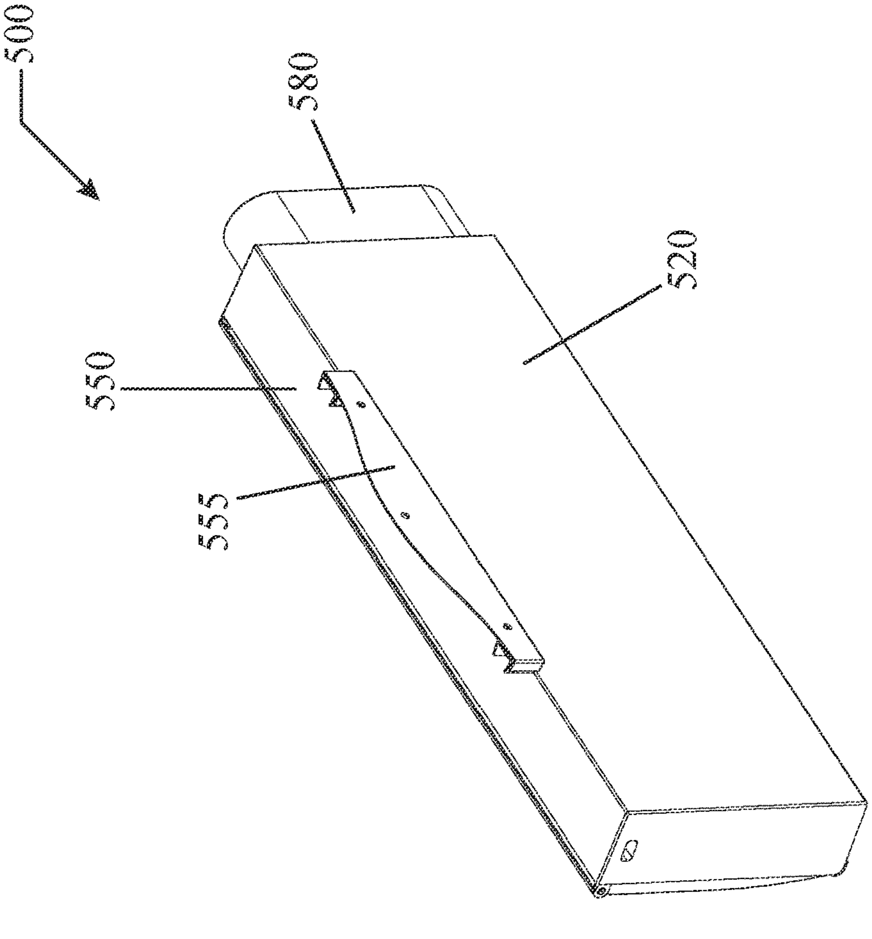
FIG. 62 is an upper rear perspective view of FIG. 60.
Figure 65:
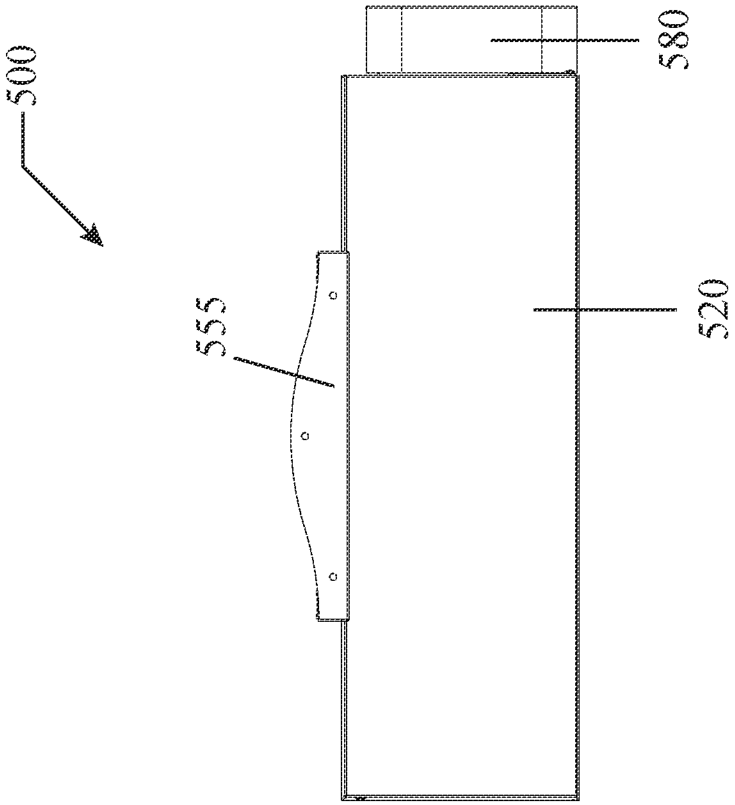
FIG. 65 is a rear view of FIG. 62.
Figure 64:
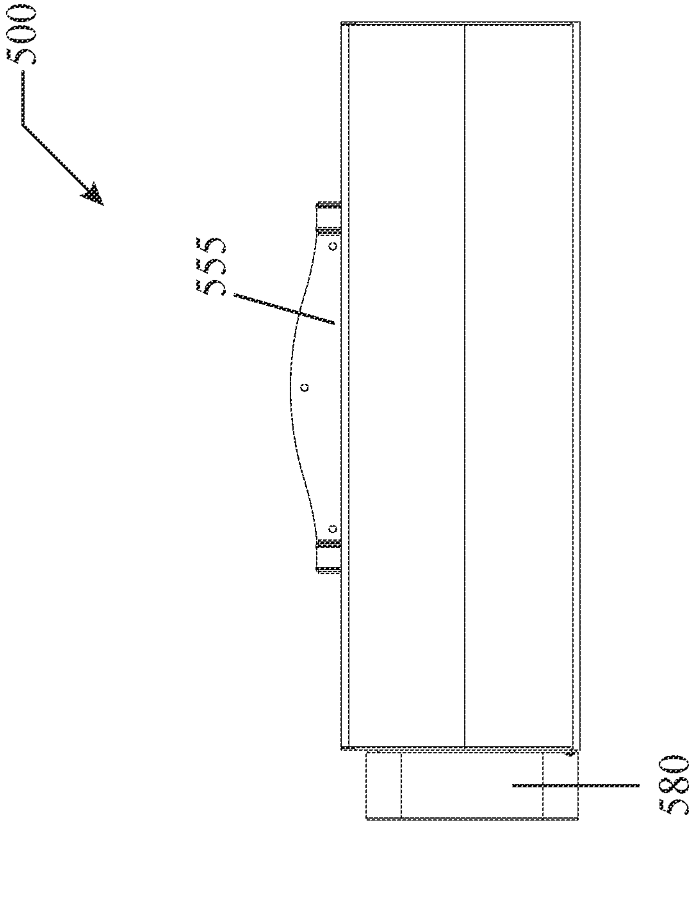
FIG. 64 is a rear view of FIG. 60.
Figure 66:
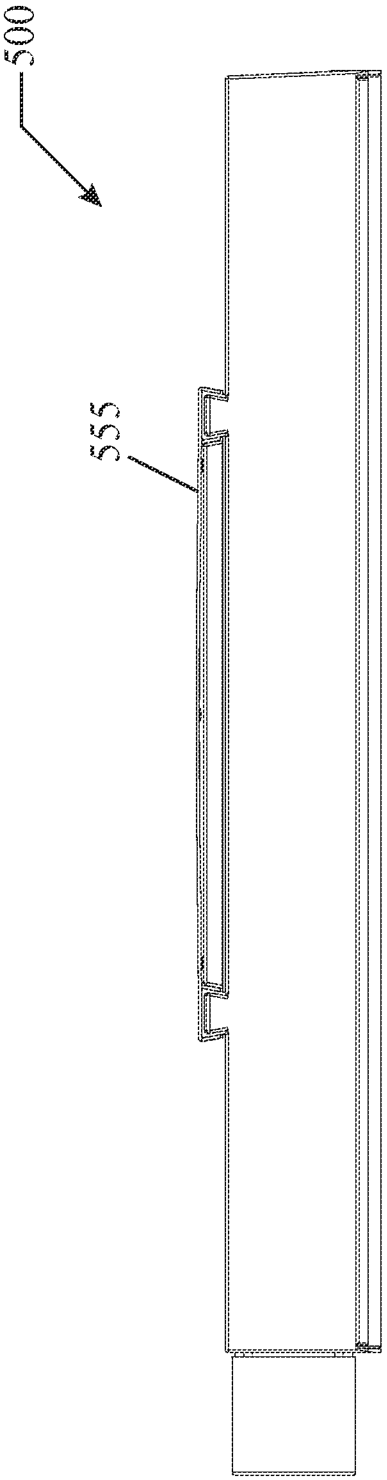
FIG. 66 is a top view of FIG. 60.
Figure 67:
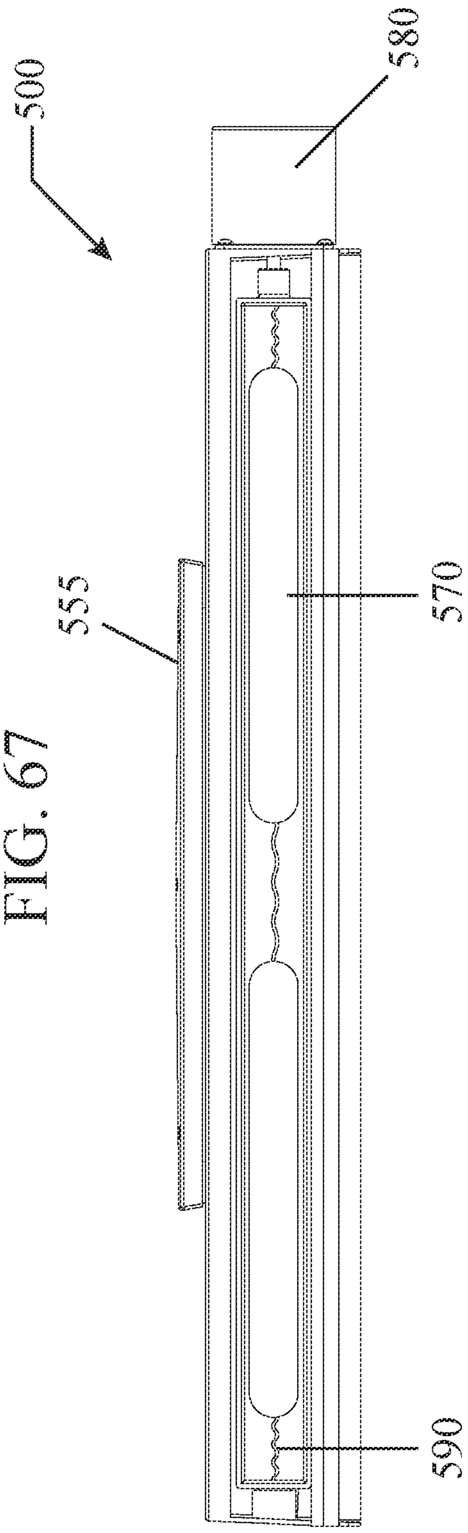
FIG. 67 is a top view of FIG. 62 with top panel removed.
Figure 69:
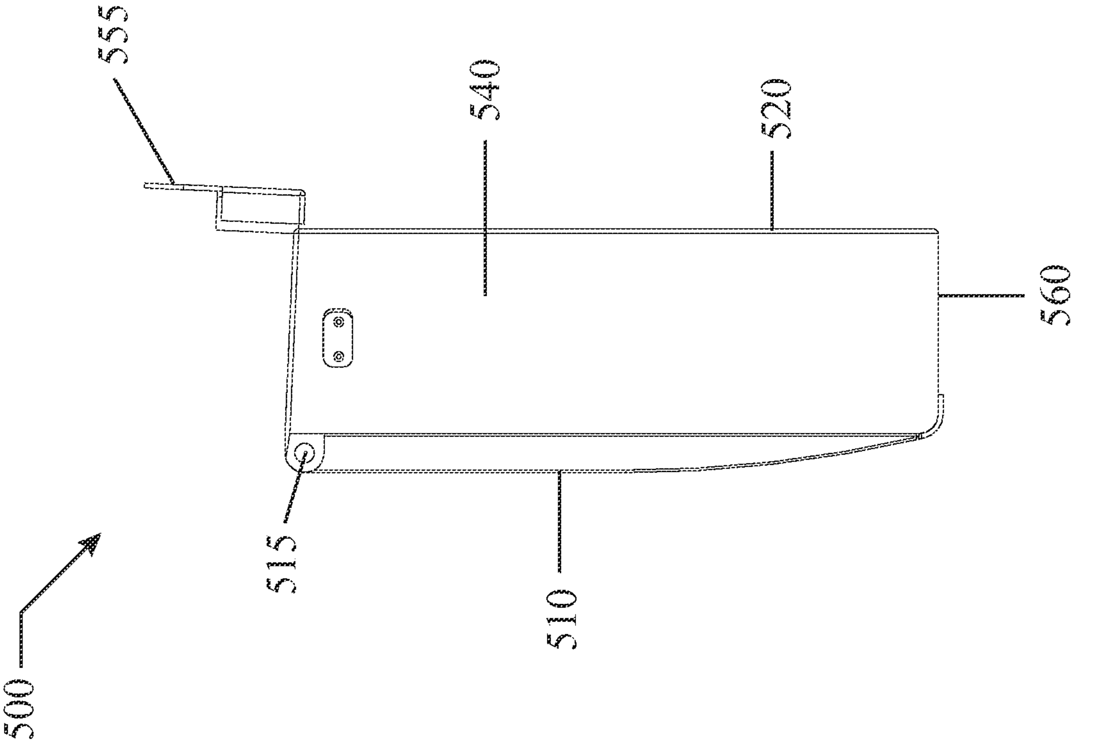
FIG. 69 is a right side view of FIG. 60.
Figure 70:
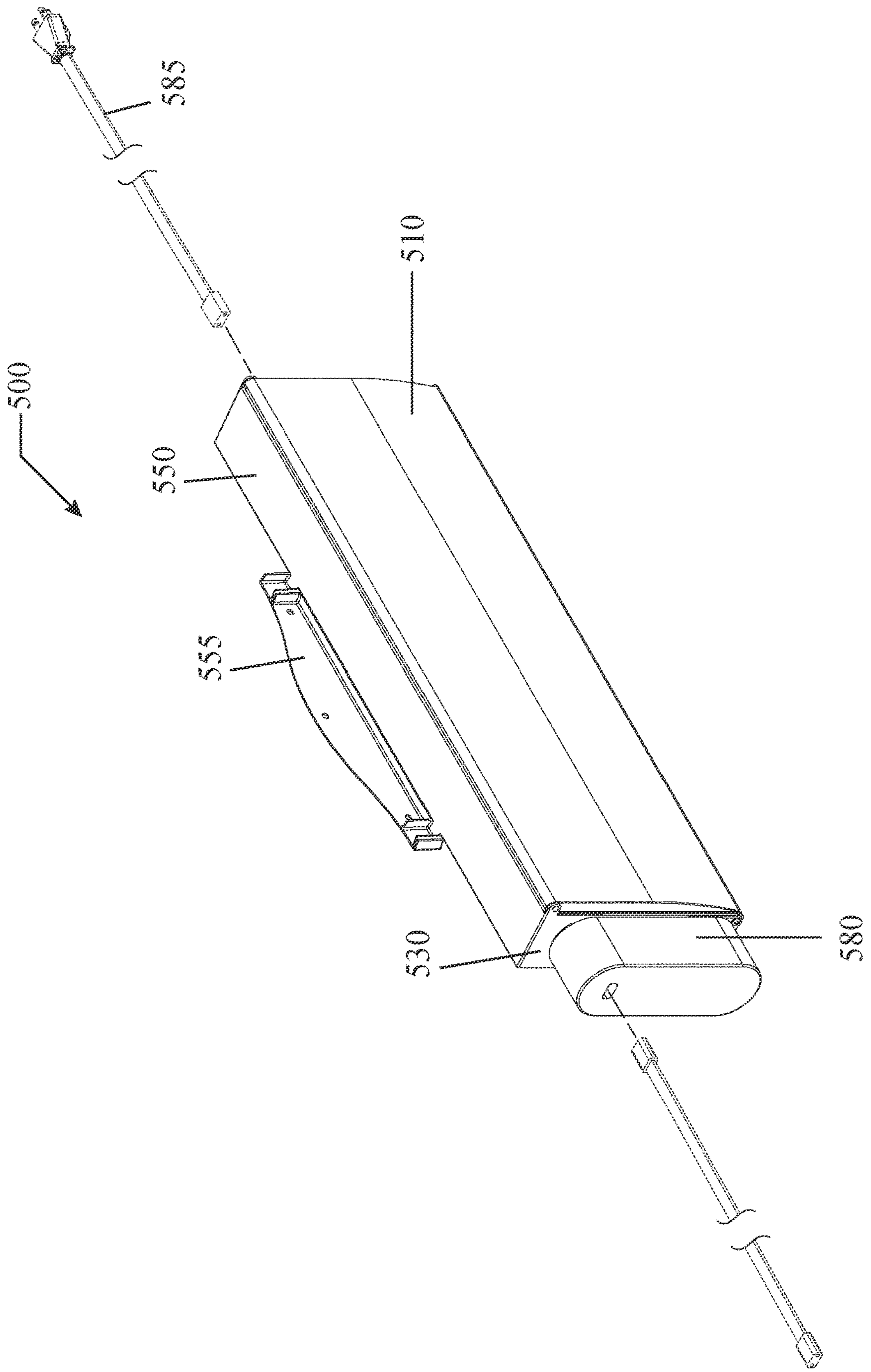
FIG. 70 is another perspective view of FIG. 60 with power cord.

FIG. 60 is an upper front perspective view of a fold out retractable lighting system embodiment 500 with lights 600 retracted. FIG. 61 is a left front perspective view of the embodiment 500 of FIG. 60. FIG. 62 is an upper rear perspective view of the embodiment 500 of FIG. 60. FIG. 63 is a rear perspective view of the embodiment 500 of FIG. 62. FIG. 64 is a rear view of the embodiment 500 of FIG. 60. FIG. 65 is a rear view of the embodiment 500 of FIG. 62. FIG. 66 is a top view of the embodiment 500 of FIG. 60. FIG. 67 is a top view of FIG. 62 with top panel 550 removed. FIG. 68 is a left side view of the embodiment 500 of FIG. 60. FIG. 69 is a right side view of the embodiment 500 FIG. 69. FIG. 70 is another perspective view of FIG. 60 with power cord 585.

Referring to FIGS. 60-70, the fold out embodiment 500 of the retractable lighting system can include a housing having a front panel with an upper edge connected by a hinge 515 to a front edge of a top panel 550, a rear panel 520, and left panel 530 and right panel 540. The top panel 550 can include a mount bracket 5550 extending upward therefrom, with a plurality of fasteners 557, such as screws and bolts that can attach the embodiment 500 to a support surface.

Inside of the embodiment housing 500 can be a rotatable frame 570 having one end attached to an electric motor 580, which can be used to rotate the rotatable frame 570. Initially extending upward from the rotatable frame 570 can be a plurality of lights 600, such as icicle shaped lights with light emitting diodes, such as those described in previous embodiments. Additionally, a tab 574 can extend upward. The other side of the rotatable frame 570 can have a pin 590 for attaching the frame 570 to another side wall of the embodiment 500 housing. A power cord 585 can supply electricity to the electric motor 580. Alternatively, rechargeable batteries can be used for the power supply.

Initially, the rotatable frame 570 can be positioned with the plurality of lights 600 protruding upward.

When the motor is turned on, the rotatable frame can rotate and the table 474 can push against the inside of the front panel causing the front panel to fold out and rotate by hinge 515 to open the front panel. As the rotatable frame rotates, the lights can rotate from upright positions to end up being extending downward from the embodiment housing 500. When the rotatable frame 470 is fully rotated, the front panel can fold back aby hinge 515 closing off the front of the embodiment housing 500. To retract the lights 600 into the embodiment housing 500, the front panel 510 can be physically lifted up by hinge 515, and the motor 580 can be operated to rotate the rotatable frame 570 in the opposite direction until the lights 600 go back to the initial upwardly protruding position. Control of the motor 580 and turning on and off the lights 6000 can be controlled remotely as described in the previous embodiments.

Figure 71:
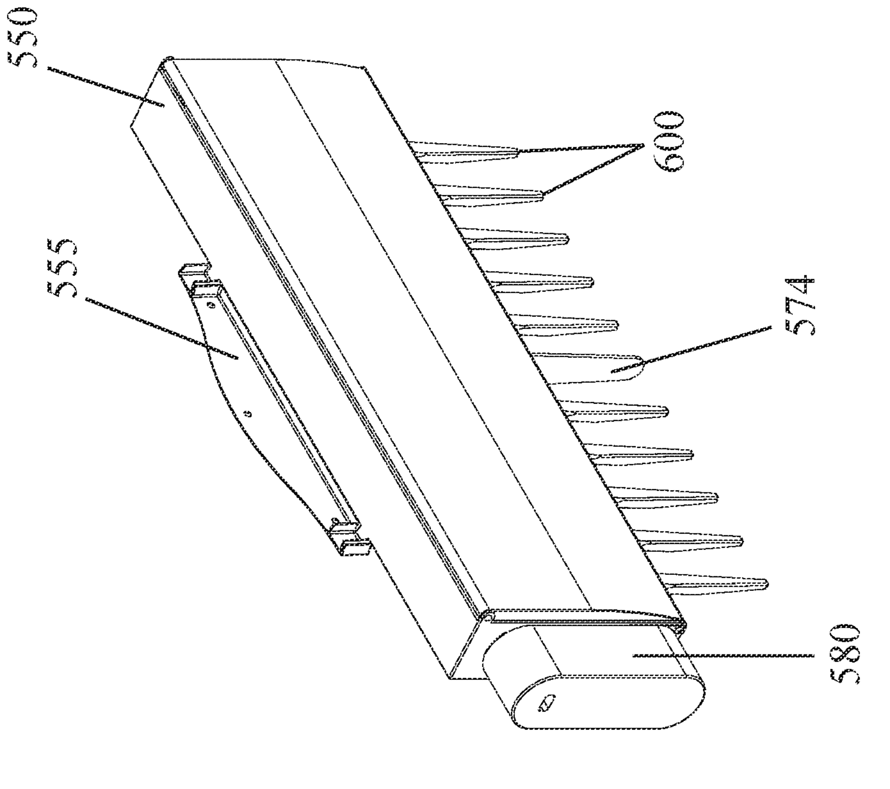
FIG. 71 is another upper front view of the embodiment of FIG. 60 with the lights extending below.

FIG. 71 is another upper front view of the embodiment of FIG. 60 with the lights extending below.

Figure 72:
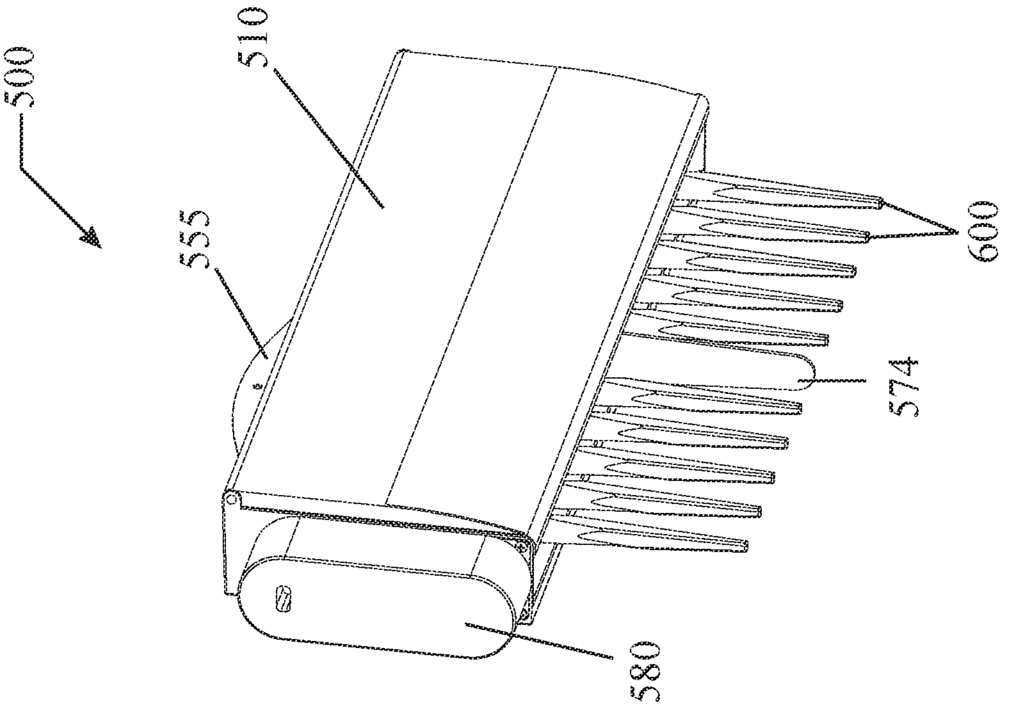
FIG. 72 is a left front perspective view of FIG. 71.

FIG. 72 is a left front perspective view of FIG. 71.

Figure 73:
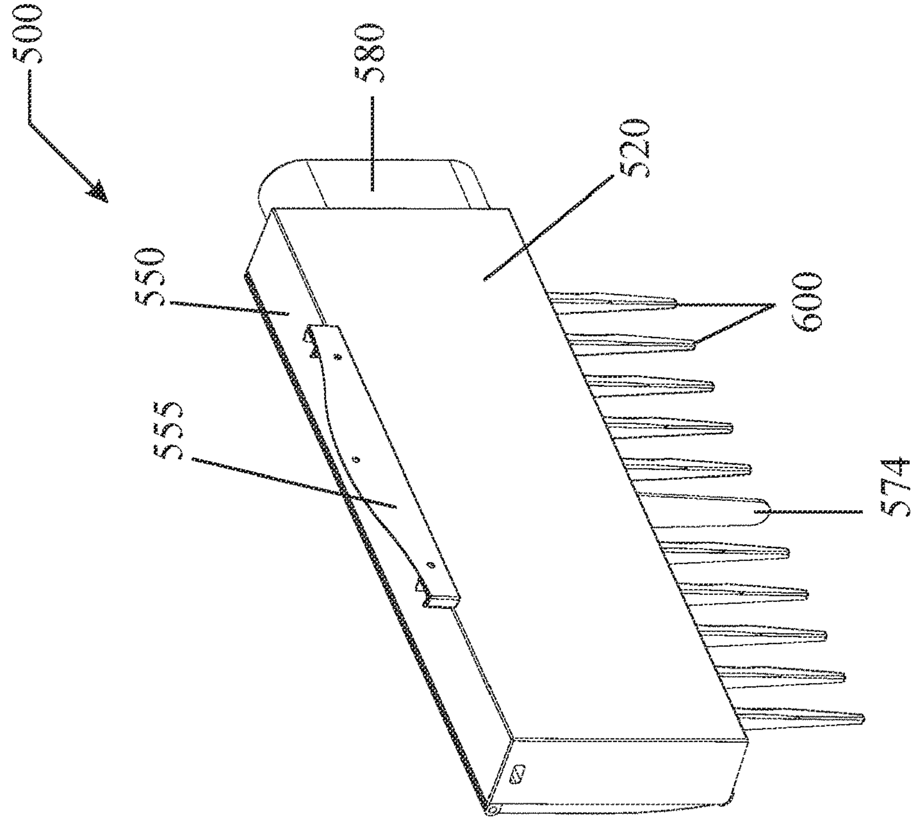
FIG. 73 is an upper rear perspective view of FIG. 71

FIG. 73 is an upper rear perspective view of FIG. 71

Figure 74:
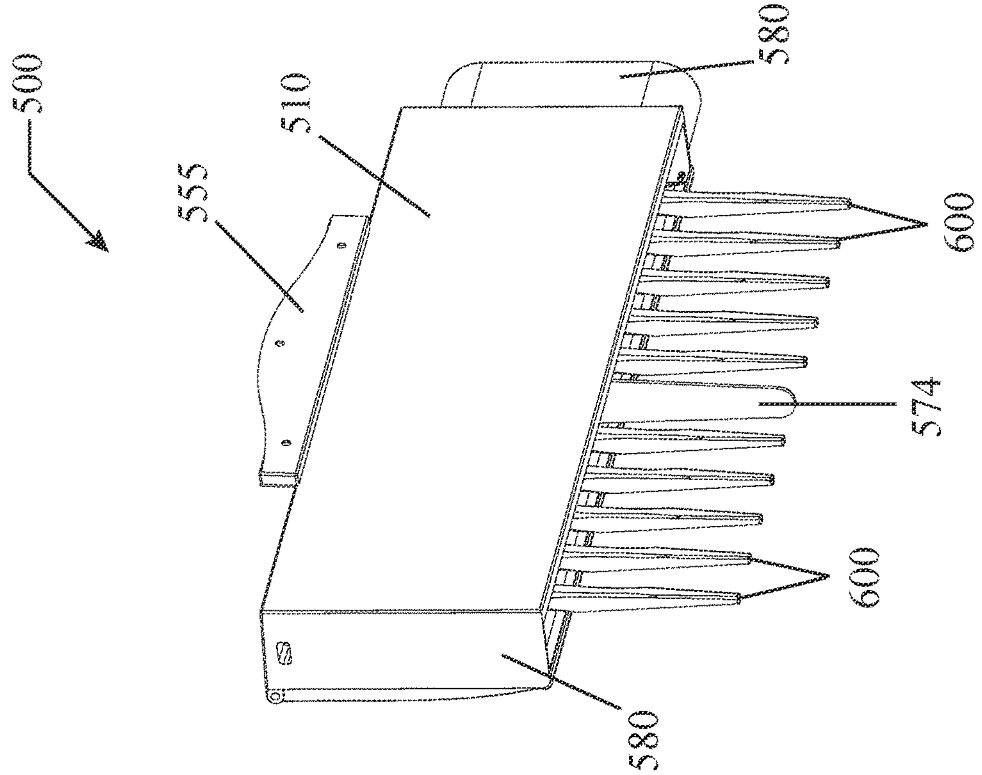
FIG. 74 is another rear perspective view of FIG. 7*a*.

FIG. 74 is another rear perspective view of FIG. 7*a*.

Figure 75:
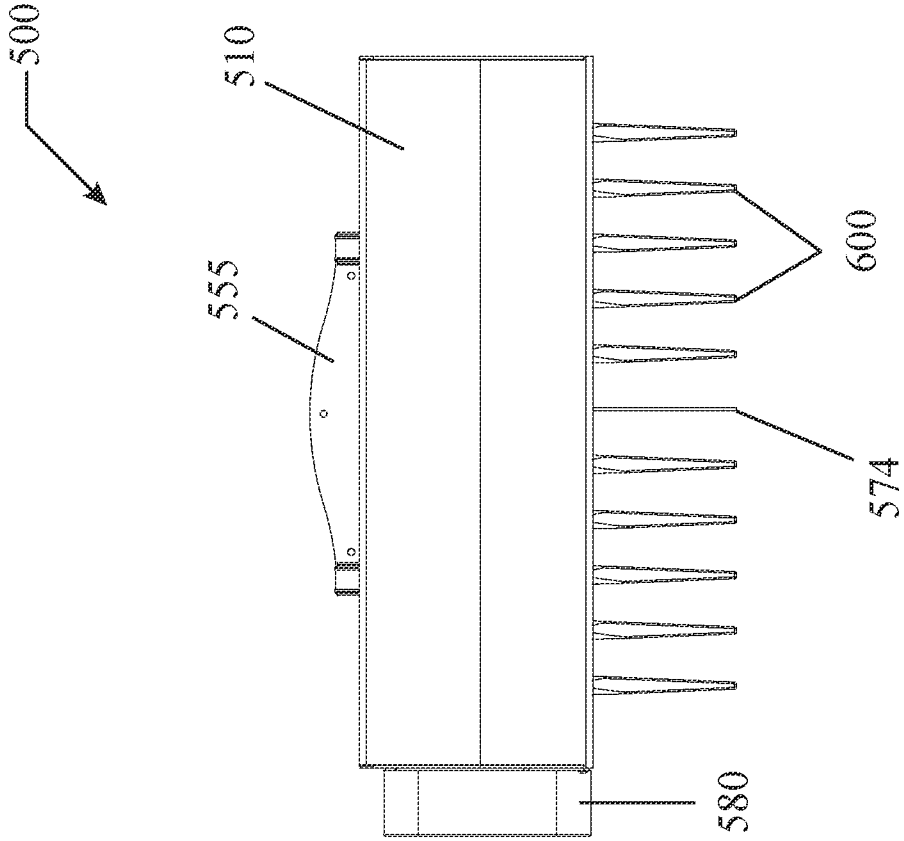
FIG. 75 is a front view of FIG. 71.

FIG. 75 is a front view of FIG. 71.

Figure 76:
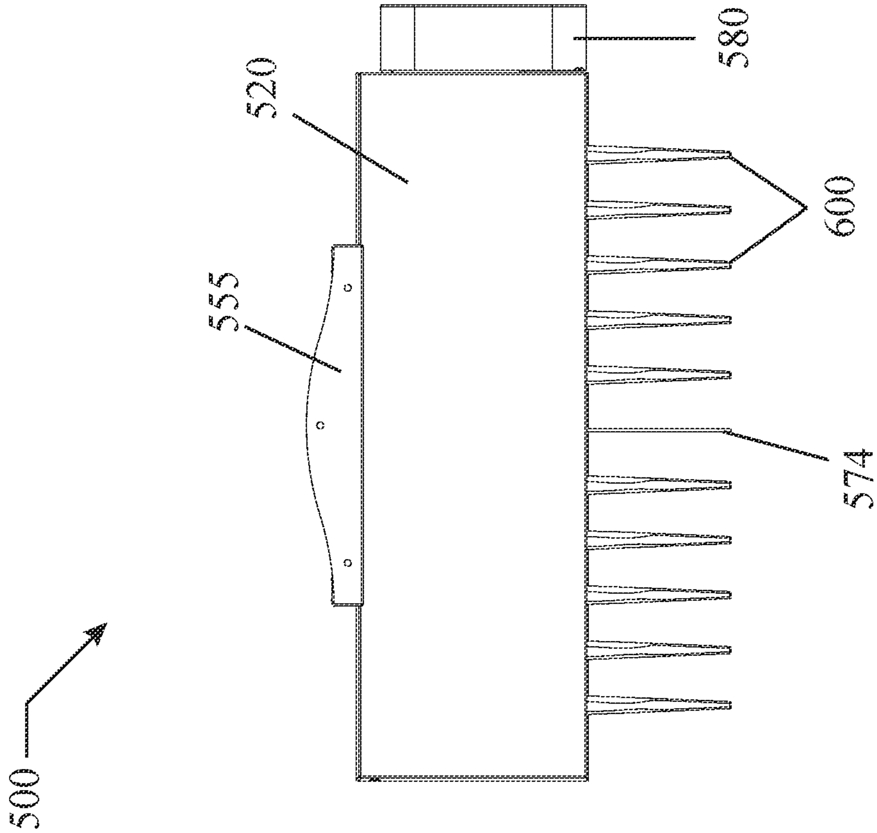
FIG. 76 is a rear view of FIG. 71.

FIG. 76 is a rear view of FIG. 71.

Figure 77:
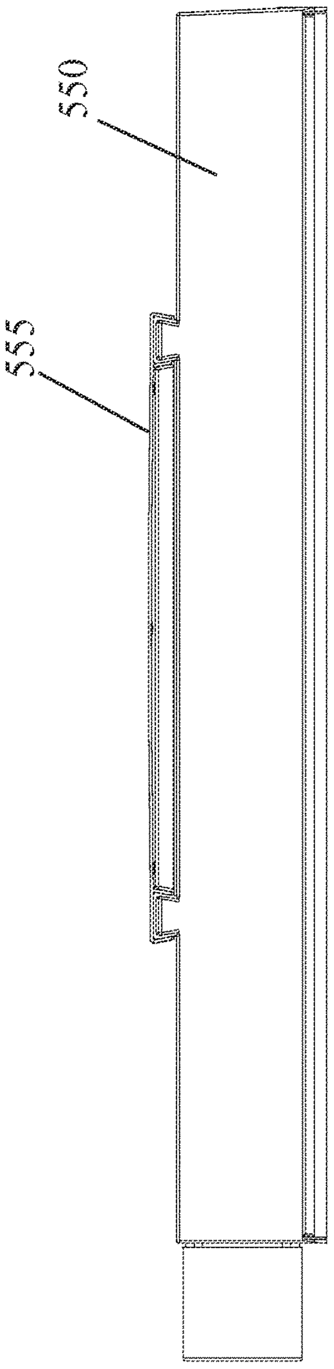
FIG. 77 is a top view of the embodiment in FIG. 71.

FIG. 77 is a top view of the embodiment in FIG. 71.

Figure 78:
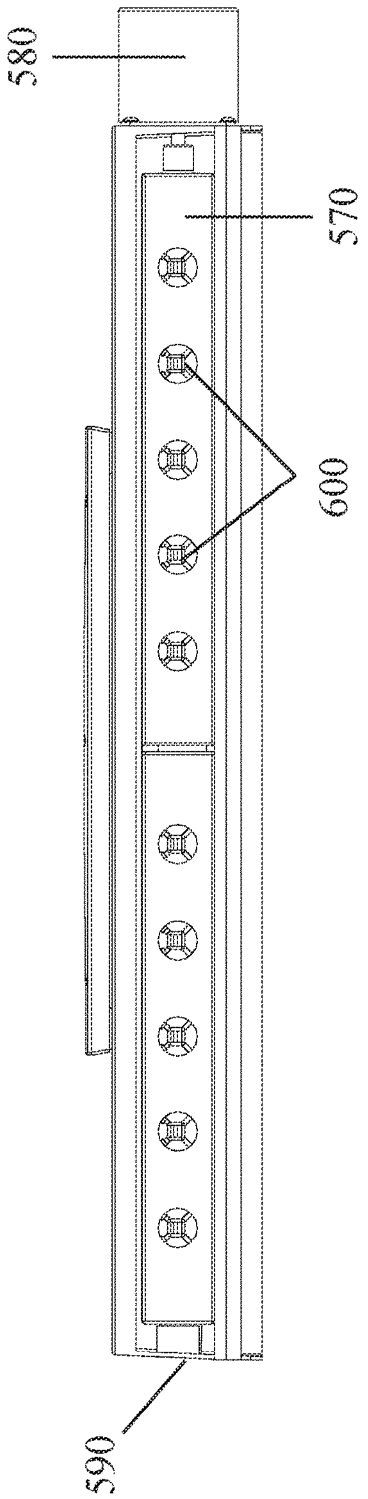
FIG. 78 is a bottom view of the embodiment of FIG. 71

FIG. 78 is a bottom view of the embodiment of FIG. 71

Figure 79:
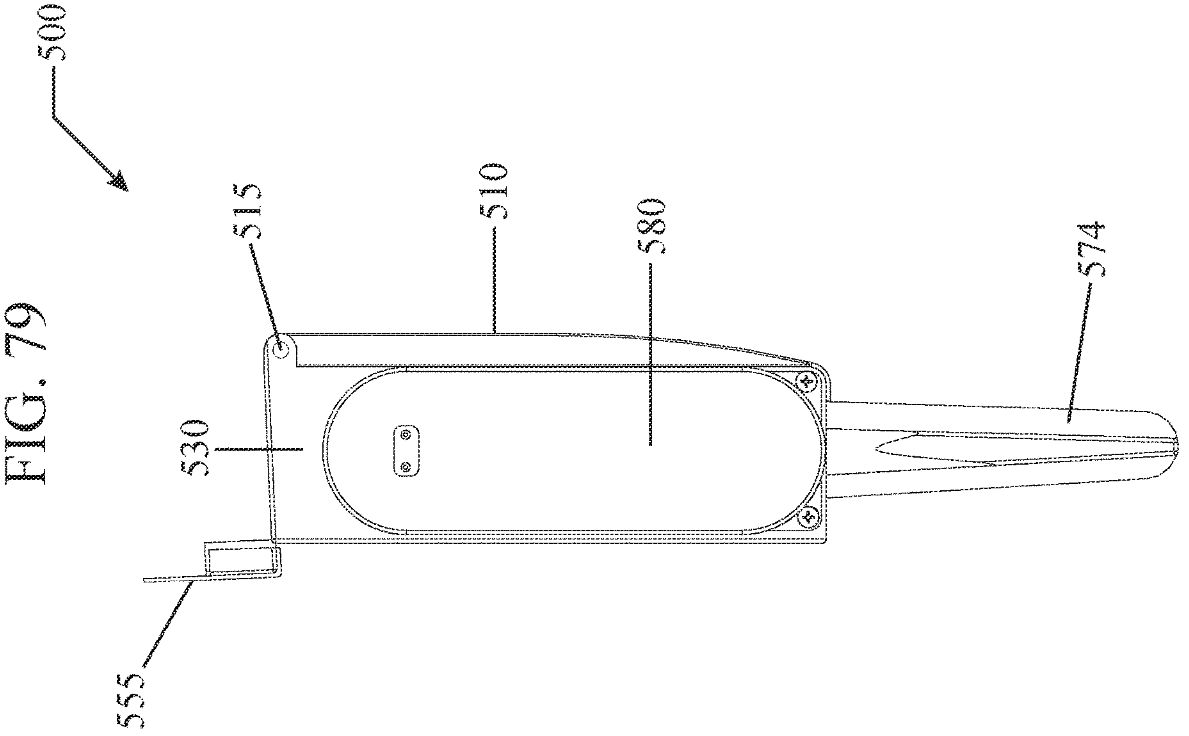
FIG. 79 is a left side view of the embodiment in FIG. 71.

FIG. 79 is a left side view of the embodiment in FIG. 71.

Figure 80:
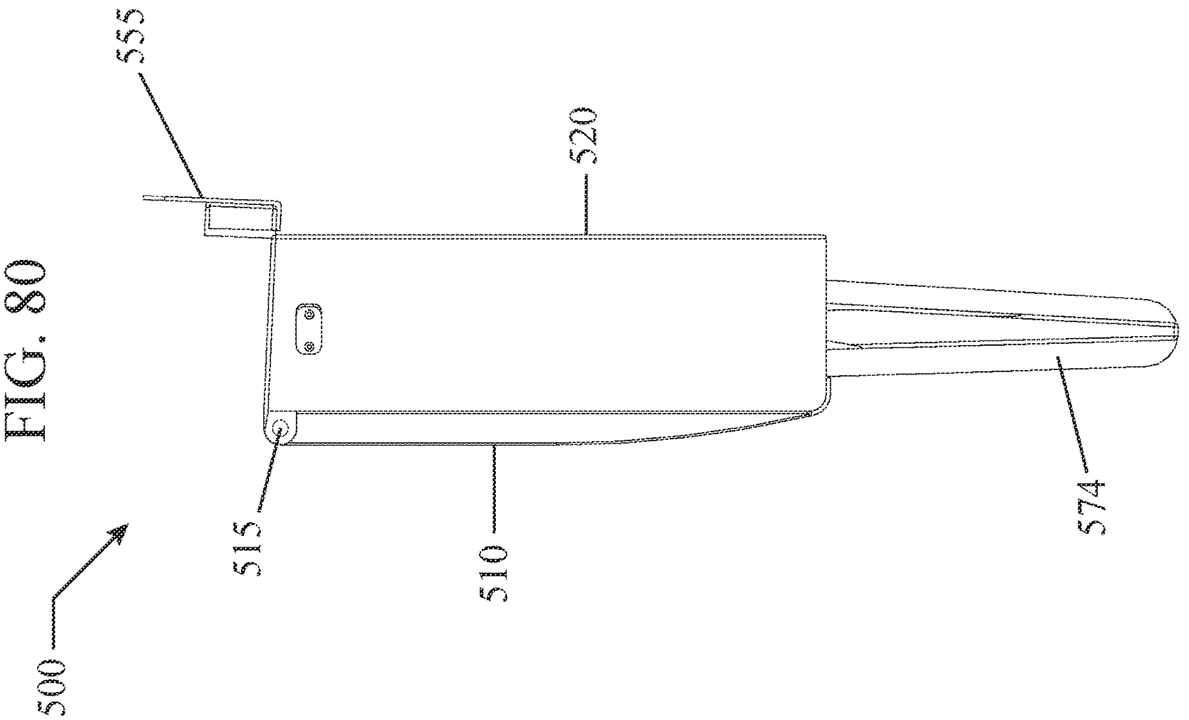
FIG. 80 is a right side view of the embodiment In FIG. 71.

FIG. 80 is a right side view of the embodiment In FIG. 71.

Figure 81:
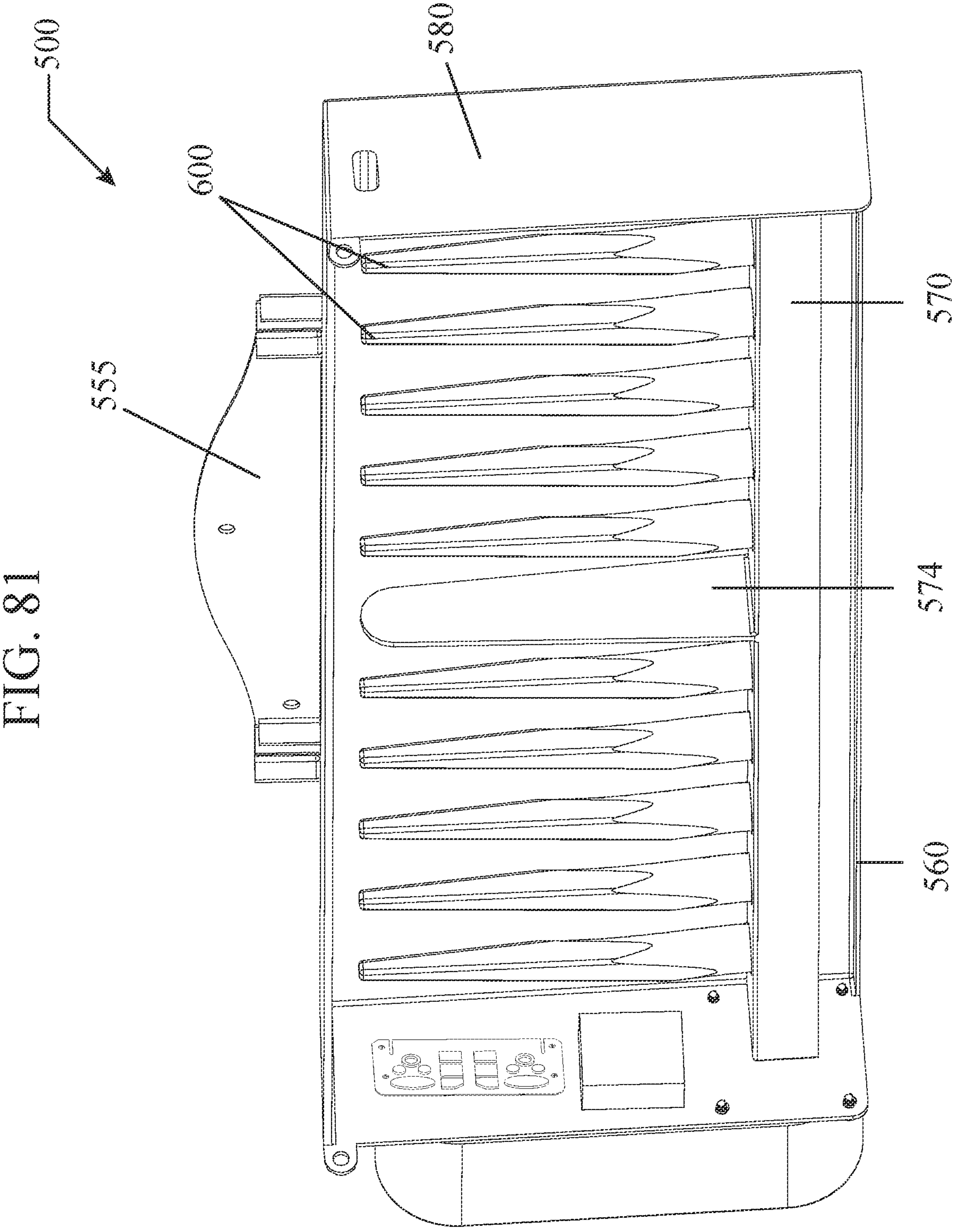
FIG. 81 is a front view of the embodiment in FIG. 60 with front panel removed and lights retracted.

FIG. 81 is a front view of the embodiment in FIG. 60 with front panel removed and lights retracted.

Figure 82:
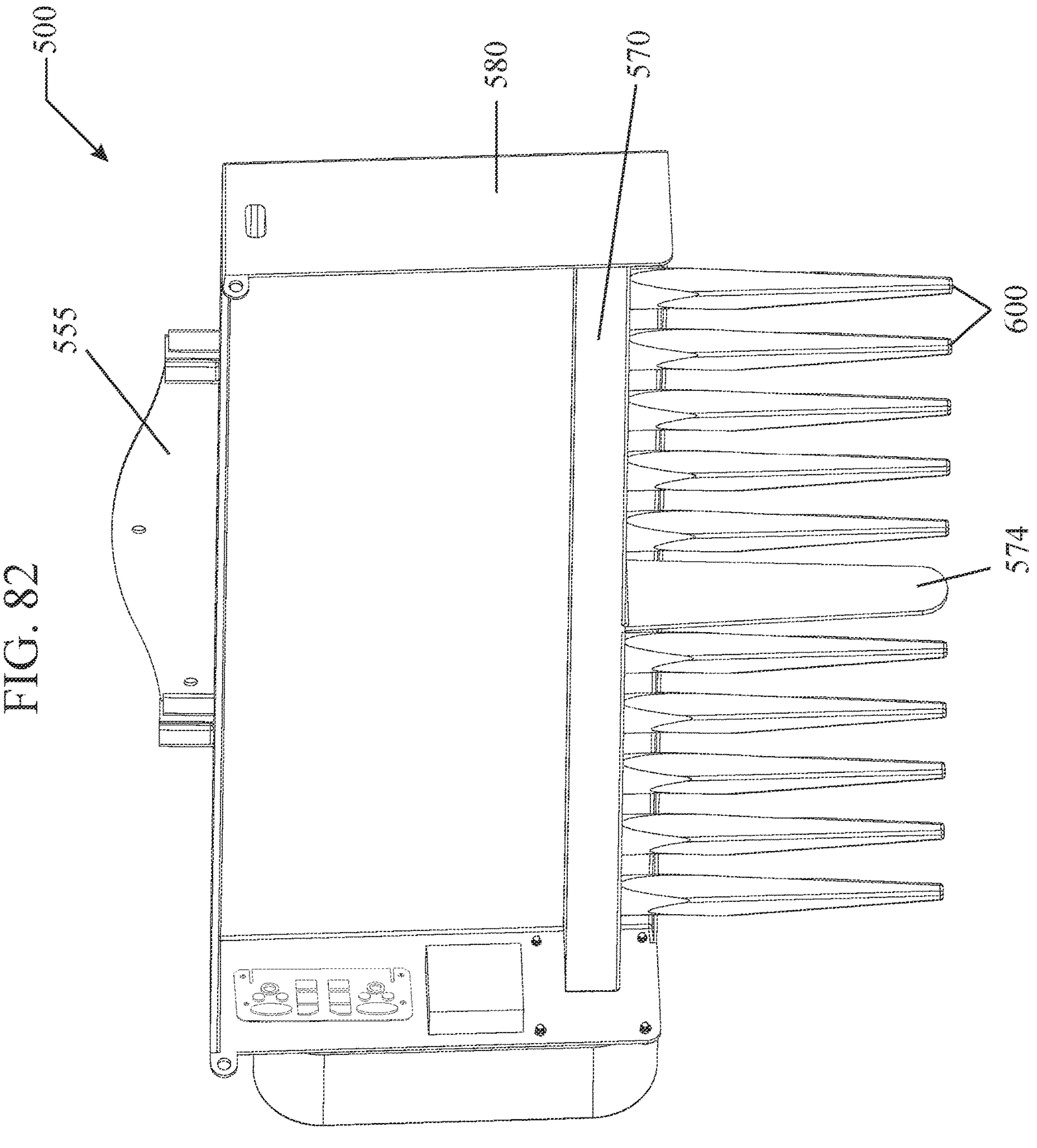
FIG. 82 is a front view of the embodiment in FIG. 60 and FIG. 81 with front panel removed and lights extending below.
Figure 83:
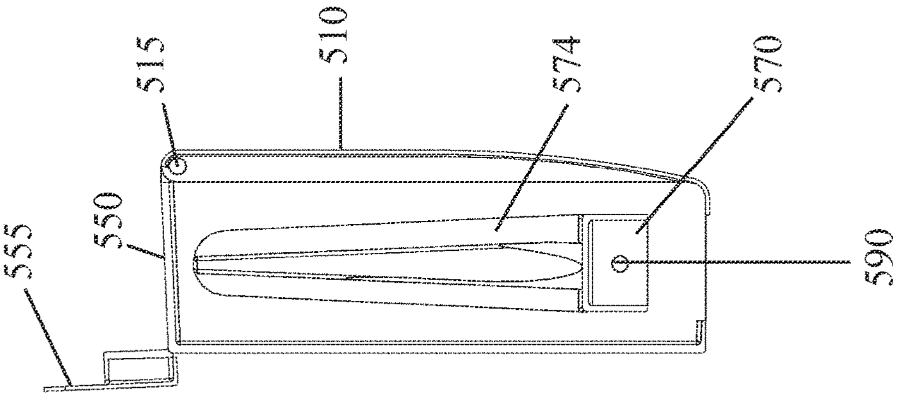
FIG. 83 is a left side view of the embodiment in FIG. 60 with left panel removed and lights retracted.

FIG. 82 is a front view of the embodiment in FIG. 60 and FIG. 81 with front panel removed and lights extending below FIG. 83 is a left side view of the embodiment in FIG. 60 with left panel removed and lights retracted.

Figure 84:
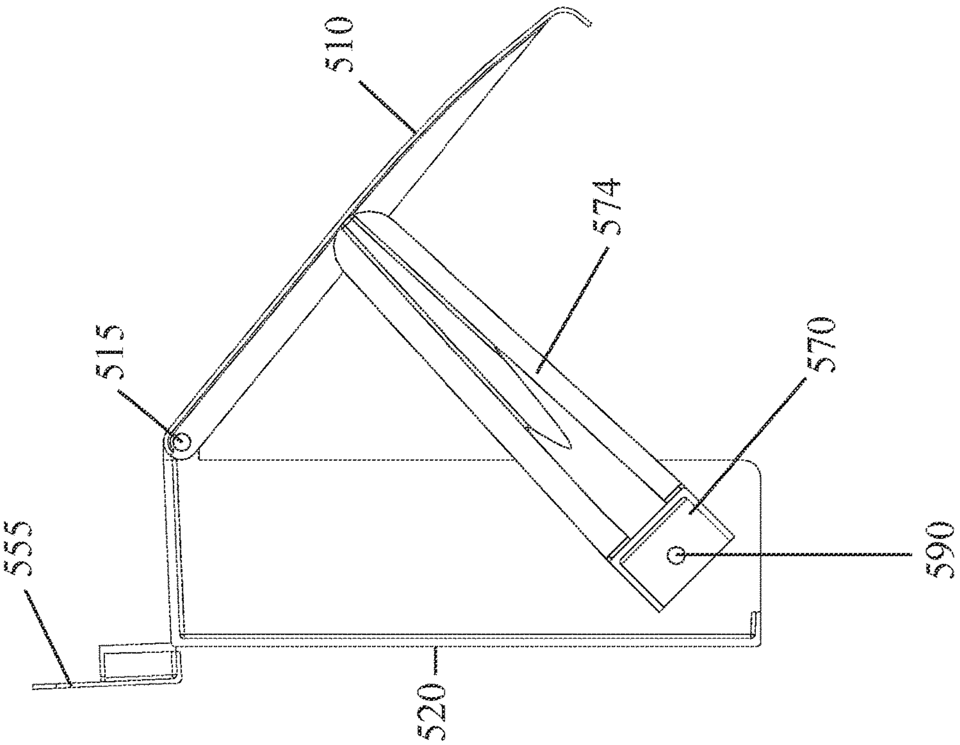
FIG. 84 is another left side view of the embodiment in FIG. 60 and FIG. 83 with left panel removed and front panel starting to fold out for lights to fold out.

FIG. 84 is another left side view of the embodiment in FIG. 60 and FIG. 83 with left panel removed and front panel starting to fold out for lights to fold out.

Figure 85:
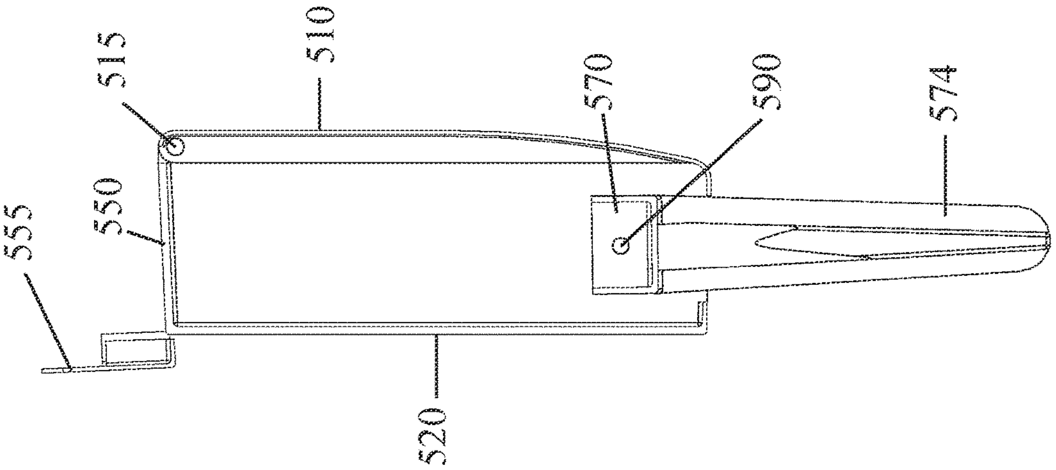
FIG. 85 is another left side view of the embodiment in FIG. 60 and FIG. 84 with left panel removed and lights extending below, and front panel folded back

FIG. 85 is another left side view of the embodiment in FIG. 60 with left panel removed and lights extending below.

Figure 86:
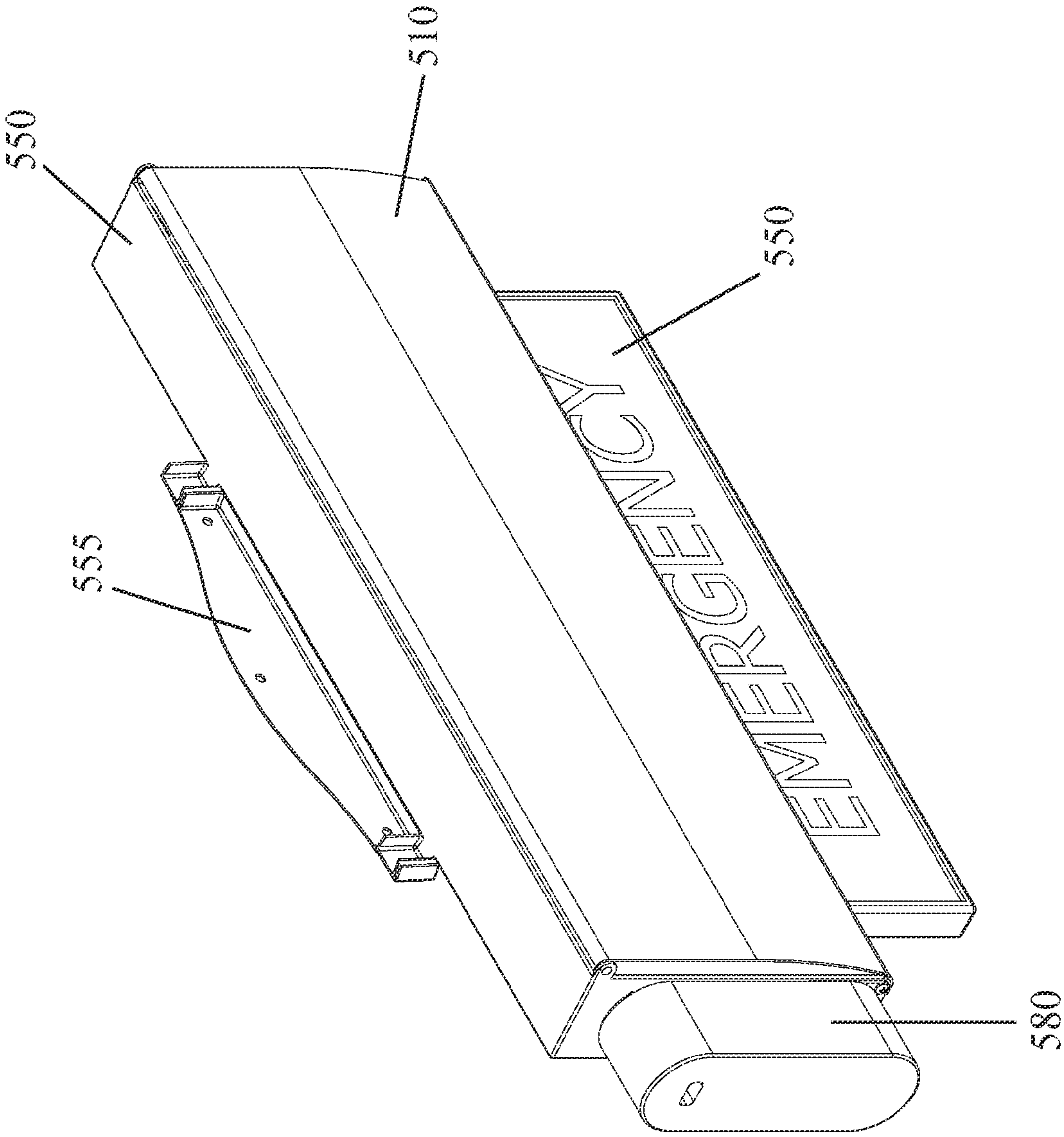
FIG. 86 is an upper front perspective view of the embodiment in FIG. 60 with a sign extending below.

FIG. 86 is an upper front perspective view of the embodiment in FIG. 60 with a sign extending below.

Figure 87:
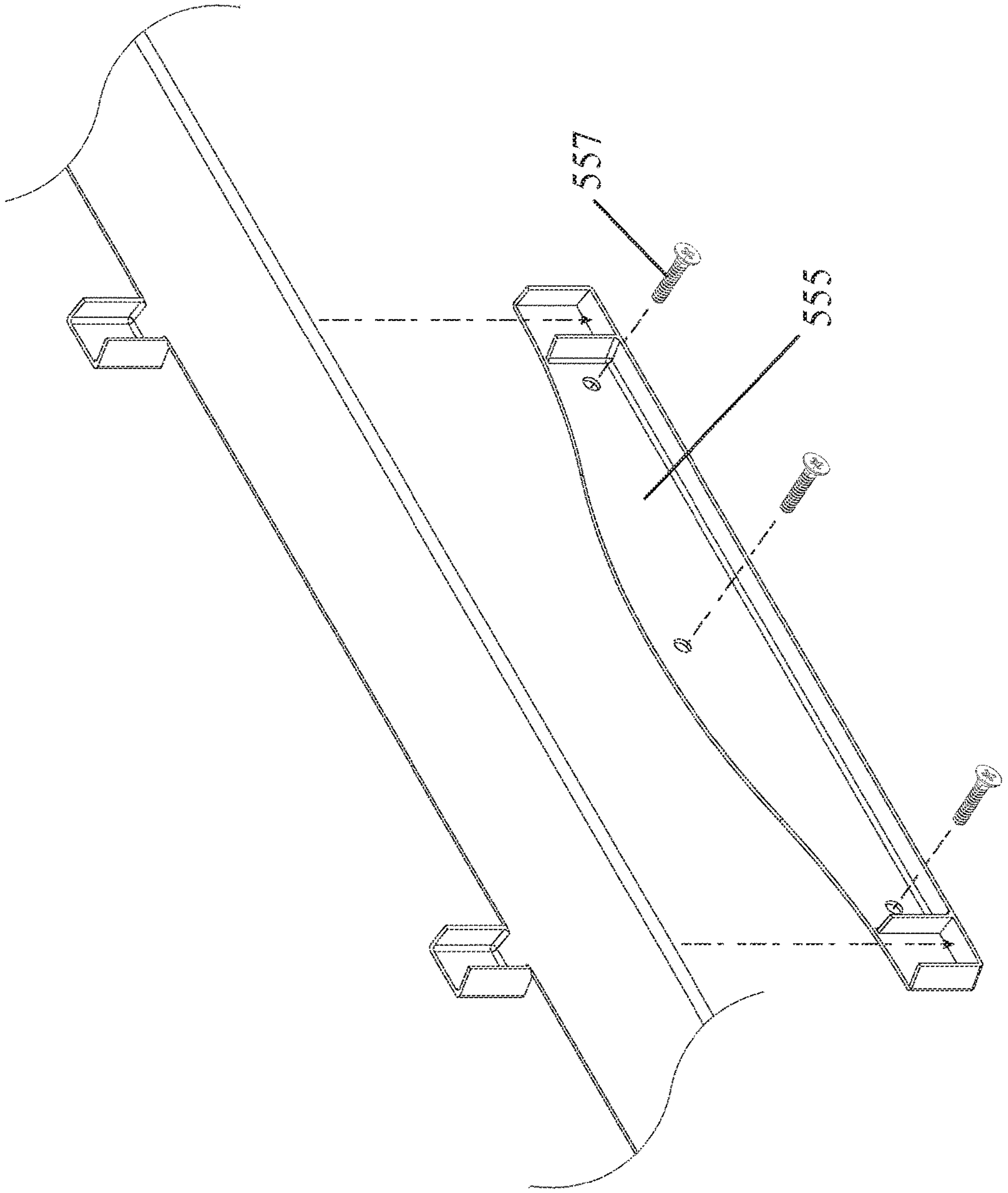
FIG. 87 is a perspective view of the embodiment in FIG. 60 with mounting fasteners for mounting bracket

FIG. 87 is a perspective view of the embodiment in FIG. 60 with mounting fasteners.

Figure 88A:
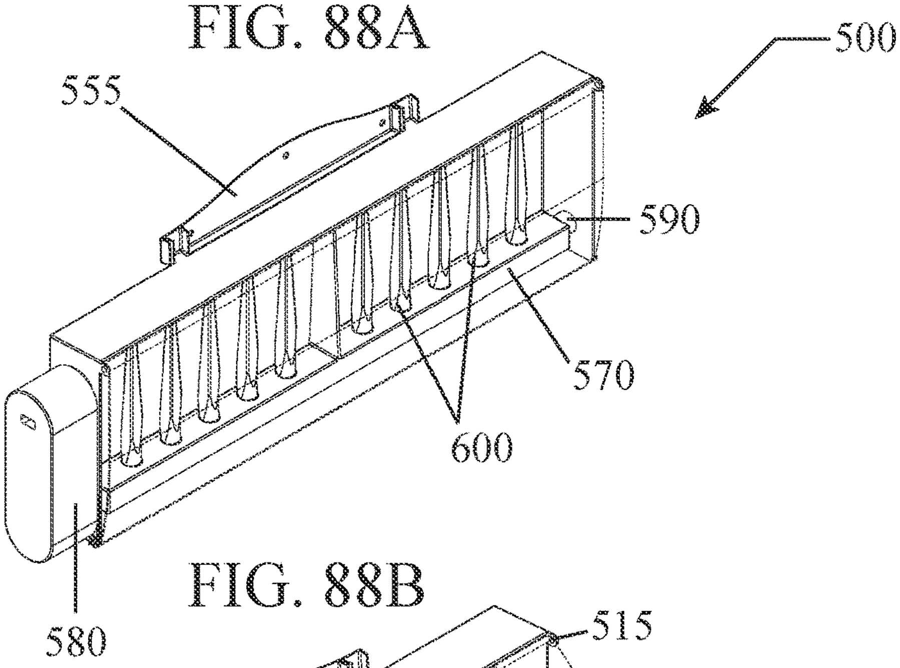
FIG. 88A is a front perspective inside view of FIG. 83.

FIG. 88A is a front perspective inside view of FIG. 83.

Figure 88B:
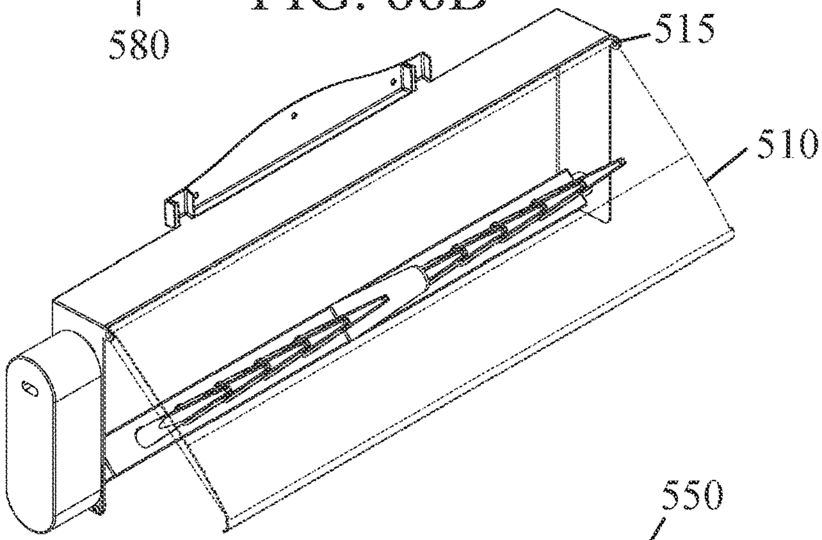
FIG. 88B is a front perspective inside view of FIG. 84.

FIG. 88B is a front perspective inside view of FIG. 84.

Figure 88C:
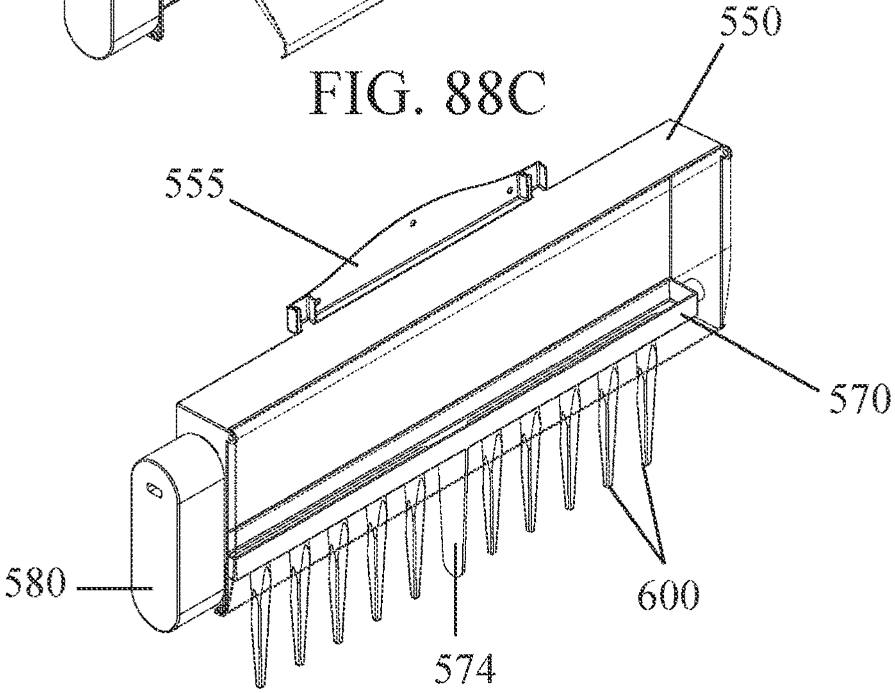
FIG. 88C is a front perspective inside view of FIG. 85

FIG. 88C is a front perspective inside view of FIG. 85

Figure 89A:
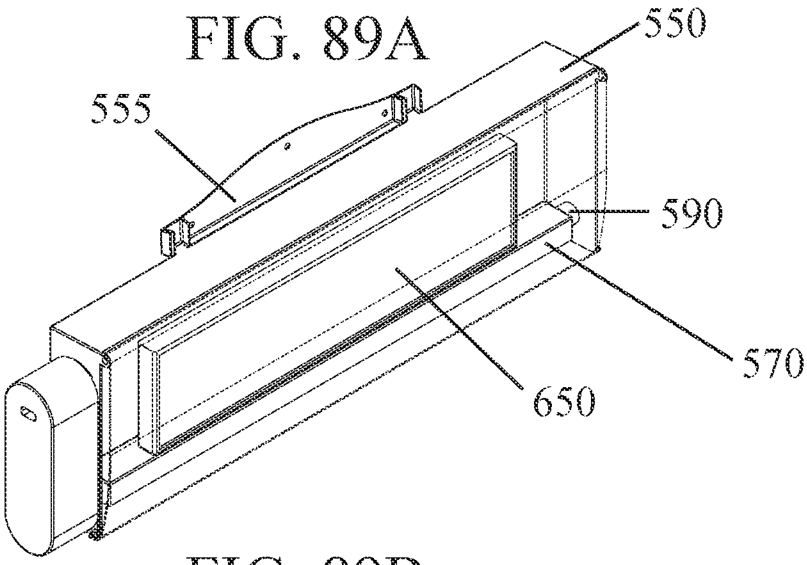
FIG. 89A is a front perspective inside view of FIG. 86 with a sign of FIG. 86 retracted.

FIG. 89A is a front perspective inside view of FIG. 88A with a sign of FIG. 86 retracted.

Figure 89B:
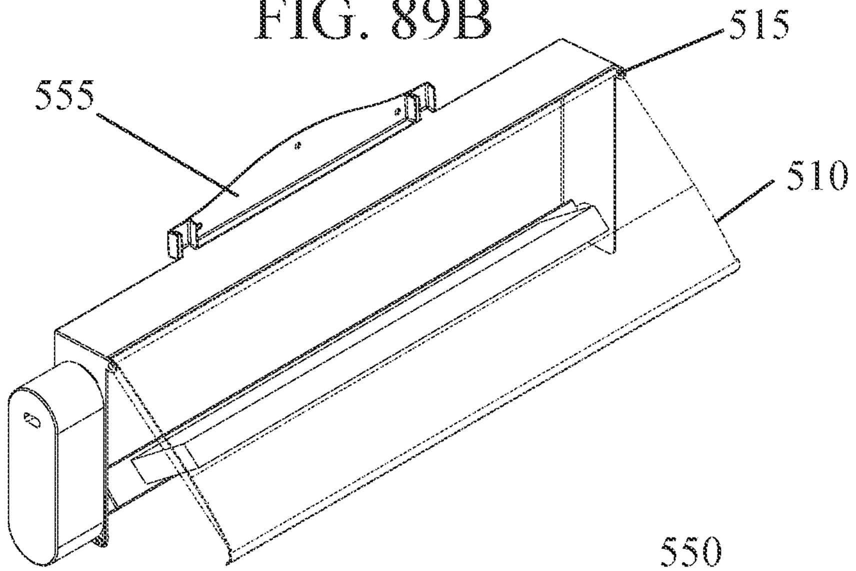
FIG. 89B is a front perspective inside view of FIG. 89A with the front panel folding out.

FIG. 89B is a front perspective inside view of FIG. 84 with the front panel folding out.

Figure 89C:
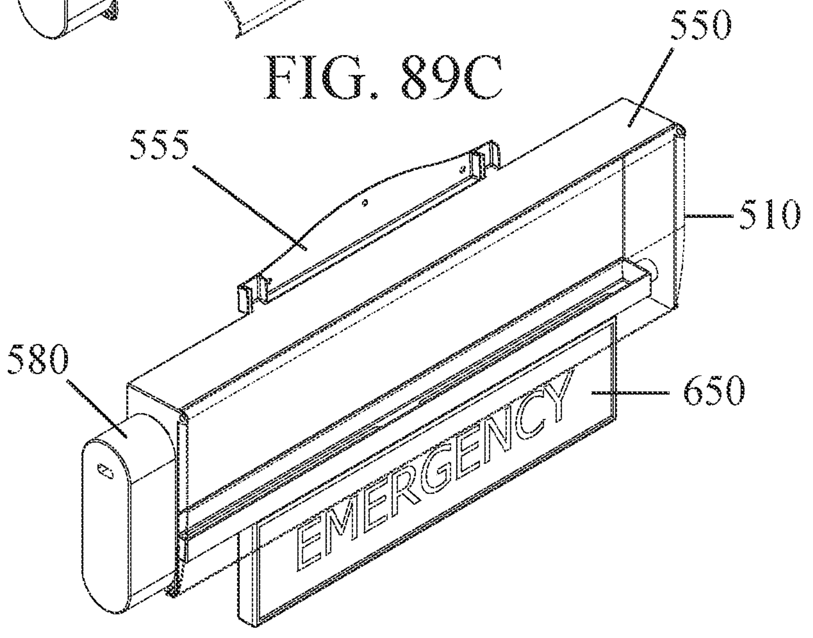
FIG. 89C is a front perspective view of FIG. 86.

FIG. 89C is a front perspective view of FIG. 86.

Although the preferred embodiments are described using electric power from a wall type power supply, the power can be generated through solar panels, and the like, and the power then stored on batteries 98, when needed.

While the preferred embodiment shows the lights 100, 400 to be shaped like icicles, the lights can have other shapes, such as candles, candy canes (with stripes), balls, and other geometrical shapes, and the like.

Although the preferred embodiment describes the use of a motor to lower and raise the lights, springs can be used, such as those used in window shades, and the like. The pullable window shade can be such as that shown and described in U.S. Pat. No. 4,009,745 to Erpenbeck, which is incorporated by reference in its' entirety.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A drop down and retractable lighting system, comprising:

a box having a top panel, a front panel mounted by a hinge along a front edge of the top panel for closing a front of the box, a left panel for closing a left side of the box, a right panel for closing a right side of the box, and a back panel closing a rear side of the box and a bottom;

an elongated rotatable frame positioned across the bottom of the box having a left pivot member attached to a lower portion of the left panel and a right pivot member attached to a lower portion of the right panel;

a plurality of parallel spaced apart elongated lights attached to and extending upward from the rotatable frame; and an electric motor attached to one of the left pivot member and the right pivot member, wherein the electric motor rotates the elongated rotatable frame so that at least one of the plurality of parallel spaced apart elongated lights pushes against an interior side portion of the hinged front panel to move the front panel outward to rotate relative to the hinge, and the plurality of the parallel spaced apart elongated lights attached to the rotatable frame is moved from a raised position inside of the box with the plurality of parallel spaced apart elongated lights adjacent to the back panel of the box, to be rotated downward to a lowered position with the plurality of parallel spaced apart elongated lights hanging below and exposed below the bottom of the box.

2. The retractable lighting system of claim 1, wherein the parallel spaced apart elongated lights include:

icicle shaped lights.

3. The retractable lighting system of claim 1, wherein further comprising:

a remote controller for remotely turning on and off the motor.

4. The retractable lighting system of claim 1, further comprising:

a battery power supply.

5. The retractable lighting system of claim 1, further comprising:

a mount bracket extending upward from the back panel of the box having fastener openings for attaching the box under house eaves.

6. The retractable lighting system of claim 4, wherein each of the icicle shaped lights include light emitting diodes (LEDs).

7. A fold out retractable lighting system comprising:

a box having a top panel, a front panel mounted by a hinge to a front edge of the top panel for closing a front of the box, a left panel on a left side of the box, a right panel on a right side of the box, a back panel and bottom;

an elongated rotatable frame positioned along the bottom of the box, having a left pivot member, and a right pivot member; and a plurality of parallel spaced apart vertical lights attached to and extending upward from the elongated rotatable frame, wherein rotating the rotatable frame causes at least one of the plurality of spaced apart vertical lights to push and move the front panel outward to rotate relative to the hinge, and the rotatable frame rotates from a first position with the plurality of parallel spaced apart vertical lights upright in the box hidden behind the front panel to move to a second position with the plurality of parallel spaced apart vertical lights extending downward exposed beneath the bottom of the box, with the front panel closing off a front of the box in the second position.

8. The fold out retractable lighting system of claim 7, wherein the plurality of spaced apart vertical lights includes:

icicle shaped lights.

9. The retractable lighting system of claim 7, wherein each of the icicle shaped lights include light emitting diodes (LEDs).

10. The retractable lighting system of claim 7, further comprising:

an electric motor inside of the box attached to an end of the elongated rotatable frame, wherein the motor rotates the elongated rotatable frame wherein rotating the moveable frame from the first position to the second position.

11. The retractable lighting system of claim 7, further comprising:

a remote controller for remotely turning on and off the motor.

12. The retractable lighting system of claim 7, further comprising:

a battery power supply.

13. The retractable lighting system of claim 7, further comprising:

a mount bracket extending upward from the back panel of the box having fastener openings for attaching the box under house eaves.

14. A retractable sign system, comprising:

a box having a top panel, a front panel mounted by a hinge along a front edge of the top panel for closing a front of the box, a left panel for closing a left side of the box, a right panel for closing a right side of the box, and a back panel closing a rear side of the box and a bottom;

an elongated rotatable frame positioned across the bottom of the box having a left pivot member attached to a lower portion of the left panel and a right pivot member attached to a lower portion of the right panel;

a planar panel having a front face, and a rear face with a sign display thereon, the planar panel extending upward from the rotatable frame; and an electric motor attached to one of the left pivot member and the right pivot member, wherein the electric motor rotates the elongated rotatable frame so that a portion of the planar panel pushes against an interior side portion of the hinged front panel to move the front panel outward to rotate relative to the hinge, and the planar panel attached to the rotatable frame is moved from a raised position inside of the box with the rear face of the planar panel adjacent to the back panel of the box, to be rotated downward to a lowered position with the planar panel hanging below and exposed below the bottom of the box so that the sign display on the rear face of the planar panel is visible in front of the box.

15. The retractable sign system of claim 14, wherein the sign display on the planar panel includes changeable text messages.

16. The retractable sign system of claim 15, wherein sign display includes light emitting diodes (LEDs).

17. The retractable sign system of claim 14, further comprising:

a remote controller for remotely turning on and off the sign display.

18. The retractable sign system of claim 16, further comprising:

a remote controller for remotely changing text messages on the sign display.

19. The retractable sign system of claim 14, further comprising:

a battery power supply.

20. The retractable lighting system of claim 14, further comprising:

a mount bracket extending upward from the back panel of the box having fastener openings for attaching the box to a front of a house.

* * * * *